(12) United States Patent
Inamasu et al.

(10) Patent No.: US 6,243,619 B1
(45) Date of Patent: *Jun. 5, 2001

(54) CONTROL METHOD AND APPARATUS FOR PLATE MATERIAL PROCESSING MACHINE

(75) Inventors: Toru Inamasu; Kiyotaka Nishiyama, both of Kanagawa (JP)

(73) Assignee: Amada Company, Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,536

(22) Filed: Apr. 2, 1997

(30) Foreign Application Priority Data

| May 10, 1996 | (JP) | 8-116510 |
| May 24, 1996 | (JP) | 8-130361 |
| Jun. 7, 1996 | (JP) | 8-145869 |
| Jun. 17, 1996 | (JP) | 8-155500 |
| Jun. 21, 1996 | (JP) | 8-161843 |

(51) Int. Cl.[7] .................................................. G06F 19/00
(52) U.S. Cl. ............................ 700/180; 700/83; 700/84; 700/172
(58) Field of Search ................................ 348/153; 360/18; 386/117; 83/410, 409, 468.6; 100/48, 53; 72/61; 700/83, 114, 108, 145, 166, 174, 175, 180, 84, 87, 86, 85, 165, 172, 249, 264, 200; 463/14; 345/337

(56) References Cited

U.S. PATENT DOCUMENTS

| 3,686,434 | * | 8/1972 | Lemelson | 360/18 |
| 4,398,720 | * | 8/1983 | Jones et al. | 463/14 |
| 4,519,284 | * | 5/1985 | Hunter et al. | 83/410 |
| 4,837,734 | * | 6/1989 | Ichikawa et al. | 700/249 |
| 5,274,750 | * | 12/1993 | Shiina et al. | 700/264 |
| 5,592,583 | * | 1/1997 | Sakurai | 704/200 |
| 5,642,291 | * | 6/1997 | Prunotto et al. | 700/145 |

* cited by examiner

Primary Examiner—William Grant
Assistant Examiner—Steven R. Garland
(74) Attorney, Agent, or Firm—Greenblum & Bernstein P.L.C.

(57) ABSTRACT

An operating state setting device and method of a plate material processing machine, includes multiple keys having corresponding functions relating to operation of the plate material processing machine. The keys include a skill mode selecting key for selecting an expert or beginner mode, an automatic mode key for executing a numeric control processing program, a manual mode key for allocating manual control of a movable member to the operator and moving keys for controlling the movable member in the manual mode. A numerically controlled controller is provided for setting an operating state of the plate material processing machine corresponding to the selected skill mode and executing a detailed procedure in the expert mode and a simple procedure in the beginner mode. The simple procedure may include an internal execution procedure and an editing history selection and corresponding product image display.

14 Claims, 25 Drawing Sheets

FIG.11
IMAGE 105
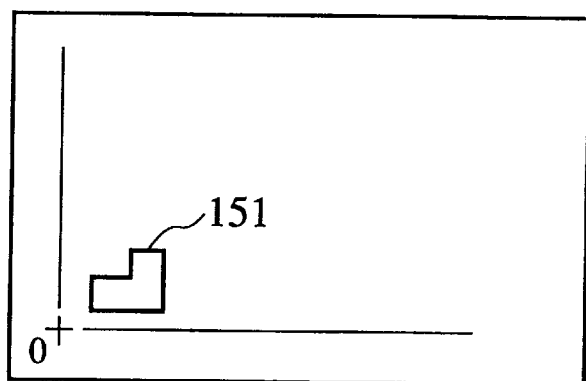
IMAGE 106
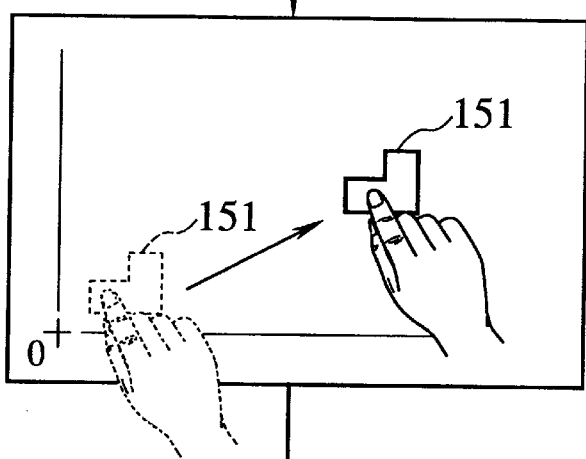
IMAGE 107
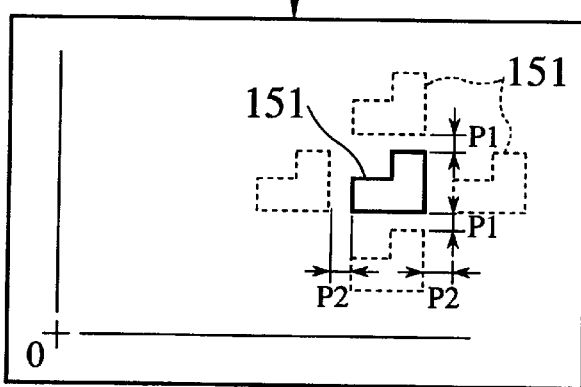

FIG.15
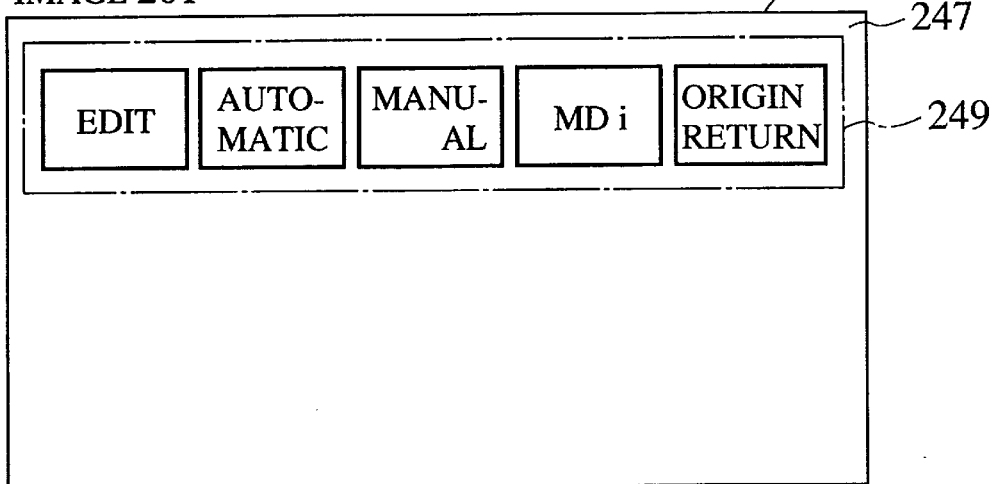
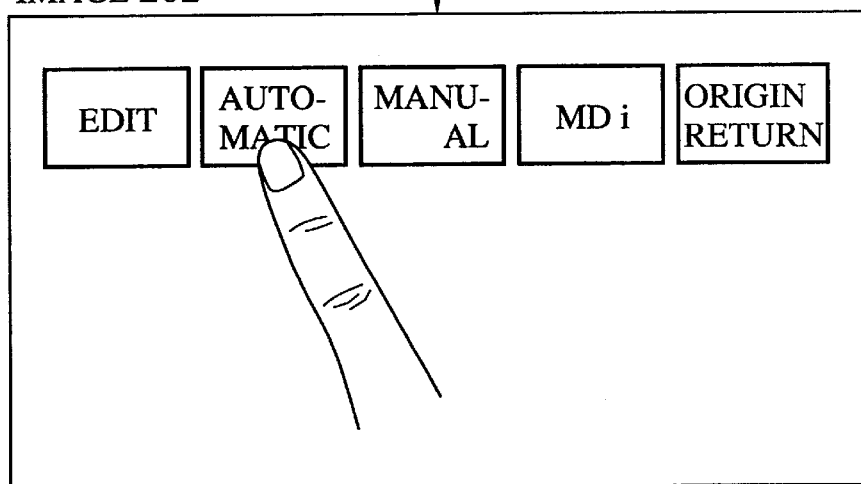
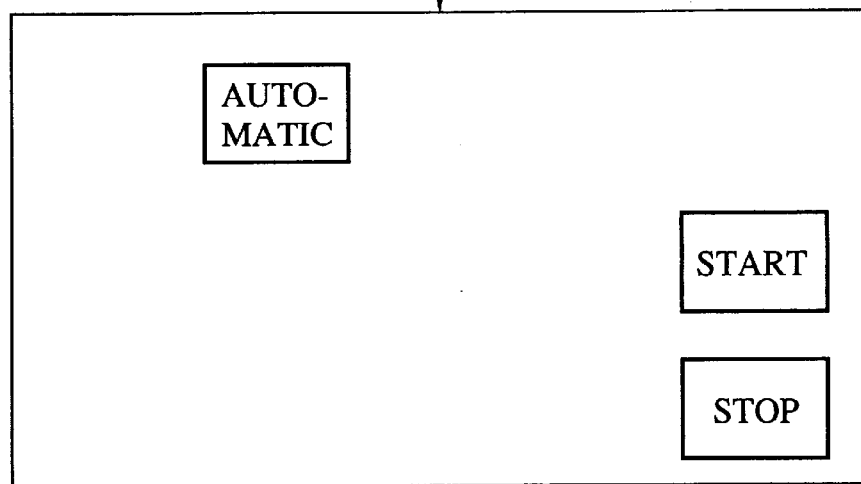

FIG.19
IMAGE 301
SELECT NC DATA.　　　　　　FD
　　　　　　　　　　　　　　　HD
| PANEL-1 | PANEL-2 | PANEL-3 |
| --- | --- | --- |
| -------- | -------- | -------- |
END
IMAGE 302
IS THIS THE PRODUCT?
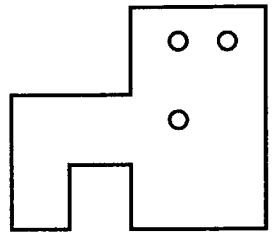
PANEL-1
1992. 02. 01 14:00　　RETURN  NEXT
SPC 2.3
IMAGE 303　　　　　　　　　303a
HAS WORK BEEN SET ? (SPC2.3)
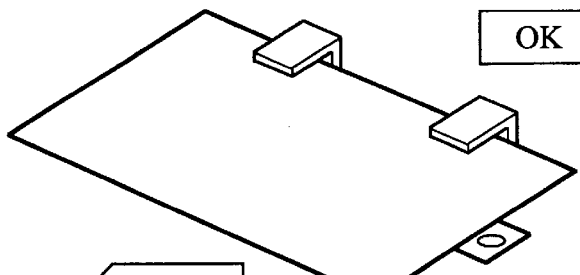
OK
RETURN

FIG.20
IMAGE 304
ADJUST PRESSURE OF ASSIST GAS.
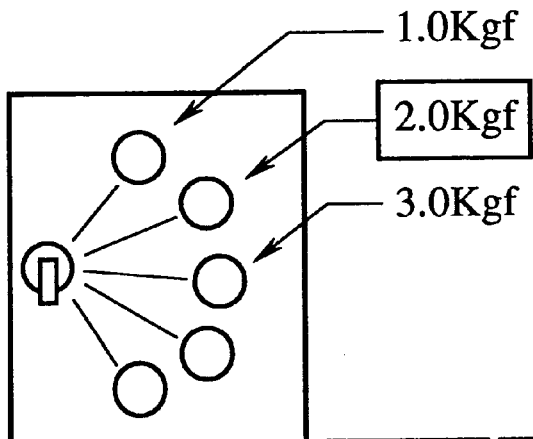
1.0Kgf
2.0Kgf
3.0Kgf
RETURN  OK
IMAGE 305
ADJUST FOCAL POSITION.
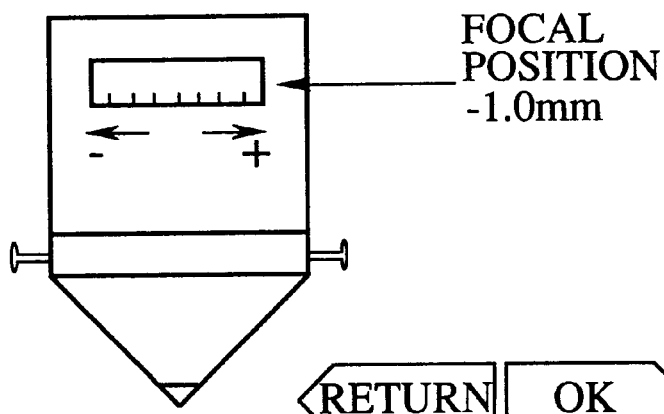
FOCAL POSITION
-1.0mm
RETURN  OK

FIG.21

[CONDITIONAL CONTENTS] SPC1.0

[MATERIAL NAME]:SPC1.0  :[PIERCE No.] :101

[MATERIAL] :SPC  :[PLATE THICKNESS]:1.0 :

[MATERIAL INFORMATION] STANDARD/PLATE/THICKNESS/CLEAN/ALUMINUM

[PROCESSING HEAD] 1/2/3/4/5

[WATER NOZZLE] ON/OFF

| CONDITION No. | SPEED [P] | OUTPUT [S] | FREQUENCY | DUTY | GAS PRESSURE | GAS KIND | SWITCHING TIME | NOZZLE GAP | CORRECTING AMOUNT [mm] | EDGE DATA | ARPO DATA | FOCAL POINT [nn] | PALACE TYPE |
|---|---|---|---|---|---|---|---|---|---|---|---|---|---|
| 1 | 200 | 3600 | 100 | 10 | 2.0 | 2 | 0 | 0 | 0.16 | 0 | 0 | 0 | 0 |
| 2 | 1000 | 3600 | 600 | 20 | 2.0 | 2 | 0 | 0 | 0.16 | 0 | 0 | 0 | 0 |
| 3 | 4000 | 700 | 0 | 100 | 1.0 | 1 | 0 | 0 | 0.16 | 0 | 0 | 0 | 0 |
| 4 | 5000 | 800 | 0 | 100 | 1.0 | 1 | 0 | 0 | 0.10 | 0 | 0 | 0 | 0 |
| 5 | | | | | | | | | | | | | |
| 6 | | | | | | | | | | | | | |
| 7 | | | | | | | | | | | | | |
| 8 | | | | | | | | | | | | | |
| 9 | | | | | | | | | | | | | |
| MARKING-OFF | | | | | | | | | | | | | |
| 10 | 9000 | 900 | 1000 | 60 | 1.0 | 6 | 0 | 0 | 0 | 0 | 0 | 0 | 0 |

CONTROL METHOD AND APPARATUS FOR PLATE MATERIAL PROCESSING MACHINE

BACKGROUND OF THE INVENTION

1. Field of the Invention

The present invention relates to a control method and a controller for controlling the operation of a laser processing machine for performing laser processing of a work, such as cutting, punching and the like, and the operation of other plate material processing machines such as a punch press and the like.

More particularly, the present invention firstly relates to a state display method and a state display unit of the plate material processing machine for displaying on a display screen of the display unit an operating state of the plate material processing machine such as a position state of a positioning pin used in positioning of the work in a predetermined position, and an operating state of a work clamping device for gripping the work and the like.

The present invention secondly relates to a position setting method and a position setting device of a movable member in the plate material processing machine in which a position setting operation by a manual input for moving the movable member such as a work table, a laser processing head and the like to an arbitrary position can be easily realized on the display screen of the display unit, e.g., when the position of a processing reference point is set to an arbitrary position on the work and the like.

The present invention thirdly relates to an operating state setting method and an operating state setting device of the laser processing machine in which plural keys respectively having allocated functions different from each other are displayed together or selectively on the display screen of the display unit, and a setting operation for changing an operating state of the laser processing machine can be easily realized on the display screen of the display unit by selectively allowing the input of a corresponding key among these plural keys every operating stage.

The present invention fourthly relates to a processing condition display method and a processing i condition display unit of the laser processing machine in which a setting operation of various kinds of processing conditions can be smoothly performed even by an operator having little experience by displaying processing condition data such as the various kinds of processing conditions and an image of a set object portion and the like on the display screen of the display unit when the various kinds of processing conditions such as a kind and a pressure of an assist gas are set prior to laser processing such that the various kinds of processing conditions are adapted to a combination of a material of the work as a processed object and a plate thickness.

The present invention fifthly relates to an operating state setting method and an operating state setting device of the laser processing machine which has an expert mode requiring a detailed operating procedure for an expert and a beginner mode requiring a simple operating procedure for a beginner and can be constructed by selectively switching these two modes in accordance with a learning degree of the operator so that a setting operation for changing the operating state of the laser processing machine can be easily realized by both the expert and the beginner.

2. Prior Art

For example, in a conventional known laser processing machine, a work table arranging a work thereon is moved forward and backward and a laser processing head is moved leftward and rightward so that a desirable processing treatment such as cutting, punching and the like is taken with respect to the work. Further, in a conventional known punch press, for example, a work clamping device gripping the work is moved in two directions composed of forward-backward and rightward-leftward directions and a desirable processing position on the work is positioned between a punch and a die so that a desirable processing treatment of punching, molding and the like is taken with respect to the work.

In these plate material processing machines, a positioning pin used in positioning of the work in a predetermined position and the work clamping device for gripping the work and the like are arranged.

The above positioning pin is lowered by manually operating a manual lever by an operator at a sending-in time of the work such that an upper portion of the pin is located downward from an upper face of the work table. When the work is completely sent in, the positioning pin is raised such that the upper portion of the pin is projected from the upper face of the work table. Thus, at the sending-in time of the work, the work is smoothly sent in without colliding the work with the positioning pin. When the work is completely sent in, the work hits against the positioning pin so that the work can be positioned in a predetermined position.

The above work clamping device is constructed by a clamping base attached to the work table and a clamping presser vertically movable with respect to this clamping base. This work clamping device is raised by a switching operation of the operator to a position in which the clamping presser is separated from the clamping base at the sending-in time of the work. When the work is completely sent in and is positioned in the predetermined position, the work clamping device is operated such that the clamping presser is lowered to a position approaching the clamping base and grips the work. Thus, when the work is sent in, the work is smoothly sent in without colliding the work with the clamping presser. When the work is completely sent in and is located in the predetermined position, the work can be gripped with a predetermined clamping force.

The following technique is generally used to recognize the position state of the above positioning pin and the operating state of the work clamping device by the operator of the plate material processing machine. Namely, the position state of the positioning pin is recognized by directly visualizing by the operator whether the upper portion of the pin is projected from the upper face of the work table or not. In contrast to this, with respect to the operating state of the work clamping device, a detecting means for detecting existence or nonexistence of an operation of the operator is arranged in a switch for designating a vertical movement of the clamping presser in the work clamping device. The operating state of the work clamping device is displayed by turning a lamp on and off on the basis of a detecting signal from this detecting means. The operating state of the work clamping device is recognized by visualizing by the operator that this lamp is turned on and off, or directly visualizing the operating state of the work clamping device by the operator.

However, in the above conventional plate material processing machine, the following various kinds of problems exist when the operator of the plate material processing machine recognizes the operating state of the plate material processing machine such as the position state of the positioning pin and the operating state of the work clamping device and the like.

Namely, in the technique for recognizing the operating state of the plate material processing machine by the direct visualization of the operator, there is a case in which the operator must take a posture for moving this operating state to a position easily visualized or a posture for looking-in this operating state. In this case, a physical burden of the operator tends to be increased.

Further, in the technique for recognizing the operating state of the plate material processing machine by visualizing the turning on and off of the lamp by the operator, the operator must memorize information for associating a turning-on state and a turning-off state of the lamp with the operating state of the plate material processing machine. Otherwise, the operator must recognize this associated information together with the turning-on state and the turning-off state of the lamp and judge the operating state of the plate material processing machine by collating this associated information with turning on and off information of the lamp obtained by the visualization. Accordingly, a complicated procedure is required to recognize the operating state of the plate material processing machine. Therefore, this operating state cannot be intuitively recognized so that the operator must bear an additional burden. In consideration of such a real situation, the development of a novel technique capable of easily recognizing the operating state of the plate material processing machine by the operator by displaying this operating state in a form intuitively easy even for a beginner to understand has been desired for a long time between the persons concerned.

Further, with respect to the above plate material processing machine, for example, there is a requirement in which a movable member such as the work table, the laser processing head and the like is moved to an arbitrary position when the position of a processing reference point is set to an arbitrary position on the work and the like.

To satisfy this requirement, the conventional plate material processing machine has various kinds of keys capable of performing a position setting operation by a manual input on an operation panel of an NC controller (an NC device) of this plate material processing machine. These various kinds of keys will next be explained by using a laser processing machine as an example of the plate material processing machine. The various kinds of keys are constructed by a "manual" mode selecting key, an "MDi" mode selecting key and a moving key such as "+X", "+Y", "+Z", "−X", "−Y", "−Z" and the like. The "manual" mode selecting key selects a mode for moving the movable member to an arbitrary position by a manual operation. The "MDi" mode selecting key selects a mode for inputting NC data by manually inputting and operating various kinds of keys such as a ten key, an alphabet key and the like arranged on the operation panel and moving the movable member along a predetermined path in accordance with the inputted NC data. The moving key is used when the "manual" mode selecting key is selected and inputted and the like. This moving key designates operations for setting a moving direction and a moving distance of the movable member.

In the position setting operation performed when the operator selects and inputs the above "manual" mode selecting key, the movable member as a moving object is first selected and the operator pushes down the movable key such as "+X" and the like corresponding to a moving direction of the movable member. Thus, an X-axis drive motor is rotated for only a continuous pushing-down time so that the movable member can be moved by a distance corresponding to this rotating time.

In contrast to this, in the position setting operation performed when the operator operates and inputs the "MDi" mode selecting key, a moving program capable of moving the movable member as a moving object until a position to be moved is made and is manually inputted and executed. Thus, each axis drive motor for moving a corresponding shaft is rotated so that the movable member can be moved until the position to be moved.

However, in the above position setting method of the movable member in the conventional plate material processing machine, a setting operation for moving the movable member until the position to be moved is complicated and it is difficult to smoothly perform this setting operation except for a skilled operator so that plural problems to be solved exist.

These problems will next be described. First, when the movable member is moved from the present position to a certain position in a technique for directly moving the movable member by a manual operating input of the "manual" mode selecting key and the like, these positions are not located on a certain one axis such as an X-axis, a Y-axis and the like in many cases. Therefore, it is necessary to move the movable member from the present position to a certain position while moving keys for controlling movements in mutual different axial directions are alternately operated such that a locus of the movable member is formed in a stepwise shape. However, this operation is very complicated. Further, in this operation, a moving state of the movable member must be visualized by turning of the operator's eyes upon the movable member while the operator operates a predetermined moving key. Accordingly, a considerable skill is required to smoothly perform this operation.

In contrast to this, in a technique for manually operating and inputting the "MDi" mode selecting key and the like and moving the movable member in accordance with the made moving program, it is necessary to obtain the relation of both the present and certain positions in a coordinate form in a certain relative coordinate system so as to make the moving program capable of moving the movable member from the present position to the certain position. Therefore, it is necessary to make an additional work of measuring a size along each axis in the above relative coordinate system between both the positions by using a scale and the like so that this measuring work is very complicated. Further, when the above moving program is made, a corresponding program language must be learned and skilled so that a considerable skill is required to make a correct moving program for a short time.

In consideration of such a real situation, the development of a novel technique capable of easily moving the movable member until an arbitrary position even by an operator having little experience by using an operating form intuitively easy even for a beginner to understand as a setting operation for moving the movable member in the plate material processing machine until the arbitrary position has been desired for a long time between the persons concerned.

Further, the above laser processing machine generally has the NC controller. The NC controller performs a setting operation for changing the operating state of the laser processing machine to an arbitrary state. The NC controller also gives commands for changing the operating state of the laser processing machine to the set state. The NC controller further monitors the operating state of the laser processing machine and fulfills duties for informing the operator of this operating state by turning a lamp on and off and the like. Plural keys respectively having allocated functions different from each other are arranged on the operation panel of this NC controller. A setting operation for changing the operating state of the laser processing machine to an arbitrary state is performed by selectively operating and inputting these plural keys by the operator.

For example, the above plural keys include a ten key having an allocated function for inputting Arabic numerals, an alphabet key having an allocated function for inputting an alphabet, and an "automatic" mode selecting key having an allocated function for executing an NC processing program describing a processing procedure with respect to a certain product. The above plural keys also include a "manual" mode selecting key having an allocated function for moving the movable member such as the work table and the laser processing head and the like to an arbitrary position by a manual input operation. The above plural keys also include an "editing" mode selecting key having an allocated function for editing an NC processing program. The above plural keys also include an "MDi" mode selecting key having an allocated function for inputting NC data by a manual input operation of the ten key and the alphabet key and the like and moving the movable member along a predetermined path in accordance with the inputted NC data. The above plural keys also include an "origin return" mode selecting key having an allocated function for moving the movable member to an original position. The above plural keys also include a moving key such as "+X", "+Y", "+Z", "−X", "−Y", "−Z" and the like. This moving key is used when the "origin return" mode selecting key or the "manual" mode selecting key is selectively inputted and the like. The moving key has an allocated function for designating operations for setting a moving direction and a moving distance of the movable member. The above plural keys also include a "start" key used when the "automatic" or "MDi" mode selecting key is selectively inputted and the like. The "start" key has an allocated function for designating an operation for executing a predetermined operation in the selected mode. The above plural keys further include a "stop" key used when the "automatic" or "manual" mode selecting key is selectively inputted and the like. The "stop" key has an allocated function for designating operational stoppage in the selected mode.

Here, when the operator selectively inputs the above "automatic" mode selecting key, the NC processing program describing the processing procedure about a certain product is executed by subsequently selecting and inputting the "start" key. Thus, the movable member can be moved in the procedure according to this NC processing program.

When the operator then selectively inputs the above "manual" mode selecting key, the moving key such as "+X" corresponding to a moving direction of the movable member is subsequently pushed down so that an Xaxis drive motor is rotated for only a continuous pushing-down time. Thus, the movable member can be moved by a distance corresponding to this rotating time.

However, in the above method for setting the operating state of the conventional laser processing machine, when an arbitrary key is selectively inputted by an operator having little experience from the plural keys at an initial stage providing a first key input, there is a fear that this key input is considered to be invalidated so that an error is displayed. Otherwise, when an arbitrary key is selectively inputted by the above operator at a secondary stage after the key input at the above initial stage, there is also a fear that this key input is similarly considered to be invalidated so that an error is displayed. Accordingly, it is difficult to smoothly perform this setting operation unless the operator is skilled.

This problem will next be described. In general, the plural keys arranged on the operation panel of the NC controller are mainly divided in attribute into a headline key such as the "automatic" or "manual" mode selecting key for allowing an input at the initial stage, and a secondary key such as the moving key constructed by the "start" key or the "+X" key and the like and allowing an input at the secondary stage. This means that, when the secondary key is selectively inputted at the initial stage or the headline key is selectively inputted at the secondary stage, these key inputs are considered to be invalidated. This invalidation causes the above-mentioned situation. To avoid generation of this situation, it is necessary for an operator to learn and master all kinds of keys allowing the operating input every operating stage and execute the key input in an exact procedure corresponding to desirable set contents. Accordingly, a considerable skill is required to smoothly perform an operation for setting the moving state of the laser processing machine.

In consideration of such a real situation, the development of a novel technique capable of easily setting the operating state of the laser processing machine even by an operator having little experience has been desired for a long time between the persons concerned.

Further, in the above laser processing machine, it is necessary to set various kinds of processing conditional values such as a kind and a pressure of an assist gas, the focal length of a condenser lens arranged within the laser processing head, the aperture of a laser irradiating nozzle, an aperture of the condenser lens and the like to appropriate values adapted to a combination of a material of the work and a plate thickness in advance before a laser processing treatment is executed. This is because the above various kinds of processing conditions as optimum for the work material and the plate thickness are respectively different from each other.

Therefore, the operator of the laser processing machine conventionally sees a processing condition table described in an instruction manual before the laser processing treatment is executed. Otherwise, this operator selects a conditional value considered as an optimum value on the basis of a past experience and makes a setting work with this selected value as a set value in a set object portion of the various kinds of processing conditions.

However, it is complicated to see the processing condition table described in the instruction manual every time the setting work of a processing condition of the above conventional laser processing machine is made. Therefore, an incorrect set value is carelessly set, or the laser processing treatment is executed without updating the set value to an original value in a certain case. As a result, there is a fear that no original processing performance of the laser processing machine can be fulfilled.

In the setting work of the processing condition of the laser processing machine, only a skilled operator can select a value considered as optimum on the basis of a past experience. An operator having little experience sets various kinds of processing conditions by repeating trial and error in the actual situation while this operator reads a corresponding portion of the instruction manual and searches a set object portion. Therefore, it is difficult to smoothly perform this setting operation unless the operator is skilled. Accordingly, the development of a novel technique capable of smoothly performing the setting operation of the various kinds of processing conditions of the laser processing machine even by an operator having little experience and fulfilling an original processing performance of the laser processing machine as a result has been desired for a long time between the persons concerned.

The above laser processing machine generally has an NC controller for executing a setting operation for changing the operating state of the laser processing machine to a desirable state. The NC controller gives commands for changing the operating state of the laser processing machine to the set state. The NC controller further monitors this operating state and fulfills duties for informing this operating state of an operator by turning a lamp on and off and the like. Plural keys respectively having allocated functions different from each other are arranged on an operation panel of this NC controller. The operator selectively operates sequentially and inputs a key corresponding to the above desirable state among these plural keys so that a setting operation for changing the operating state of the laser processing machine to the desirable state is performed.

For example, the above plural keys include a ten key having an allocated function for inputting Arabic numerals, an alphabet key having an allocated function for inputting an alphabet, and an "automatic" mode selecting key having an allocated function for executing an NC processing program describing a processing procedure with respect to a certain product. The above plural keys also include a "manual" mode selecting key having an allocated function for moving the movable member such as the work table and the laser processing head and the like to a desirable position by a manual input operation. The above plural keys also include an "editing" mode selecting key having an allocated function for editing an NC processing program. The above plural keys also include an "MDi" mode selecting key having an allocated function for inputting NC data by a manual input operation of the ten key and the alphabet key and the like and moving the movable member along a predetermined path in accordance with the inputted NC data. The above plural keys also include an "origin return" mode selecting key having an allocated function for returning the movable member to an original position. The above plural keys also include a moving key such as "+X", "+Y", "+Z", "−X", "−Y", "−Z" and the like. This moving key is used when the "origin return" mode selecting key or the "manual" mode selecting key is selectively inputted and the like. The moving key has an allocated function for designating operations for setting a moving direction and a moving distance of the movable member. The above plural keys also include a "start" key used when the "automatic" or "MDi" mode selecting key is selectively inputted and the like. The "start" key has an allocated function for designating an operation for executing a predetermined operation in the selected mode. The above plural keys further include a "stop" key used when the "automatic" or "manual" mode selecting key is selectively inputted and the like. The "stop" key has an allocated function for designating operational stoppage in the selected mode.

A key input operating procedure of the operator will next be explained by using the conventional NC controller having the above various kinds of keys when the movable member is moved to a desirable position by a manual operation. First, when the "stop" key is inputted and operated, a movement of the movable member is completely stopped. Further, when the "manual" mode selecting key is inputted and operated, an operating mode of the NC controller is switched to a manual mode for moving the movable member to the desirable position by a manual input key operation. When the movable key such as "+X" and the like corresponding to a moving direction of the movable member is pushed down, an X-axis drive motor is rotated for only a continuous pushing-down time so that the movable member is moved by a distance corresponding to this rotating time.

However, in the above setting method of the operating state of the conventional laser processing machine, a complicated work of sequentially operating and inputting a corresponding key among the plural keys in accordance with a procedure determined in advance is generally required to satisfy various requirements such as the movement of the movable member by a manual operation. When an incorrect key is selected and inputted by an operator having little experience at a certain key input operating stage at this working time, there is a fear that this key input is considered to be invalidated and an error is displayed and the like. Accordingly, it is difficult to smoothly perform this setting operation unless the operator is skilled.

In contrast to this, the skilled operator can execute a key input in an exact procedure corresponding to desirable set contents if the operating procedure is a conventional procedure. However, when a novel operating procedure is introduced to solve the above problem, the skilled operator has resistance against abandonment of the operating procedure skillfully used familiarly so far and memorization of a new operating procedure. Accordingly, it takes time to get used to this novel operating procedure so that working efficiency in a period for learning and mastering this novel operating procedure is reduced. In consideration of such a real situation, the development of a novel technique capable of easily setting the operating state of the laser processing machine by both the skilled operator and the operator having little experience has been desired for a long time between the persons concerned.

SUMMARY OF THE INVENTION

To solve the above-mentioned problems, a first object of the present invention is to provide a state display method and a state display unit of a plate material processing machine for displaying an operating state of the plate material processing machine such as a position state of a positioning pin used in positioning of a work in a predetermined position, an operating state of a work clamping device for gripping the work and the like on a display screen of the display unit in a form intuitively easy even for a beginner to understand so that an operator can easily recognize the operating state of the plate material processing machine. n-A second object of the present invention is to provide a position setting method and a position setting device of a movable member in the plate material processing machine in which a position setting operation by a manual input for moving the movable member such as a work table, a laser processing head and the like to an arbitrary position can be easily realized on the display screen of the display unit, e.g., when the position of a processing reference point is set to an arbitrary position on the work and the like.

A third object of the present invention is to provide an operating state setting method and an operating state setting device of the laser processing machine in which a man-machine-interface as a contact between the laser processing machine and an operator is constructed in a display form intuitively easy even for a beginner to understand, and plural keys respectively having allocated functions different from each other are displayed together or selectively on the display screen of the display unit, and a setting operation for changing an operating state of the laser processing machine can be easily realized on the display screen of the display unit by selectively allowing the input of a corresponding key among these plural keys every operating stage.

A fourth object of the present invention is to provide a processing condition display method and a processing condition display unit of the laser processing machine in which a setting operation of various kinds of processing conditions can be smoothly performed even by an operator having little experience by displaying processing condition data such as the various kinds of processing conditions and an image of a set object portion and the like on the display screen of the display unit when the various kinds of processing conditions are set prior to laser processing such that the various kinds of processing conditions are adapted to a combination of a material of the work as a processed object and a plate thickness.

A fifth object of the present invention is to provide an operating state setting method and an operating state setting device of the laser processing machine which has an expert mode requiring a detailed operating procedure for an expert and a beginner mode requiring a simple operating procedure for a beginner and is constructed by selectively switching these two modes in accordance with a learning degree of the operator so that a setting operation for changing the operating state of the laser processing machine can be easily realized by both the expert and the beginner.

To achieve the above first object, a first invention of the present application resides in a state display method of a plate material processing machine having display means for displaying an operating state of the plate material processing machine on a display screen and constructed such that the operating state of said plate material processing machine is monitored at any time; and the operating state of said plate material processing machine obtained as a result of this monitoring is displayed in real time such that an image of this plate material processing machine itself is regenerated on the display screen of said display means.

In accordance with this invention, the operating state of the plate material processing machine is monitored at any time, and the operating state of the plate material processing machine obtained as a result of this monitoring is displayed in real time such that an image of the plate material processing machine itself is regenerated on the display screen of the display means. Accordingly, the operating state of the plate material processing machine is displayed on the display screen of the display means in the form of an image intuitively easy even for a beginner to understand. As a result, an operator can easily recognize the operating state of the plate material processing machine.

A first modifying form of the above first invention resides in a state display method of a plate material processing machine having display means for displaying an operating state of the plate material processing machine on a display screen and constructed such that an image of said plate material processing machine itself is stored in advance every plural operating states; the operating state of said plate material processing machine is monitored at any time; an image of the plate material processing machine itself corresponding to the operating state of said plate material processing machine obtained as a result of this monitoring is read from said stored contents; and the read image is displayed in real time such that this read image is regenerated on the display screen of said display means.

In accordance with this first modifying form, an image of the plate material processing machine itself is first stored in advance every plural operating states. The operating state of the plate material processing machine is monitored at any time. The image of the plate material processing machine itself corresponding to the operating state of the plate material processing machine obtained as a result of this monitoring is read from said stored contents. This read image is displayed in real time such that this read image is regenerated on the display screen of the display means. Accordingly, the operating state of the plate material processing machine is displayed on the display screen of the display means in the form of an image intuitively easy even for a beginner to understand. As a result, an operator can easily recognize the operating state of the plate material processing machine.

Furthermore, a second modifying form of the above first invention resides in a state display method of a plate material processing machine having display means for displaying an operating state of the plate material processing machine on a display screen and constructed such that the operating state of said plate material processing machine is monitored at any time and an image of this plate material processing machine itself is picked up; and the operating state of said plate material processing machine obtained as a result of this monitoring is displayed in real time such that said picked-up moving image of the plate material processing machine itself is regenerated on the display screen of said display means.

In accordance with said second modifying form, the operating state of the plate material processing machine is monitored at any time and an image of the plate material processing machine itself is picked up. The operating state of the plate material processing machine obtained as a result of this monitoring is displayed in real time such that said picked-up moving image of the plate material processing machine itself is regenerated on the display screen of the display means. Accordingly, the operating state of the plate material processing machine is displayed on the display screen of the display means in the form of a moving image intuitively easy even for a beginner to understand. As a result, an operator can easily recognize the operating state of the plate material processing machine.

The operating state of said plate-material processing machine includes the position state of a positioning pin used when a work is positioned in a predetermined position. In this case, for example, the operating state of the plate material processing machine including the position state of the positioning pin is displayed on the display screen of the display means in the form of a position image of the positioning pin intuitively easy even for a beginner to understand. As a result, the operator can recognize the operating state of the plate material processing machine including the position state of the positioning pin at a look.

Further, the operating state of said plate material processing machine includes the operating state of a work clamping device for gripping a work. In this case, for example, the operating state of the plate material processing machine including the operating state of the work clamping device is displayed on the display screen of the display means in the form of an opening-closing image of the work clamping device intuitively easy even for a beginner to understand. As a result, the operator can recognize the operating state of the plate material processing machine including the operating state of the work clamping device at a look.

A second aspect of said first invention resides in a state display unit of a plate material processing machine comprising display means for displaying an operating state of the plate material processing machine on a display screen and comprising monitoring means for monitoring the operating state of said plate material processing machine at any time; and display control means for performing control for displaying the operating state of said plate material processing machine obtained as a result of the monitoring in the monitoring means in real time such that an image of the plate material processing machine itself is regenerated on the display screen of said display means.

In accordance with the second aspect, the monitoring means monitors the operating state of the plate material processing machine at any time. The operating state of the plate material processing machine obtained as a result of this monitoring is displayed by the display control means in real time such that an image of the plate material processing machine itself is regenerated on the display screen of the display means. Accordingly, the operating state of the plate material processing machine is displayed on the display screen of the display means in the form of an image intuitively easy even for a beginner to understand. As a result, an operator can easily recognize the operating state of the plate material processing machine.

A first modifying form of the above second aspect resides in a state display unit of a plate material processing machine having display means for displaying an operating state of the plate material processing machine on a display screen and comprising monitoring means for monitoring the operating state of said plate material processing machine at any time; image storing means for storing an image of said plate material processing machine itself every plural operating states; image reading means for reading an image of the plate material processing machine itself corresponding to the operating state of said plate material processing machine obtained as a result of the monitoring in said monitoring means from stored contents of the image storing means; and display control means for performing control for displaying the image read by the image reading means in real time such that this read image is regenerated on the display screen of said display means.

In the first modifying form of the above second aspect, the image storing means first stores an image of the plate material processing machine itself in advance every plural operating states. The monitoring means monitors the operating state of the plate material processing machine at any time. The image reading means reads an image of the plate material processing machine itself corresponding to the operating state of said plate material processing machine obtained as a result of the monitoring in the monitoring means from stored contents of the image storing means. This read image is displayed by the display control means in real time such that this read image is regenerated on the display screen of the display means. Accordingly, the operating state of the plate material processing machine is displayed on the display screen of the display means in the form of an image intuitively easy even for a beginner to understand. As a result, an operator can easily recognize the operating state of the plate material processing machine.

A second modifying form of the above second aspect resides in a state display unit of a plate material processing machine having display means for displaying an operating state of the plate material processing machine on a display screen and comprising monitoring means for monitoring the operating state of said plate material processing machine at any time; image pickup means for picking up an image of said plate material processing machine itself; and display control means for performing control for displaying the operating state of said plate material processing machine obtained as a result of the monitoring in said monitoring means in real time such that a moving image of the plate material processing machine itself picked up by said image pickup means is regenerated on the display screen of said display means.

In accordance with this second modifying form, the monitoring means first monitors the operating state of the plate material processing machine at any time. The image pickup means picks up an image of the plate material processing machine itself. The operating state of the plate material processing machine obtained as a result of the monitoring of the monitoring means is displayed by the display control means in real time such that a moving image of the plate material processing machine itself picked up by the image pickup means is regenerated on the display screen of the display means. Accordingly, the operating state of the plate material processing machine is displayed on the display screen of the display means in the form of a moving image intuitively easy even for a beginner to understand. As a result, an operator can easily recognize the operating state of the plate material processing machine.

The operating state of said plate material processing machine includes the position state of a positioning pin used when a work is positioned in a predetermined position. In this case, for example, the operating state of the plate material processing machine including the position state of the positioning pin is therefore displayed on the display screen of the display means in the form of a position image of the positioning pin intuitively easy even for a beginner to understand. As a result, the operator can recognize the operating state of the plate material processing machine including the position state of the positioning pin at a look.

The operating state of said plate material processing machine includes the operating state of a work clamping device for gripping a work.

In this case, for example, the operating state of the plate material processing machine including the operating state of the work clamping device is displayed on the display screen of the display means in the form of an opening-closing image of the work clamping device intuitively easy even for a beginner to understand. As a result, the operator can recognize the operating state of the plate material processing machine including the operating state of the work clamping device at a look.

To achieve the above second object, a second invention of the present application resides in a position setting method of a movable member in a plate material processing machine for performing a position setting operation for moving the movable member to an arbitrary position and constructed such that the movable member as a moving object is selected in advance; the present position of the selected movable member is displayed on the display screen of display means in a combining form of a relative coordinate covering a moving range of the movable member and an index that represents the position of the movable member arranged at the relative coordinate; and when an operator touches the display screen of the display means in an arbitrary position at said relative coordinate, the touching position by this manual input is considered as a moving object setting position of the movable member.

In accordance with this second invention, the present position of the movable member selected as a moving object is displayed on the display screen of display means in a combining form of a relative coordinate covering a moving range of the movable member and an index that represents the position of the movable member arranged at the relative coordinate. When an operator touches the display screen of this display means in an arbitrary position at the relative coordinate, the touching position by this manual input is considered as a moving object setting position of the movable member. Thus, a setting operation for positioning the movable member in an arbitrary moving object position is performed by simultaneously displaying the index that represents the position of the movable member at the relative coordinate on the display screen of the display means and designating an arbitrary position by a manual input operation of the operator at this relative coordinate. Accordingly, a man-machine-interface as a contact between the plate material processing machine and the operator can be constructed in a form intuitively easy even for a beginner to understand. As a result, it is possible to realize a position setting operation of the movable member in the plate material processing machine having extremely excellent operability.

A first modifying form of the above second invention resides in a position setting method of a movable member in a plate material processing machine for performing a position setting operation for moving the movable member to an arbitrary position and constructed such that the movable member as a moving object is selected in advance; the present position of the selected movable member is displayed on the display screen of display means in a combining form of a relative coordinate covering a moving range of the movable member and an index that represents the position of the movable member arranged at the relative coordinate; and when an operator drag-moves said index displayed on the display screen of the display means until an arbitrary position at said relative coordinate, the index is displayed in the drag-moving position by this manual input and this drag-moving position is considered as a moving object setting position of the movable member.

In accordance with this first modifying form, the present position of the movable member selected as a moving object is displayed on the display screen of display means in a combining form of a relative coordinate covering a moving range of the movable member and an index that represents the position of the movable member arranged at the relative coordinate. When an operator drag-moves the index displayed on the display screen of this display means until an arbitrary position at the relative coordinate, the index is displayed in the drag-moving position by this manual input and this drag-moving position is considered as a moving object setting position of the movable member. Thus, a setting operation for positioning the movable member in an arbitrary moving object position is performed by simultaneously displaying the index that represents the position of the movable member at the relative coordinate on the display screen of the display means and drag-moving the index until an arbitrary position by a manual input operation of the operator at this relative coordinate. Accordingly, it is possible to realize a position setting operation of the movable member in the plate material processing machine having extremely excellent operability.

Furthermore, a second modifying form of the above second invention resides in a position setting method of a movable member in a plate material processing machine constructed such that the movable member is moved to an arbitrary position by setting the position of a processing reference point to an arbitrary position on a work by a manual input; the present position of said processing reference point is displayed on the display screen of display means in a combining form of a relative coordinate covering a range capable of setting the processing reference point and an index that represents the position of the processing reference point arranged at the relative coordinate; and when an operator touches the display screen of the display means in an arbitrary position at said relative coordinate, the touching position by this manual input is considered as a setting object position of the processing reference point and said movable member is moved until the setting object position.

In accordance with this second modifying form, the present position of the processing reference point is displayed on the display screen of display means in a combining form of a relative coordinate covering a range capable of setting the processing reference point and an index that represents the position of the processing reference point arranged at the relative coordinate. When an operator touches the display screen of this display means in an arbitrary position at the relative coordinate, the touching position by this manual input is considered as a setting object position of the processing reference point and the movable member is moved until this setting object position. Thus, a setting operation for positioning the movable member in an arbitrary moving object position is performed by simultaneously displaying the index that represents the position of the processing reference point at the relative coordinate on the display screen of the display means and designating an arbitrary position by a manual input operation of the operator at this relative coordinate. The movable member is moved until this moving object position. Accordingly, it is possible to realize a position setting operation of the movable member in the plate material processing machine having extremely excellent operability.

Further, a third modifying form of the second invention resides in a position setting method of a movable member in a plate material processing machine constructed such that the movable member is moved to an arbitrary position by setting the position of a processing reference to an arbitrary position on a work by a manual input; NC data relative to a product as a processed object are called in advance; the present position of said processing reference is displayed on the display screen of display means in a combining form of a relative coordinate covering a range capable of setting the processing reference and a product image similar to said product obtained from said called NC data and arranged at the relative coordinate; and when an operator drag-moves said product image displayed on the display screen of the display means until an arbitrary position at said relative coordinate, the product image is displayed in the drag-moving position by this manual input and this drag-moving position is considered as a setting object position of the processing reference and said movable member is moved until the setting object position.

In accordance with this third modifying form, NC data relative to a product as a processed object are first called. Subsequently, the present position of the processing reference is displayed on the display screen of display means in a combining form of a relative coordinate covering a range capable of setting the processing reference and a product image similar to the product obtained from said called NC data and arranged at this relative coordinate. When an operator drag-moves the product image displayed on the display screen of this display means until an arbitrary position at the relative coordinate, the product image is displayed in the drag-moving position by this manual input and this drag-moving position is considered as a setting object position of the processing reference and the movable member is moved until this setting object position. Thus, a setting operation for positioning the processing reference in an arbitrary moving object position is performed by simultaneously displaying the product image at the relative coordinate on the display screen of the display means and drag-moving the product image until an arbitrary position by a manual input operation of the operator at this relative coordinate. The movable member is moved until this moving object position. Accordingly, it is possible to realize a position setting operation of the movable member in the plate material processing machine having extremely excellent operability.

Said product image displayed in said drag-moving position can be continuously displayed on the display screen of said display means until a work clamping device for gripping said work releases this work even when processing relative to the product image is terminated. In this case, the product image displayed in the drag-moving position is continuously displayed on the display screen of the display means until the work clamping device for gripping the work releases this work even when the processing relative to the product image is terminated. Accordingly, an error of resetting the processing reference position to a cut position of the product already cut from the work is prevented in advance.

A second aspect of the above second invention resides in a position setting device of a movable member in a plate material processing machine for performing a position setting operation for moving the movable member to an arbitrary position and comprising moving object selecting means for selecting the movable member as a moving object; display control means for performing control for displaying the present position of the movable member selected by the moving object selecting means on the display screen of display means in a combining form of a relative coordinate covering a moving range of the movable member and an index that represents the position of the movable member arranged at the relative coordinate; and position taking-in means for taking-in a touching position of an operator by a manual input as a moving object setting position of the movable member when the operator touches the display screen of said display means in an arbitrary position at said relative coordinate displayed on the display screen by the display control means.

In accordance with this second aspect, the moving object selecting means first selects the movable member as a moving object. The present position of the movable member selected by the moving object selecting means is displayed by the display control means on the display screen of display means in a combining form of a relative coordinate covering a moving range of the movable member and an index that represents the position of the movable member arranged at this relative coordinate. When the operator touches the display screen of this display means in an arbitrary position at the relative coordinate, the touching position of the operator by this manual input is taken as a moving object setting position of the movable member into the position taking-in means. Thus, a setting operation for positioning the movable member in an arbitrary moving object position is performed by simultaneously displaying the index that represents the position of the movable member at the relative coordinate on the display screen of the display means and designating an arbitrary position by a manual input operation of the operator at this relative coordinate. Accordingly, a man-machine-interface as a contact between the plate material processing machine and the operator can be constructed in a form intuitively easy even for a beginner to understand. As a result, it is possible to realize a position setting operation of the movable member in the plate material processing machine having extremely excellent operability.

Furthermore, a first modifying form of the above second aspect resides in a position setting device of a movable member in a plate material processing machine for performing a position setting operation for moving the movable member to an arbitrary position and comprising moving object selecting means for selecting the movable member as a moving object; display control means for performing control for displaying the present position of the movable member selected by the moving object selecting means on the display screen of display means in a combining form of a relative coordinate covering a moving range of the movable member and an index that represents the position of the movable member arranged at the relative coordinate; the display control means performing control for displaying said index displayed on the display screen of the display means in a drag-moving position by a manual input of an operator when the operator drag-moves this index until an arbitrary position at said relative coordinate; and position taking-in means for taking-in a touching position of the operator by a manual input as a moving object setting position of the movable member when the operator touches the display screen of said display means in the arbitrary position at said relative coordinate displayed on the display screen by the display control means.

In accordance with this first modifying form, the moving object selecting means first selects the movable member as a moving object. The display control means displays the present position of the movable member selected by the moving object selecting means on the display screen of display means in a combining form of a relative coordinate covering a moving range of the movable member and an index that represents the position of the movable member arranged at this relative coordinate. When the operator drag-moves the index displayed on the display screen of the display means until an arbitrary position at the relative coordinate, the display control means also displays the index in the drag-moving position by this manual input. When the operator touches the display screen of the display means in the arbitrary position at the relative coordinate by the display control means, the position taking-in means takes-in the touching position by this manual input as a moving object setting position of the movable member. Thus, a setting operation for positioning the movable member in an arbitrary moving object position is performed by simultaneously displaying the index that represents the position of the movable member at the relative coordinate on the display screen of the display means and drag-moving the index until an arbitrary position by a manual input operation of the operator at this relative coordinate. Accordingly, it is possible to realize a position setting operation of the movable member in the plate material processing machine having extremely excellent operability.

A second modifying form of the above second aspect resides in a position setting device of a movable member in a plate material processing machine constructed such that the movable member is moved to an arbitrary position by setting the position of a processing reference point to an arbitrary position on a work by a manual input, and comprising display control means for performing control for displaying the present position of said processing reference point on the display screen of display means in a combining form of a relative coordinate covering a range capable of setting the processing reference point and an index that represents the position of the processing reference point arranged at the relative coordinate; position taking-in means for taking-in a touching position of an operator by a manual input as a setting object position of the processing reference point when the operator touches the display screen of said display means in an arbitrary position at said relative coordinate displayed on the display screen by the display control means; and moving control means for moving said movable member until the setting object position taken-in by the position taking-in means.

In accordance with this second modifying form, the display control means first displays the present position of the processing reference point on the display screen of display means in a combining form of a relative coordinate covering a range capable of setting the processing reference point and an index that represents the position of the processing reference point arranged at this relative coordinate. When the operator touches the display screen of this display means in an arbitrary position at the relative coordinate, the position taking-in means takes-in the touching position by this manual input as a setting object position of the processing reference point. The moving control means then moves the movable member until the setting object position taken-in by the position taking-in means. Thus, a setting operation for positioning the movable member in an arbitrary moving object position is performed by simultaneously displaying the index that represents the position of the processing reference point at the relative coordinate on the display screen of the display means and designating an arbitrary position by a manual input operation of the operator at this relative coordinate. The movable member is moved until this moving object position. Accordingly, it is possible to realize a position setting operation of the movable member in the plate material processing machine having extremely excellent operability.

A third modifying form of the above second aspect resides in a position setting device of a movable member in a plate material processing machine constructed such that the movable member is moved to an arbitrary position by setting the position of a processing reference to an arbitrary position on a work by a manual input, and comprising NC data calling means for calling NC data relative to a product as a processed object; display control means for performing control for displaying the present position of said processing reference on the display screen of display means in a combining form of a relative coordinate covering a range capable of setting the processing reference and a product image similar to said product obtained from the NC data called by said NC data calling means and arranged at the relative coordinate; the display control means performing control for displaying said product image displayed on the display screen of the display means in a drag-moving position by a manual input of an operator when the operator drag-moves this product image until an arbitrary position at said relative coordinate; position taking-in means for taking-in the drag-moving position by this manual input as a setting object position of the processing reference when the operator drag-moves said product image displayed on the display screen of the display means by the display control means until the arbitrary position at said relative coordinate; and moving control means for moving said movable member until the setting object position takenin by the position taking-in means.

In accordance with this third modifying form, the NC data calling means first calls NC data relative to a product as a processed object. The display control means displays the present position of the processing reference on the display screen of display means in a combining form of a relative coordinate covering a range capable of setting the processing reference and a product image similar to the product obtained from the NC data called by the NC data calling means and arranged at this relative coordinate. When the operator drag--moves the product image displayed on the display screen of this display means until an arbitrary position at the relative coordinate, the display control means also displays the product image in the drag-moving position by this manual input. The position taking-in means takes-in the drag-moving position by this manual input as a setting object position of the processing reference when the operator drag-moves the product image displayed on the display screen of the display means by the display control means until the arbitrary position at the relative coordinate. The moving control means then moves the movable member until the setting object position taken-in by the position taking-in means. Thus, a setting operation for positioning the processing reference in an arbitrary moving object position is performed by simultaneously displaying the product image at the relative coordinate on the display screen of the display means and drag-moving the product image until an arbitrary position by a manual input operation of the operator at this relative coordinate. The movable member is moved until this moving object position. Accordingly, it is possible to realize a position setting operation of the movable member in the plate material processing machine having extremely excellent operability.

Said display control means can continuously display said product image displayed in said drag-moving position on the display screen of said display means until a work clamping device for gripping said work releases this work from this gripping when processing relative to the product image is terminated. In this case, the display control means continuously displays the product image displayed in the drag-moving position on the display screen of the display means until the work clamping device for gripping the work releases this work when the processing relative to this product image is terminated. Accordingly, an error of resetting the processing reference position to a cut position of the product already cut from the work is prevented in advance.

To achieve the above third object, a third invention of the present application resides in an operating state setting method of a laser processing machine having plural keys respectively having allocated functions different from each other and setting an operating state of the laser processing machine such that this operating state is changed to a state according to a key input when a desirable key among the plural keys is operated and inputted and characterized in that key hierarchical information hierarchically associates said plural keys with a headline key for allowing an operating input at an initial stage and a secondary key for allowing an operating input at a secondary stage after the headline key is operated and inputted; the key hierarchical information is stored in advance; said headline key is displayed on the display screen of display means; the headline key is considered to be operated and inputted when an operator touches said headline key displayed on the display screen of the display means, and the secondary key associated with the headline key is selectively read on the basis of said key hierarchical information; and the read secondary key is displayed on the display screen of said display means.

In accordance with the above third invention, the key hierarchical information hierarchically associates the plural keys with a headline key for allowing an operating input at an initial stage and a secondary key for allowing an operating input at a secondary stage after the headline key is operated and inputted. This key hierarchical information is first stored in advance. The above headline key is next displayed on the display screen of display means. The headline key is considered to be operated and inputted when an operator touches the headline key displayed on the display screen of this display means. The secondary key associated with this headline key is selectively read on the basis of said key hierarchical information. This read secondary key is displayed on the display screen of the display means. Thus, a man-machine-interface as a contact between the laser processing machine and the operator is constructed in a display form intuitively easy even for a beginner to understand. Further, a corresponding headline or secondary key every operating stage among the plural keys is displayed on the display screen of the display means. The input of a corresponding key every operating stage among the plural keys is selectively allowed. In other words, the input of a key not corresponding to a certain operating stage is inhibited. Accordingly, an error in key input is prevented in advance even when an operator having little experience operates and sets the operating state of the laser processing machine. As a result, an operation for setting the operating state of the laser processing machine having extremely excellent operability can be realized.

In the above case, the secondary key can be considered to be operated and inputted when the operator touches said secondary key displayed on the display screen of said display means, and the operating state of the laser processing machine can be set such that this operating state is changed to a state according to a key input relative to a combination of said headline key and the secondary key. In this case, the secondary key is considered to be operated and inputted when the operator touches the secondary key displayed on the display screen of the display means, and the operating state of the laser processing machine is set such that this operating state is changed to a state according to a key input relative to a combination of said headline key and this secondary key.

A first modifying form of the above third invention resides in an operating state setting method of a laser processing machine having plural keys respectively having allocated functions different from each other and setting an operating state of the laser processing machine such that this operating state is changed to a state according to a key input when a desirable key among the plural keys is operated and inputted; key hierarchical information hierarchically associates said plural keys with a headline key for allowing an operating input at an initial stage and a secondary key for allowing an operating input at a secondary stage after the headline key is operated and inputted; the key hierarchical information is stored in advance; both said headline key and said secondary key are displayed on the display screen of display means; the headline key is considered to be operated and inputted when an operator touches said headline key displayed on the display screen of the display means, and the secondary key associated with the headline key is selectively read on the basis of said key hierarchical information; and an operating input of the read secondary key is selectively allowed from said secondary key displayed on the display screen of said display means.

In accordance with this modifying form, key hierarchical information hierarchically associates the plural keys with a headline key for allowing an operating input at an initial stage and a secondary key for allowing an operating input at a secondary stage after this headline key is operated and inputted. This key hierarchical information is first stored in advance. Both said headline key and said secondary key are next displayed on the display screen of display means. The headline key is considered to be operated and inputted when an operator touches the headline key displayed on the display screen of this display means. The secondary key associated with the headline key is selectively read on the basis of said key hierarchical information. An operating input of this read secondary key is selectively allowed from the secondary key displayed on the display screen of the display means. Thus, a man-machine-interface as a contact between the laser processing machine and the operator is constructed in a display form intuitively easy even for a beginner to understand. Both the headline key and the secondary key are displayed on the display screen of the display means. Further, the input of a corresponding key every operating stage among the plural keys is selectively allowed. In other words, the input of a key not corresponding to a certain operating stage is inhibited. Accordingly, similar to the invention claimed in the claim 1, an error in key input is prevented in advance even when an operator having little experience operates and sets the operating state of the laser processing machine. As a result, an operation for setting the operating state of the laser processing machine having extremely excellent operability can be realized.

A second aspect of the above third invention resides in an operating state setting device of a laser processing machine having plural keys respectively having allocated functions different from each other and setting an operating state of the laser processing machine such that this operating state is changed to a state according to a key input when a desirable key among the plural keys is operated and inputted, and comprising key hierarchical information storing means for storing key hierarchical information for hierarchically associating said plural keys with a headline key for allowing an operating input at an initial stage and a secondary key for allowing an operating input at a secondary stage after the headline key is operated and inputted; headline key display control means for performing control for displaying said headline key on the display screen of display means; headline key input taking-in means for taking-in the headline key input by considering that the headline key is operated and inputted when an operator touches said headline key displayed on the display screen of said display means by the headline key display control means; secondary key reading means for selectively reading the secondary key associated with said headline key taken-in by said headline key input taking-in means on the basis of the key hierarchical information stored to said key hierarchical information storing means; and secondary key display control means for performing control for displaying the secondary key read by the secondary key reading means on the display screen of said display means.

In accordance with the invention of claim 4, the headline key display control means first displays the headline key for allowing an operating input at an initial stage among the plural keys on the display screen of display means. The headline key input taking-in means takes-in the headline key input by considering that this headline key is operated and inputted when an operator touches the headline key displayed on the display screen of this display means. Then, the secondary key reading means selectively reads the secondary key associated with said taken-in headline key on the basis of the key hierarchical information stored to the key hierarchical information storing means. The secondary key display control means executes control for displaying said read secondary key on the display screen of the display means. Thus, a man-machine-interface as a contact between the laser processing machine and the operator is constructed in a display form intuitively easy even for a beginner to understand. Further, a corresponding headline or secondary key every operating stage among the plural keys is displayed on the display screen of the display means. The input of a corresponding key every operating stage among the plural keys is selectively allowed. In other words, the input of a key not corresponding to a certain operating stage is inhibited. Accordingly, an error in key input is prevented in advance even when an operator having little experience operates and sets the operating state of the laser processing machine. As a result, an operation for setting the operating state of the laser processing machine having extremely excellent operability can be realized.

In the above case, the operating state setting device can further comprise secondary key input taking-in means for taking-in the secondary key input by considering that the secondary key is operated and inputted when the operator touches said secondary key displayed on the display screen of said display means by said secondary key display control means; and setting means for setting the operating state of the laser processing machine such that this operating state is changed to a state according to a key input relative to a combination of said headline key taken-in by said headline key input taking-in means and the secondary key taken-in by the secondary key input taking-in means. In this case, in the above second aspect, the secondary key input taking-in means takes-in the secondary key input by considering that this secondary key is operated and inputted when the operator touches the secondary key displayed on the display screen of the display means by the secondary key display control means. Then, the setting means sets the operating state of the laser processing machine such that this operating state is changed to a state according to a key input relative to a combination of the headline key taken-in by the headline key input taking-in means and the secondary key taken-in by the secondary key input taking-in means.

A first modifying form of the above second aspect resides in an operating state setting device of a laser processing machine having plural keys respectively having allocated functions different from each other and setting an operating state of the laser processing machine such that this operating state is changed to a state according to a key input when a desirable key among the plural keys is operated and inputted, and comprising key hierarchical information storing means for storing key hierarchical information for hierarchically associating said plural keys with a headline key for allowing an operating input at an initial stage and a secondary key for allowing an operating input at a secondary stage after the headline key is operated and inputted; display control means for performing control for displaying both said headline key and said secondary key on the display screen of display means; headline key input taking-in means for taking-in the headline key input by considering that the headline key is operated and inputted when an operator touches said headline key displayed on the display screen of said display means by the display control means; secondary key reading means for reading the secondary key associated with said headline key taken-in by said headline key input taking-in means on the basis of the key hierarchical information stored to said key hierarchical information storing means; and secondary key input allowing means for allowing the operating input of the secondary key read by the secondary key reading means.

In accordance with this modifying form, the display control means first displays both the headline key and the secondary key on the display screen of display means. The headline key input taking-in means takes-in the headline key input by considering that the headline key is operated and inputted when an operator touches the headline key displayed on the display screen of this display means. Then, the secondary key reading means selectively reads the secondary key associated with said taken-in headline key on the basis of the key hierarchical information stored to the key hierarchical information storing means. The secondary key input allowing means allows the operating input of said read secondary key. Thus, a man-machine-interface as a contact between the laser processing machine and the operator is constructed in a display form intuitively easy even for a beginner to understand. Both the headline key and the secondary key are displayed on the display screen of the display means. Further, the input of a corresponding key every operating stage among the plural keys is selectively allowed. In other words, the input of a key not corresponding to a certain operating stage is inhibited. Accordingly, similar to the invention claimed in the claim 4, an error in key input is prevented in advance even when an operator having little experience operates and sets the operating state of the laser processing machine. As a result, an operation for setting the operating state of the laser processing machine having extremely excellent operability can be realized.

To achieve the above fourth object, a fourth invention of the present application resides in a processing condition display method of a laser processing machine in which processing condition data of the laser processing machine adapted to each of plural combinations of the material of a work as a processed object and a plate thickness are stored to a processing condition file in advance; work data relative to a combination of the work material and the plate thickness are obtained before a desirable processing treatment of said work is taken; processing condition data of the laser processing machine adapted to the obtained work data are extracted on the basis of the obtained work data and said processing condition file; and the extracted processing condition data of the laser processing machine are displayed on the display screen of display means.

In accordance with this fourth invention, work data relative to a combination of the work material and the plate thickness are first obtained before a desirable processing treatment of the work is taken. Processing condition data of the laser processing machine adapted to the work data are next extracted on the basis of the obtained work data and the processing condition file. The extracted processing condition data of the laser processing machine are displayed on the display screen of display means. Thus, the processing condition data of the laser processing machine are displayed on the display screen of the display means before the desirable processing treatment of the work is taken. Accordingly, an operator can carry out a setting work of a processing condition while the processing condition data of the laser processing machine are referred. As a result, an operator having little experience can also smoothly perform a setting operation of the processing condition.

The processing condition data of said laser processing machine can include a set value of a setting object portion of the processing condition. In this case, the set value of the setting object portion as the processing condition data of the laser processing machine is displayed on the display screen of the display means before the desirable processing treatment of the work is taken. Accordingly, the operator can carry out a setting work of the processing condition while the set value of the setting object portion is referred. As a result, an operator having little experience can also smoothly perform a setting operation of the processing condition.

Further, the processing condition data of said laser processing machine can include an image and the set value of the setting object portion of the processing condition. In this case, the image and the set value of the setting object portion as the processing condition data of the laser processing machine are displayed on the display screen of the display means before the desirable processing treatment of the work is taken. Accordingly, the operator can confirm the setting object portion by seeing the image such as a laser processing head and the like and can carry out a setting work of the processing condition while the set value of the setting object portion is referred. As a result, an operator having little experience can also smoothly perform a setting operation of the processing condition.

Further, a second aspect of the above fourth invention resides in a processing condition display unit of a laser processing machine comprising a processing condition file for storing processing condition data of the laser processing machine adapted to each of plural combinations of the material of a work as a processed object and a plate thickness; work data obtaining means for obtaining work data relative to a combination of the work material and the plate thickness before a desirable processing treatment of said work is taken; processing condition data extracting means for extracting processing condition data of the laser processing machine adapted to the obtained work data on the basis of the work data obtained by the work data obtaining means and stored contents of said processing condition file; and display control means for performing control for displaying the processing condition data of the laser processing machine extracted by the processing condition data extracting means on the display screen of display means.

In accordance with this second aspect, the work data obtaining means first obtains work data relative to a combination of the work material and the plate thickness before a desirable processing treatment of the work is taken. The processing condition data extracting means next extracts processing condition data of the laser processing machine adapted to the work data on the basis of the obtained work data and the processing condition file. The display control means then performs control for displaying the extracted processing condition data of the laser processing machine on the display screen of display means so that the processing condition data are displayed on the display screen of the display means. Thus, the processing condition data of the laser processing machine are displayed on the display screen of the display means before the desirable processing treatment of the work is taken. Accordingly, an operator can carry out a setting work of a processing condition while the processing condition data of the laser processing machine are referred. As a result, an operator having little experience can also smoothly perform a setting operation of the processing condition.

In the above case, the processing condition data of said laser processing machine can include a set value of a setting object portion of the processing condition. In this case, the set value of the setting object portion as the processing condition data of the laser processing machine is displayed on the display screen of the display means before the desirable processing treatment of the work is taken. Accordingly, the operator can carry out a setting work of the processing condition while the set value of the setting object portion is referred. As a result, an operator having little experience can also smoothly perform a setting operation of the processing condition.

Further, the processing condition data of said laser processing machine can include an image and the set value of the setting object portion of the processing condition. In this case, the image and the set value of the setting object portion as the processing condition data of the laser processing machine are displayed on the display screen of the display means before the desirable processing treatment of the work is taken. Accordingly, the operator can confirm the setting object portion by seeing the image such as a laser processing head and the like and can carry out a setting work of the processing condition while the set value of the setting object portion is referred. As a result, an operator having little experience can also smoothly perform a setting operation of the processing condition.

To achieve the above fifth object, a fifth invention of the present application resides in an operating state setting method of a laser processing machine having plural keys respectively having allocated functions different from each other and setting an operating state of the laser processing machine such that this operating state is changed to a state according to a key input when a desirable key among the plural keys is operated and inputted; said plural keys include at least a learning mode selecting key which can selectively switch an expert mode requiring a key input operation in a detailed procedure for an expert and a beginner mode requiring a key input operation in a simple procedure for a beginner; the operating state of the laser processing machine is set such that this operating state is changed to a state according to the key input operation in said detailed procedure when said expert mode is selected by said learning mode selecting key; and the operating state of the laser processing machine is set such that this operating state is changed to a state according to the key input operation in said simple procedure when said beginner mode is selected by said learning mode selecting key.

In accordance with this fifth invention, the operating state of the laser processing machine is set such that this operating state is changed to a state according to the key input operation in the detailed procedure when the expert mode is selected by the learning mode selecting key. In contrast to this, the operating state of the laser processing machine is set such that this operating state is changed to a state according to the key input operation in the simple procedure when the beginner mode is selected by the learning mode selecting key. Thus, the beginner mode for allowing the key input setting operation in the simple procedure is added to the expert mode set by the key input setting operation. These two modes can be switched and selected in accordance with a learning degree of the operator. Accordingly, both an expert and a beginner can easily perform a setting operation for changing the operating state of the laser processing machine.

In the above fifth invention, the key input operation in said simple procedure at the selecting time of said beginner mode can be achieved by a talking system for requesting the operator to input a suitable key at each of operating stages. In this case, the key input operation in the simple procedure at the selecting time of the beginner mode is achieved by the talking system for requesting the operator to input a suitable key at each of the operating stages. Accordingly, a setting operation for changing the operating state of the laser processing machine can be easily performed even by a beginner unaccustomed to treatment of the device.

The operating state of the laser processing machine set by the key input operation in said simple procedure at the selecting time of said beginner mode can be set to be equal to that set by the key input operation in said detailed procedure at the selecting time of said expert mode. In this case, the operating state of the laser processing machine set by the key input operation in the simple procedure at the selecting time of the beginner mode is equal to that set by the key input operation in the detailed procedure at the selecting time of the expert mode. Thus, the setting operation for changing the operating state of the laser processing machine equal to that of the expert can be easily realized only by remembering a simple operating procedure even by a beginner unaccustomed to treatment of the device.

Further, a second aspect of the above fifth invention resides in an operating state setting device of a laser processing machine having plural keys respectively having allocated functions different from each other and setting an operating state of the laser processing machine such that this operating state is changed to a state according to a key input when a desirable key among the plural keys is operated and inputted; said plural keys including at least a learning mode selecting key which can selectively switch an expert mode requiring a key input operation in a detailed procedure for an expert and a beginner mode requiring a key input operation in a simple procedure for a beginner; the operating state setting device comprising first setting means for setting the operating state of the laser processing machine such that this operating state is changed to a state according to the key input operation in said detailed procedure when said expert mode is selected by said learning mode selecting key; and second setting means for setting the operating state of the laser processing machine such that this operating state is changed to a state according to the key input operation in said simple procedure when said beginner mode is selected by said learning mode selecting key.

In accordance with this second aspect, the first setting means sets the operating state of the laser processing machine such that this operating state is changed to a state according to the key input operation in the detailed procedure when the expert mode is selected by the learning mode selecting key. The second setting means sets the operating state of the laser processing machine such that this operating state is changed to a state according to the key input operation in the simple procedure when the beginner mode is selected by the learning mode selecting key. Thus, the beginner mode for allowing the key input setting operation in the simple procedure is added to the expert mode set by the key input setting operation. These two modes can be switched and selected in accordance with a learning degree of the operator. Accordingly, both an expert and a beginner can easily perform a setting operation for changing the operating state of the laser processing machine.

In the above second aspect, the key input operation in said simple procedure in said second setting means can be achieved by a talking system for requesting the operator to input a suitable key at each of operating stages. In this case, the key input operation in the simple procedure in the second setting means is achieved by a talking system for requesting the operator to input a suitable key at each of operating stages. Accordingly, a setting operation for changing the operating state of the laser processing machine can be easily performed even by a beginner unaccustomed to treatment of the device.

Further, in the above second aspect, the operating state of the laser processing machine set in said second setting means can be set to be equal to that set in said first setting means. In this case, the operating state of the laser processing machine set in the second setting means is equal to that set in the first setting means. Thus, the setting operation for changing the operating state of the laser processing machine equal to that of the expert can be easily realized only by remembering a simple operating procedure even by a beginner unaccustomed to treatment of the device.

BRIEF DESCRIPTION OF THE DRAWINGS

FIG. 11 is a view used to explain a position setting procedure of a movable member in accordance with a third embodiment of the above second invention.

FIG. 15 is a view used to explain an operating state setting procedure in accordance with the above third invention.

FIG. 19 is a view showing an example of a display of processing condition data in accordance with one embodiment of the above fourth invention.

FIG. 20 is another view showing an example of the display of the processing condition data in accordance with one embodiment of the above fourth invention.

FIG. 21 is a view showing an example of a display of the processing condition data in accordance with one embodiment of the above fourth invention.

DESCRIPTION OF THE PREFERRED EMBODIMENTS

Figure 1:
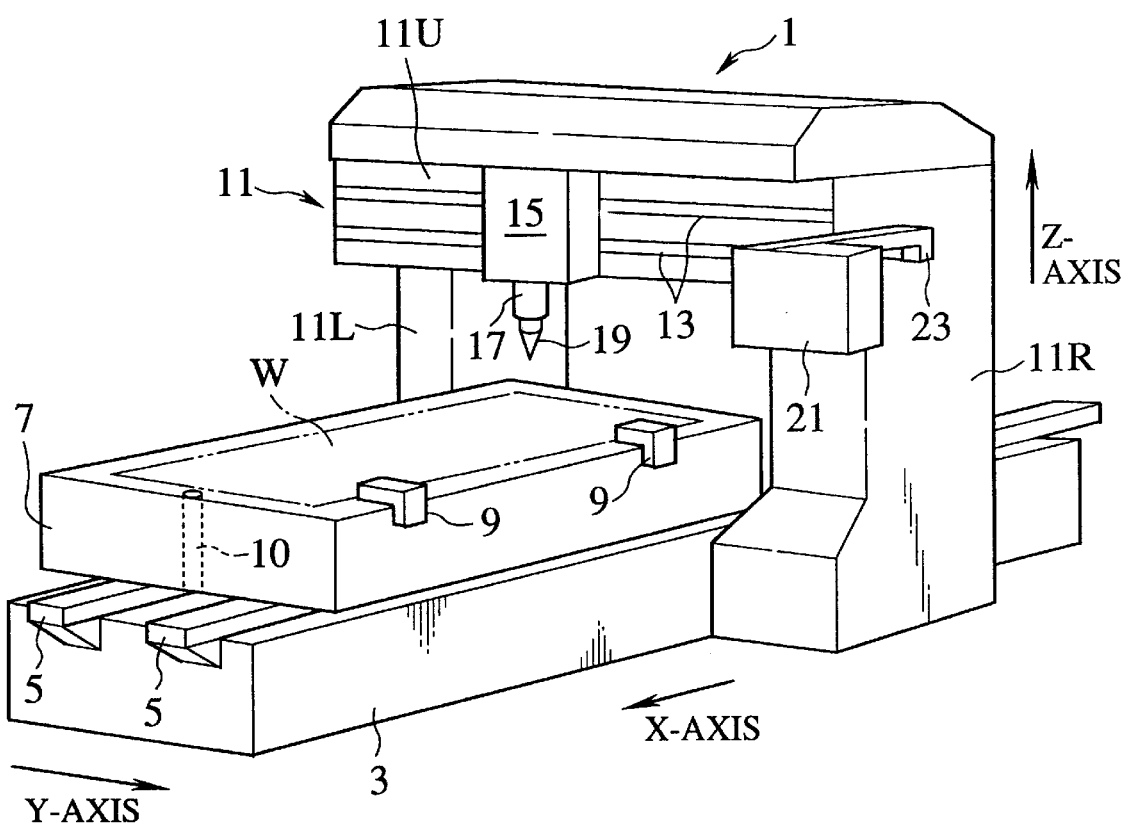
FIG. 1 is a perspective view showing the entire construction of a laser processing machine acting as a plate material processing machine in accordance with one embodiment of the above first invention.

Embodiments of control method and apparatus for plate material processing machine in accordance with the present invention will next be described in detail with reference to the drawings. In the drawings, members having the same function are designated by like reference numerals.

A laser processing machine acting as one example of a plate material processing machine, which is controlled by a controller in accordance with the present invention, will first be explained. As shown in FIG. 1, the laser processing machine 1 has a bed 3 formed in the shape of e.g., a box and extending in a longitudinal direction (an X-axis direction). Plural guide rails 5 are arranged in parallel with each other on this bed 3 and extend in the X-axis direction. A work table 7 movable in the X-axis direction is arranged on these guide rails 5 through driving members such as a drive motor, a ball screw and a nut member although these members are unillustrated. A work W as an object to be processed, formed in a flat shape is supported by this work table 7. Plural work clamping devices 9 described later are spaced from each other at suitable intervals along the X-axis direction on one side of this work table 7 (on the right-hand side in FIG. 1). The work W can be gripped by these work clamping devices 9 with a predetermined clamping force. A positioning pin 10 described later is arranged on one side of this work table 7 (on the left-hand side in FIG. 1) so that an upper portion of this pin 10 can be retracted or projected with respect to an upper face of the work table 7 by operating a manual lever described later through a through hole formed in the work table 7. With this movable positioning pin 10, when the work W is loaded on the table 7, the work W can be smoothly loaded without colliding the positioning pin 10. When the loading of the work W is completed, the work W can be positioned in a predetermined position by causing the work W to abut against the positioning pin 10.

A gate type frame 11 is vertically erected over the above bed 3. This gate type frame 11 includes an upper frame 11U and a pair of side frames 11R, 11L. Plural guide rails 13 extend in a lateral direction (a Y-axis direction) and are arranged in parallel with each other on a front side of the upper frame 11U. These guide rails 13 carry a Y-axis carriage 15 movable in the Y-axis direction through driving means such as a drive motor, a ball screw and a nut member although these members are unillustrated.

The Y-axis carriage 15 has a bend mirror for guiding a laser beam that is initially irradiated in the Y-axis direction toward a processing point along Z-axis direction. A laser processing head 17 is arranged just below this bend mirror and movable in a vertical direction (a Z-axis direction) by, for example, an unillustrated fluid cylinder and the like. Bend mirrors and condenser lens are arranged within this laser processing head 17. A laser nozzle 19 is mounted integrally at the lower end of the laser processing head 17. An NC controller 21 is attached to an upper portion of the side frame 11R through a bracket 23 to control the operation of the laser processing machine 1.

In the above construction, the work table 7 is moved in the X-axis direction and the Y-axis carriage 15 is moved in the Y-axis direction in accordance with NC data from the NC controller 21 so that the work W and the laser processing head 17 can be positioned at any desired relative positions in an X-Y plane and the laser processing head 17 is moved to a Z-axis direction to perform a focal adjustment. Thus, a laser beam generated by an unillustrated laser oscillator is guided through the bend mirrors, the condenser lens and the laser nozzle 19 to the work W so that a desirable laser processing treatment such as cutting, punching and the like performed on the work W.

Figure 2:
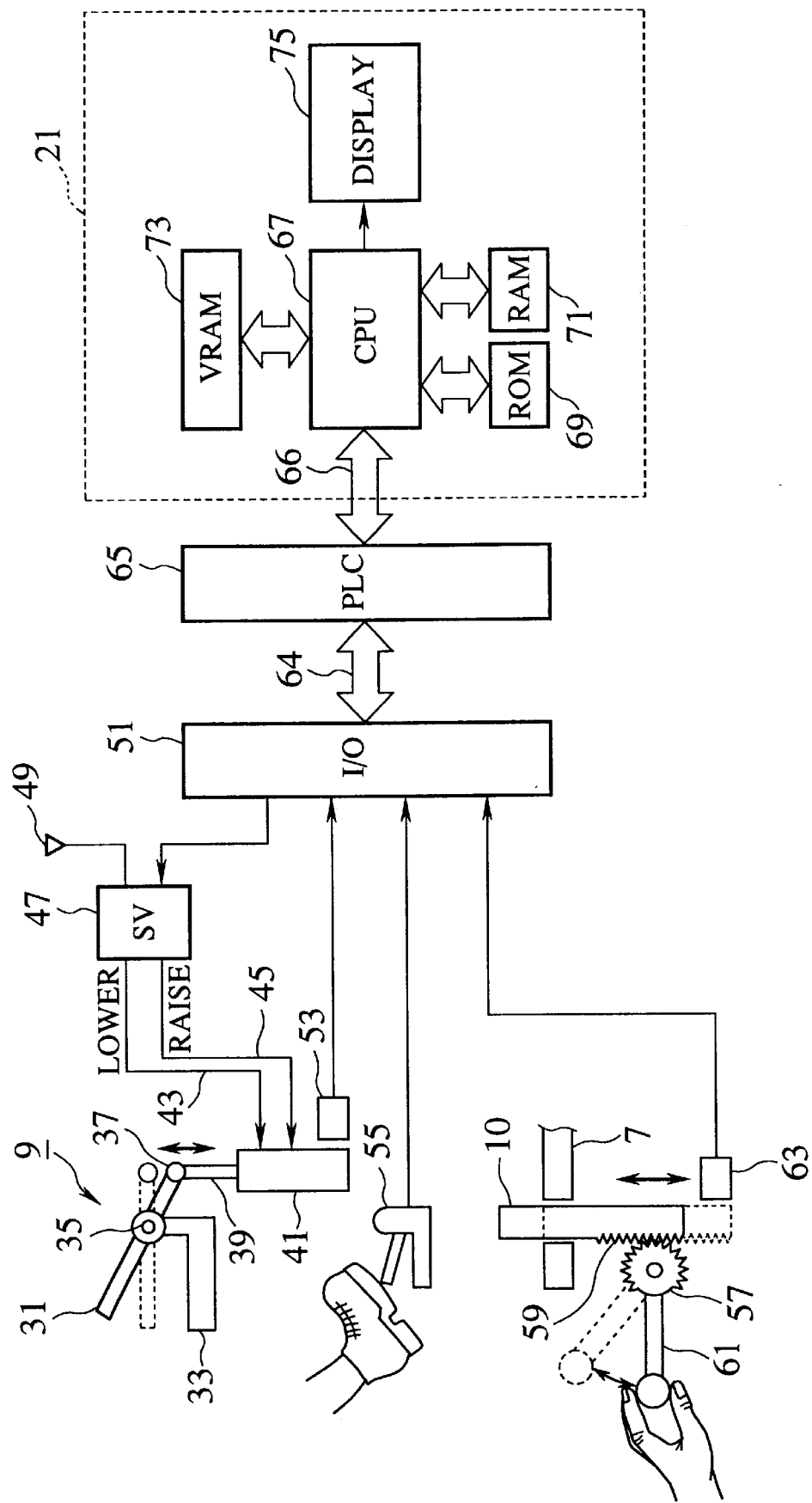
FIG. 2 is a block diagram showing a main portion of the above first invention.

As shown in FIG. 2, each of the above work clamping devices 9 includes a clamping base 33 which is attached to the work table 7 so as to be movable in the X-axis direction; the clamping device 9 further includes a clamping presser 31 supported by the clamping base 33 through a supporting shaft 35 so as to be movable in the vertical direction. A piston rod 39 of a pneumatic cylinder 41 is engaged with a rear side end portion 37 of this clamping presser 31. A solenoid valve (SV) 47 is connected to this pneumatic cylinder 41 through a pair of air pipings 43, 45. This solenoid valve 47 is connected to a compressed air supplying source 49; the solenoid valve 47 is electrically connected to an I/O 51. This I/O 51 is connected to a limit switch 53 for detecting the vertical position of an unillustrated piston coupled to the piston rod 39 of the above pneumatic cylinder 41; the signal from the limit switch 53 shows the actual opened or closed state of the work clamping device 9. The I/O 51 is also connected to a foot switch 55 for commanding a gripping or releasing operation of each of the above work clamping devices 9. This foot switch 55 is constructed such that a high level signal is produced when the switch 55 is stepped in, and a low level signal is produced when the switch 55 is released.

As shown in FIG. 2, the above positioning pin 10 is made from a cylindrical metal member. The pin 10 is vertically movable through a through hole formed in the work table 7 so that an upper portion of the pin 10 can be projected and retracted with respect to the upper face of the work table 7 A spur gear 59 is formed on a lower side of the positioning pin 10. A gear 57 engaged with the spur gear 59 is pivotally supported by a suitable means in the vicinity of the positioning pin 10. A manual lever 61 is attached to the gear 57. The positioning pin 10 is reciprocated in the vertical direction by pivoting the manual lever 61. A limit switch 63 for detecting a vertical position of the positioning pin 10 is arranged in the vicinity of the positioning pin 10 and is connected to the I/O 51.

The I/O 51 is connected to a programmable logic controller (hereafter, called a PLC) 65 through a parallel transmitting cable 64. The PLC 65 is for inputting an operating state of the laser processing machine 1 and sequentially controlling the operation of the laser processing machine 1 on the basis of the inputted operating state. The PLC 65 is connected to the above NC controller 21 through a bidirectional communication interface 66 such as RS232C. This NC controller 21 is constructed by a terminal unit such as a personal computer. This NC controller 21 can be constructed by adding a personal computer board to the NC controller of a conventional type or by adding an NC board having an NC function to the personal computer. In any case, an excellent function for displaying the state of the laser processing machine is achieved by constructing a man-machine-interface, which acts as an interface between the laser processing machine 1 and the operator, by a personal computer equipped with an OS having excellent operability, such as "Windows".

More particularly, the PLC 65 is connected to a CPU 67 included in the NC controller 21 or the terminal unit through the interface 66. This CPU 67 is connected to a ROM 69 for storing various kinds of processing programs, a RAM 71 for storing various kinds of processing data, a video RAM (hereafter, called a VRAM) 73 and a display unit 75, as shown in FIG. 2. The VRAM 73 receives commands from the CPU 67 and draws a specific image data corresponding to these commands from a plurality of image data each representing each operating state of the laser processing machine 1; the plurality of image data are stored in a memory such as the RAM 71, an unillustrated main memory device or an unillustrated external memory device in advance. The display unit 75 displays the image data read from the VRAM 73 on its display screen. For example, the image data that represents the plural operating states of the laser processing machine 1 stored in the memory medium in advance include image data showing the opened or closed state of the work clamping devices 9 and image data showing the raised and lowered state of the positioning pin 10 and the like.

Figure 3:
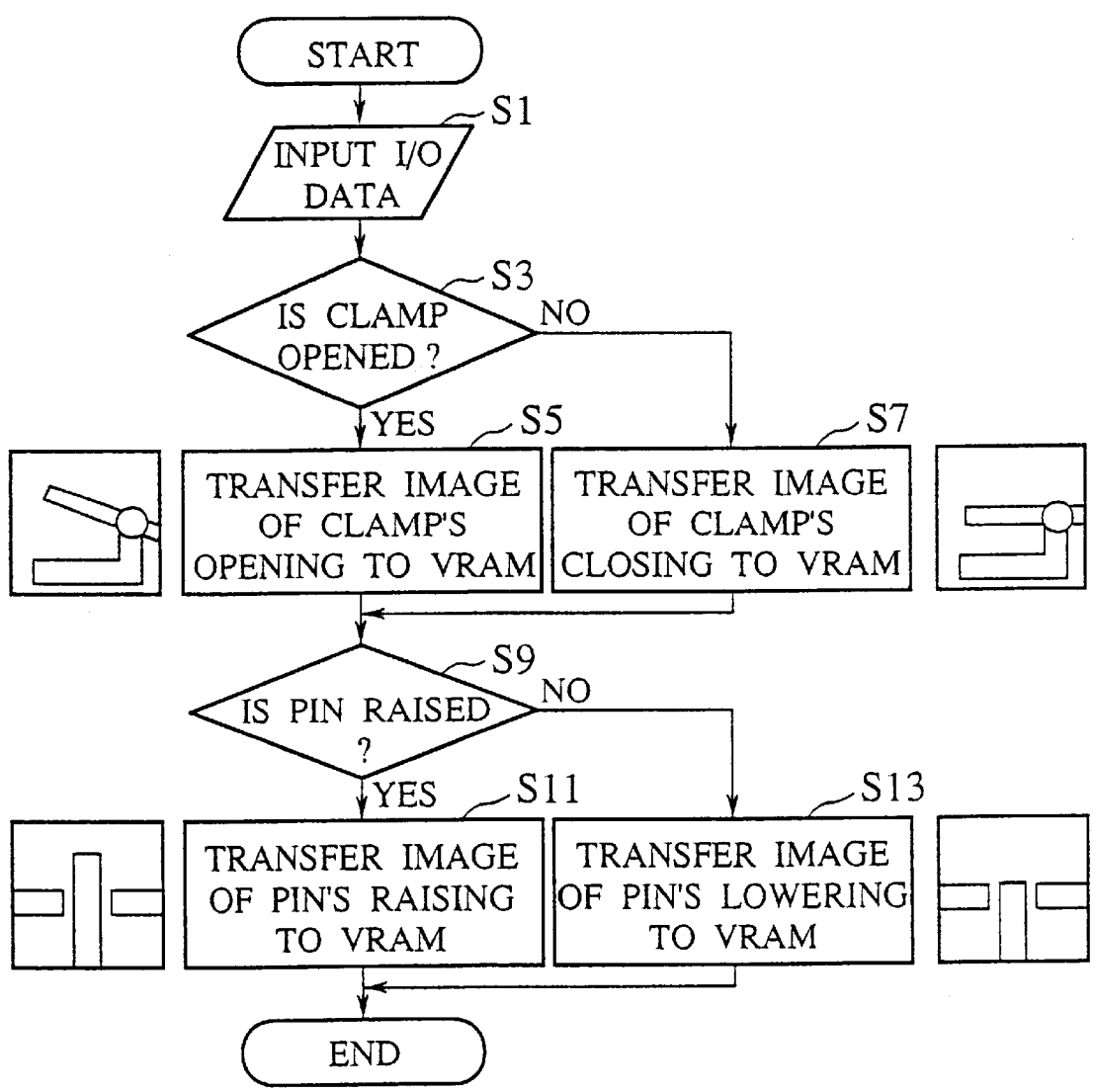
FIG. 3 is an operating flow chart of the above firs invention.

An operation of the state display unit of the laser processing machine will next be explained in detail with reference to a flow chart shown in FIG. 3.

In step S1, the CPU 67 inputs suitable data into the I/O 51 through the bidirectional interface 66, the PLC 65 and the like. Next, in step S3, it is judged on the basis of signal from the limit switch 53 whether the work clamping device 9 is opened or closed (which may be called hereinafter as the opened and closed state of the work clamping device 9). In the judgment in step S3, command data from the foot switch 55 may be further referred to in addition to the above opened and closed data from the limit switch 53. For example, if the commands of both of these data are in conformity with each other, the opened or closed state is confirmed and used as an actual opened or closed state. On the other hand, if the commands of the two data are not in conformity with each other, it is considered that a certain abnormality is occurred and the occurrence of abnormality is informed to an operator.

When it is judged as a result of the judgment in step S3 that the present state is an opened state, the process proceeds to step S5, where the CPU 67 reads corresponding image data from the memory medium such as the RAM 71 and stores the read image data in a memory area of the VRAM 73. At this time, as shown on the left side of the box of the step S5 in FIG. 3, an image showing the opened state of the work clamping device 9 is displayed on the display screen of the display unit 75.

In contrast to this, if it is judged as a result of the judgment in step S3 that the present opened or closed state is a closed state, the process proceeds to step S7, where the CPU 67 reads corresponding image data from the memory medium such as the RAM 71 and the stores the read data in the memory area of the VRAM 73. At this time, as shown on the right side of the box of the step S7 in FIG. 3, an image showing the closed state of the work clamping device 9 is displayed on the display screen of the display unit 75.

Then, the CPU 67 judges the present vertical position of the positioning pin 10 in a step S9 on the basis of the position data that represents the actual vertical position of the positioning pin 10 from the limit switch 63.

When it is judged as a result of the judgment in step S9 that the present vertical position of the pin 10 is an "upper" position, the process proceeds to step S11, where the CPU 67 reads corresponding image data from the memory medium such as the RAM 71 and causes the read image data to be stored in the memory area of the VRAM 73. At this time, as shown on the left side of the box of the step S11 in FIG. 3, an image showing the raised position of the positioning pin 10 is displayed on the display screen of the display unit 75.

In contrast to this, if it is judged as a result of the judgment in step S9 that the present vertical position is a "lower" position, the process proceeds to step S13, where the CPU 67 reads corresponding image data from the memory medium such as the RAM 71 and causes the read image data to be stored in the memory area of the VRAM 73. At this time, as shown on the right hand side of the box of the step S13 in FIG. 3, an image showing the lowered position of the positioning pin 10 is displayed on the display screen of the display unit 75.

Next, the display images of the state display unit 75, which uses "Windows" as an OS, will be explained with reference to FIGS. 4 and 5.

Figure 4:
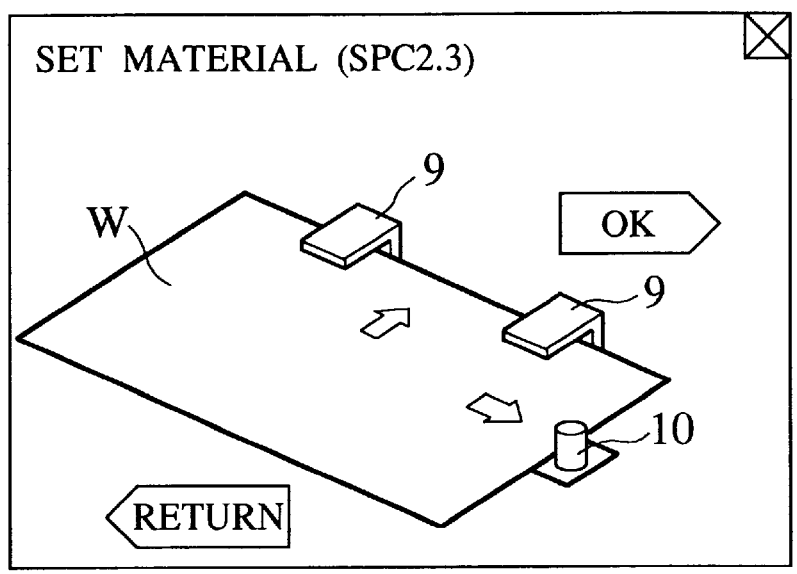
FIG. 4 is a view showing one embodiment of a display screen in accordance with the above first invention.
Figure 5:
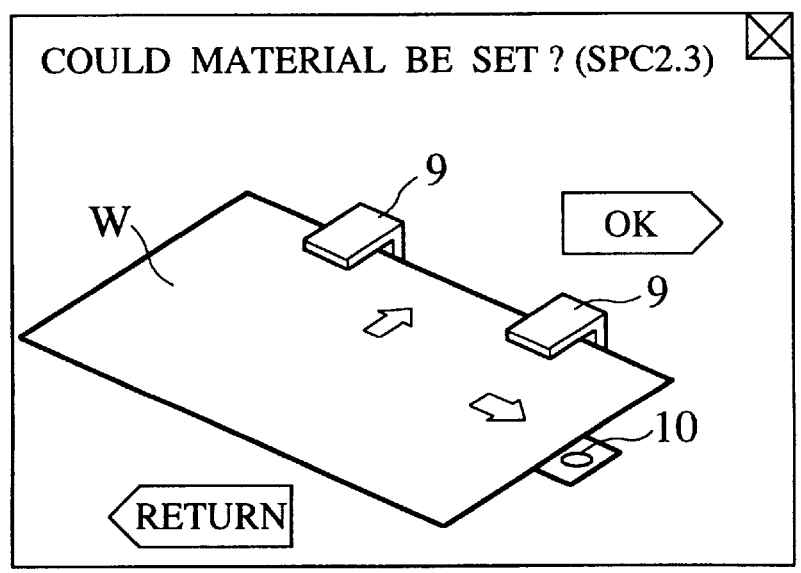
FIG. 5 is a view showing one embodiment of another display screen in accordance with the above first invention.

FIG. 4 displays a picture for requesting an operator to set the work W to a predetermined position. At this time, the work clamping device 9 is in an opening state (opened state). Further, the image of the positioning pin 10 displays that this pin 10 is located in a raising position (raised position). At this time, when an operator lowered the pedal of the foot switch 55 in a state in which the work W is set to a predetermined position, the operating state of the work clamping device 9 is changed to a closing state (closed state). As this operating state is changed, the image of the work clamping device 9 is updated in real time as shown in FIG. 5 such that the work clamping device 9 is in the closing state. Thereafter, when the operator lowers the positioning pin 10 by operating the manual lever 61, the image of the positioning pin 10 is updated in real time as shown in FIG. 5 such that this pin 10 is located in the lowered position.

Thus, in this apparatus, the operating state of the laser processing machine, such as the opened and closed states of the work clamping device 9 and the position of the positioning pin 10, is displayed on the display screen of the display unit 75 by various images (such as the opened or closed image of the work clamping device 9 and the position image of the positioning pin 10) which is intuitively easy even for a beginner to understand. Accordingly, the operator can recognize with a single glance the operating state of the laser processing machine, such as the opened and closed states of the work clamping device 9 and the position of the positioning pin 10.

Figure 6:
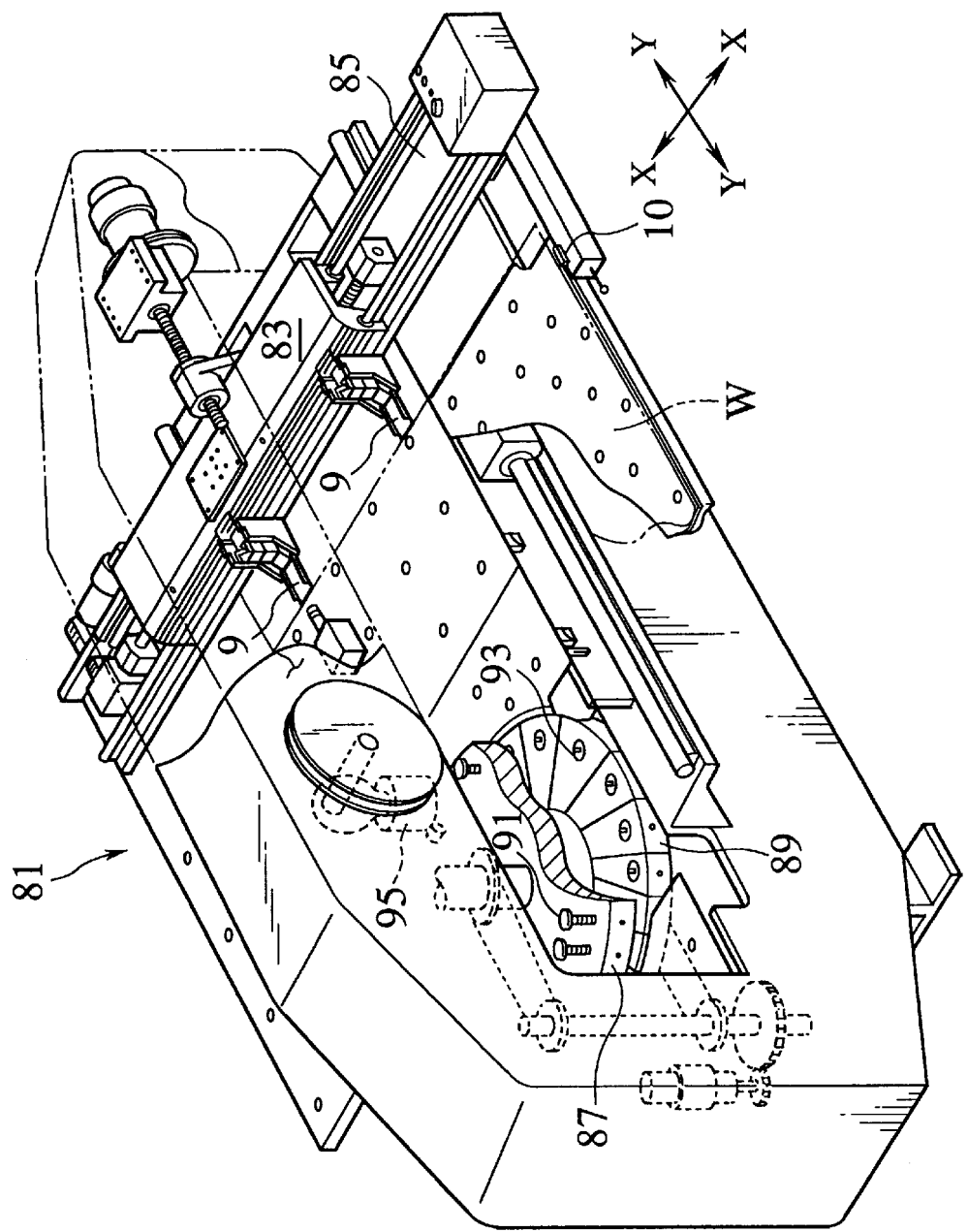
FIG. 6 is a perspective view showing the entire construction of a punch press as a plate material processing machine in accordance with another embodiment of the above first invention.

In another embodiment of the present invention, the foregoing device is applied to a punch press and this embodiment will next be explained. As shown in FIG. 6, similar to the laser processing machine 1, the punch press 81 has a work clamping device 9 and a positioning member 10. After the work W is positioned in a predetermined position with respect to the work clamping device 9, a carriage 83 equipped with the work clamping device 9 is moved in an X-axis direction and a carriage base 85 is moved in a Y-axis direction. Thus, the work W can be positioned in a desirable processing position between a punch 91 and a die 93 arranged on upper and lower turrets 87 and 89. Processing of the work W, such as punching and forming, are then performed by hitting and pressing the punch 91 by a ram 95.

In the foregoing embodiment of the present invention applied to the punch press, similar to the application applied to the laser processing machine 1, an operating state of the punch press, such as opened and closed states of the work clamping device 9 and a position state of the positioning pin 10, is displayed on the display screen of a display unit 75 in a form (which is intuitively easy even for a beginner to understand). Accordingly, an operator can easily recognize the operating state of the punch press, such as the opened and closed states of the work clamping device 9 and the position state of the positioning pin 10.

The present invention is not limited to the above embodiment, but can be embodied in other forms by adding a suitable change to the present invention. For example, in the laser processing machine, the following can be additionally displayed on the display screen of the display unit as the state of the plate material processing machine: the positions of the laser processing head in the X-Y-Z axes coordinate system, the position of the work table in the X-Y axes coordinate system, an oscillating state of a laser generator and the like. On the other hand, in the punch press, the following can be additionally displayed on the display screen of the display unit: the position of the work table in the XY axes coordinate system and a punching state and the like.

When the state of the plate material processing machine is displayed, plural states can be simultaneously displayed on one display screen in parallel with each other by using a multi-window function of "Windows" as an OS.

Further, when a terminal unit connected to the PLC is provided at a location that is far away from the plate material processing machine, such as a centralized control room and the like, an image displayed on the display screen of a display unit of the terminal unit is transmitted through a network, such as a LAN within the factories or a public telephone line. Thus, an operator at the control room can easily know the operating state of the plate material processing machine as if the operator is located near the plate material processing machine.

Furthermore, the image of the plate material processing machine displayed on the display screen of the display unit is not limited to a still image, but can be a moving image. This embodiment can be achieved by preparing and storing displacements of the plate material processing machine to a memory medium in a form of the moving image in advance; then, upon a reception of the signals from a limit switch and the like, the stored moving images are read out and regenerated so that the corresponding moving images are displayed in real time on the display unit in accordance with the actual displacement of the plate material processing machine.

The state of the plate material processing machine can be also displayed by arranging an image pickup means, such as a CCD camera and the like, at various locations of the plate material processing machine; the images picked up by the image pickup means are displayed in real time on the display screen of the display unit.

As explained above in detail, in accordance with the first invention of this application, the operating state of the plate material processing machine is displayed on the display screen of a display means in images that are intuitively easy even for a beginner to understand. As a result, an operator can easily recognize the operating state of the plate material processing machine.

In particular, for example, when the operating state of the plate material processing machine including a position state of the positioning pin is displayed on the display screen of the display means in the form of a position image of the positioning pin, the operator can recognize with a single glance the operating state of the plate material processing machine including the position state of the positioning pin.

Further, when the operating state of the plate material processing machine including an operating state of the work clamping device is displayed on the display screen of the display means in the form of opening and closing images of the work clamping device, the operator can recognize with a single glance the operating state of the plate material processing machine including an operating state of the work clamping device.

With reference to FIG. 1 and FIGS. 7 to 11, a plurality of embodiments of a position setting method and a position setting device of a movable member in accordance with the second invention of this application will next be described in detail.

In a first embodiment of the above second invention, the second invention is applied to a laser processing machine acting as a plate material processing machine. This laser processing machine substantially has the same construction as the laser processing machine as shown in FIG. 1. However, as shown in FIG. 7, this laser processing machine has an X-axis drive motor 125 for moving the above work table 7 in an X-axis direction and a Y-axis drive motor 127 for moving in a Y-axis direction a Y-axis carriage 15 that supports the processing head 19.

Figure 7:
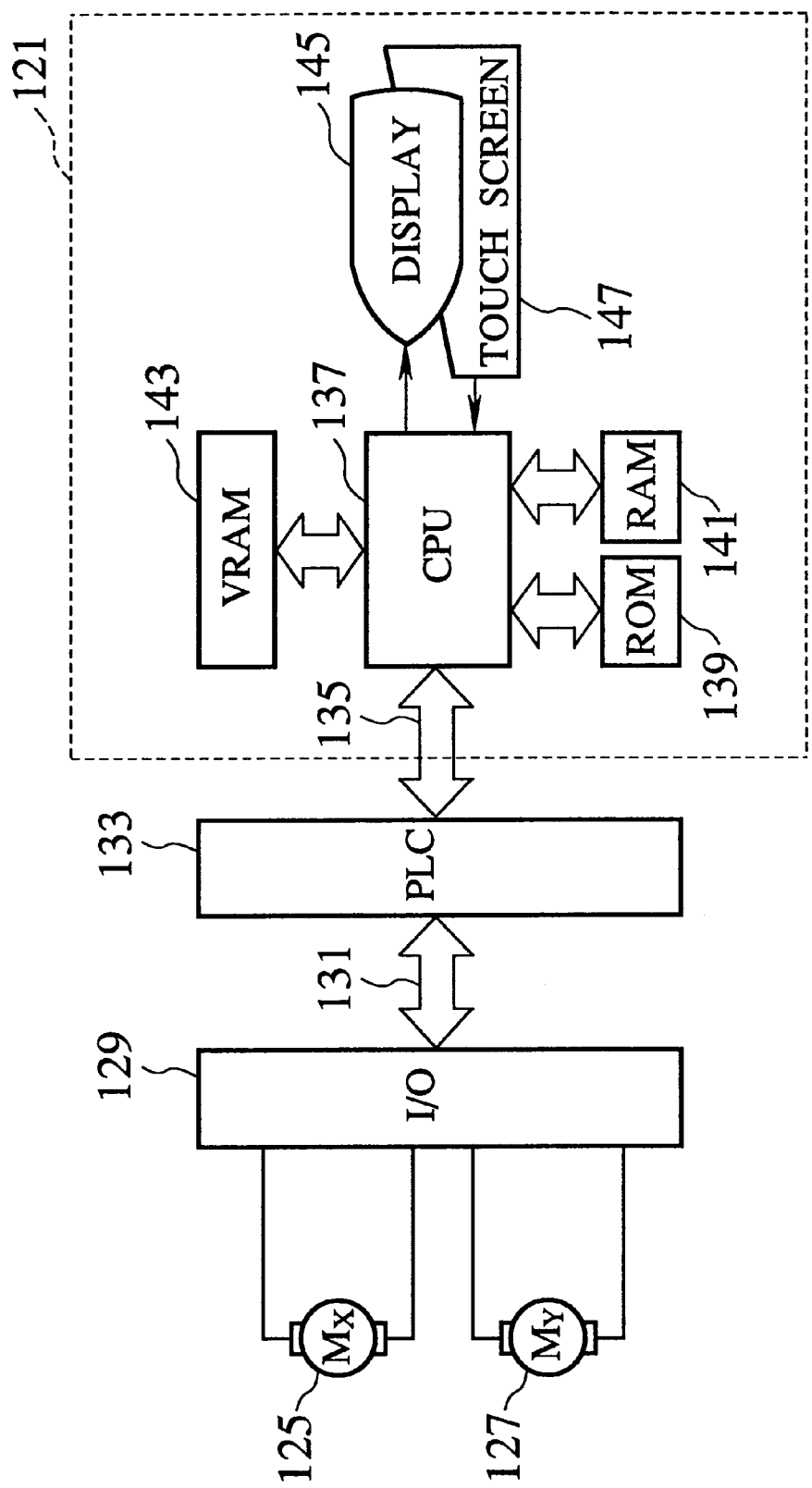
FIG. 7 is a block constructional showing a main portion of the above second invention.

With reference to FIG. 7, each of the X-axis drive motor 125 and the Y-axis drive motor 127 is connected to an I/O 129 connected to a programmable logic controller (hereafter, called a PLC) 133. Data that represents the operating state of a movable member, such as information of rotating positions of the X-axis drive motor 125 and the Y-axis drive motor 127, are inputted to the PLC 133 through a parallel transmitting cable 131. The PLC 133 sequentially controls an operation of the movable member in the laser processing machine 1 on the basis of the data representing the inputted operating state. For example, this PLC 133 is connected to an NC controller 121 through a bidirectional communication interface 135 such as RS232C and the like. Similar to the NC controller 21, this NC controller 121 is constructed by a terminal unit such as a personal computer and the like and is arranged at an upper portion of the above side frame 11R through a bracket 23. This NC controller 121 can be constructed by adding a personal computer board to the NC controller of a conventional type or adding to the personal computer an NC board having an NC function. In any case, a position setting function of the movable member in the plate material processing machine that has excellent operability is achieved by constructing a man-machine-interface between the laser processing machine 1 and an operator by a personal computer having an operating system (hereafter, called an OS) of excellent operability such as "Windows" manufactured by Microsoft Corporation and the like.

More particularly, the PLC 133 is connected to a CPU 137 built in the NC controller 121 through the interface 135. This CPU 137 is connected to a ROM 139 for storing various kinds of processing programs and a RAM 1 41 for storing various kinds of processing data. The CPU 137 is also connected to a video RAM (hereafter, called a VRAM) 143 and a display unit 145. The above VRAM 143 has memory area for storing a certain image data selected by the CPU 137 from plural image data stored in a memory medium such as the above RAM. The display unit 145 displays the image data read from the VRAM 143. The surface of the display screen of the display unit 145 is covered with the touch screen 147. The touch screen 147 is electrically connected to the display unit 145. Thus, when a finger or a write pen touches a certain portion of the display screen, the touch screen 147 detects the position of the portion and produces a signal for showing its position. The produced signal is transmitted to the CPU 137.

Figure 8:
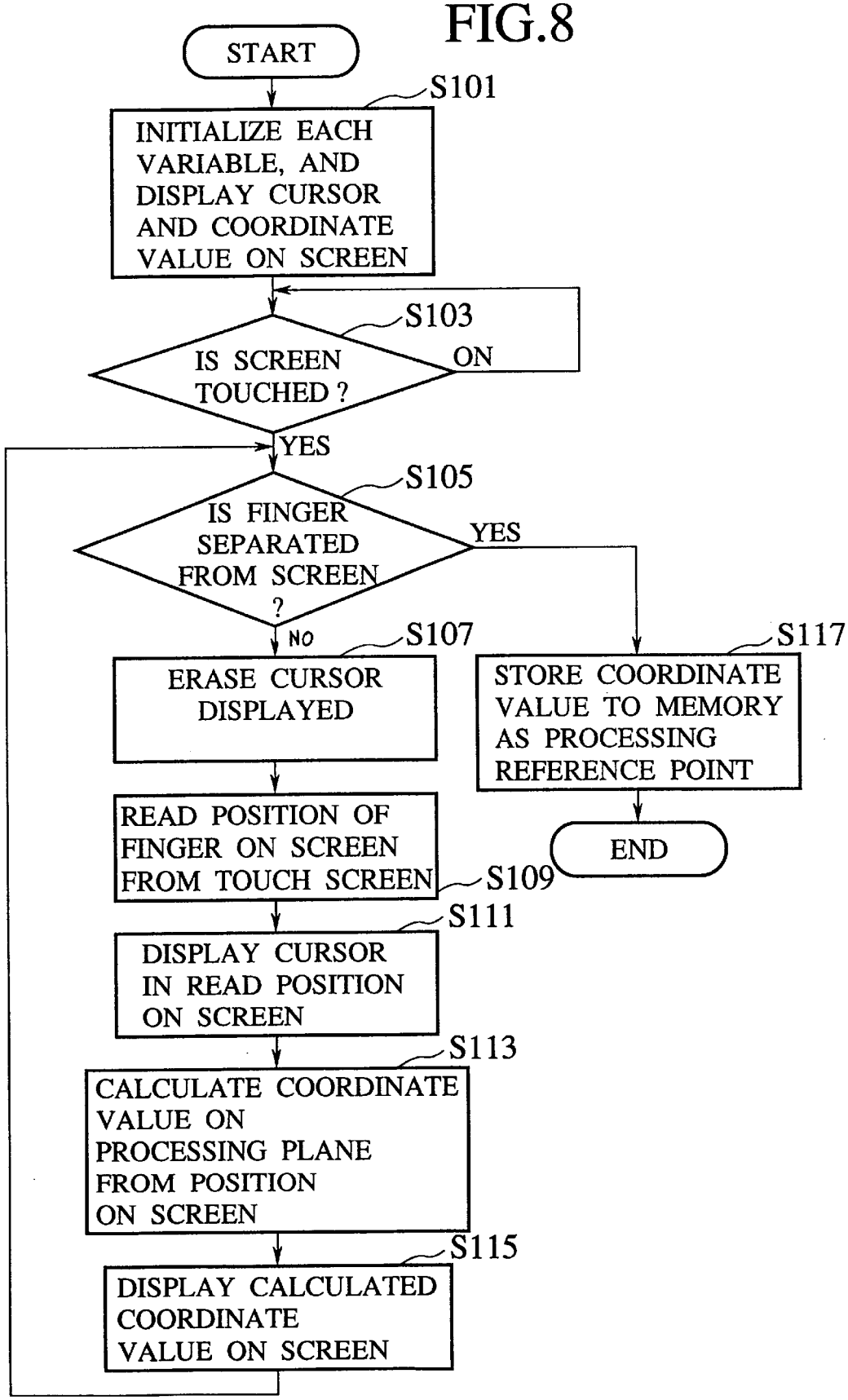
FIG. 8 is an operating flow chart of the above second invention.

An operation of the position setting device of the movable member in the laser processing machine in accordance with an embodiment of the second invention will next be explained in detail with reference to a flow chart shown in FIG. 8. In this embodiment, when a position of a processing reference point on the image of a work W is inputted through the touch screen 147 on the display screen of the display unit 145, a movable member such as a work table 7 and a laser processing head 17 can be moved to a desirable position.

Figure 9:
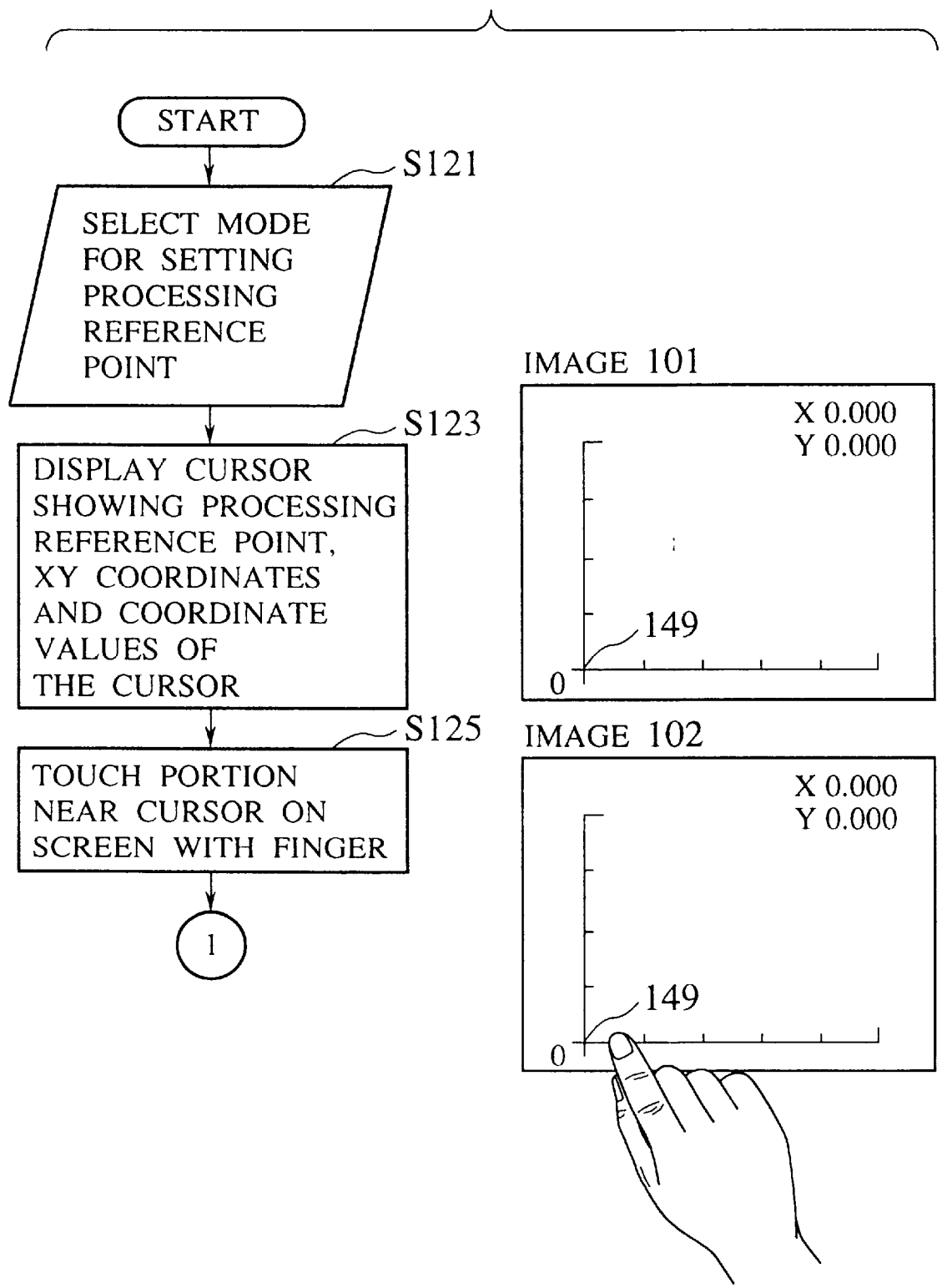
FIG. 9 is a view used to explain a position setting procedure of a movable member in accordance with the above second invention.

First, the CPU 137 sets various values in registers to initial values. Next, in a step S101, various images relating to the processing reference point on a work are displayed on the display screen of the display unit 145. Specifically, as shown in FIG. 9, two-dimensional coordinates fixed to the work, a pointer 149 that represents the present position of the processing reference point, and coordinate values of this pointer 149 are displayed on the display screen. In this embodiment, when the position setting device starts, the pointer 149 is first located at an origin O (0,0) on the two-dimensional coordinates on the work and the laser processing head 17 is located just above the origin O.

The CPU 137 next judges in a step S103 whether position coordinate data are outputted from the touch screen 147, namely, whether the display screen of the display unit 145 is touched. If no display screen is touched, the CPU 137 repeatedly executes the judging processing in step S103. On the other hand, when the display screen is touched, the CPU 137 executes in step S105 a judging process as to whether a finger is separated from the display screen. When it is judged that no finger is separated from the display screen, the process proceeds to steps S107 to Sill, where the CPU 137 erases the pointer 149 displayed on display screen, detects a new position of the finger on the display screen on the basis of signals from the touch screen 147, and displays the pointer 149 at the read position (new position) on the display screen. Further, in steps S113 to S115, the CPU 137 calculates two-dimensional coordinate values of the position of the pointer 149, displays the calculated two-dimensional coordinate values on the display screen and returns to step S105.

In contrast to this, when it is judged in step S105 that the finger is separated from the display screen, the process proceeds to step S117, where the CPU 137 determines the final position coordinate values of the finger on the basis of signals from the touch screen 147 and stores the determined coordinate values to a memory such as the RAM 141 as the final coordinates values of a processing reference point. Then, the CPU 137 completes all process.

Figure 10:
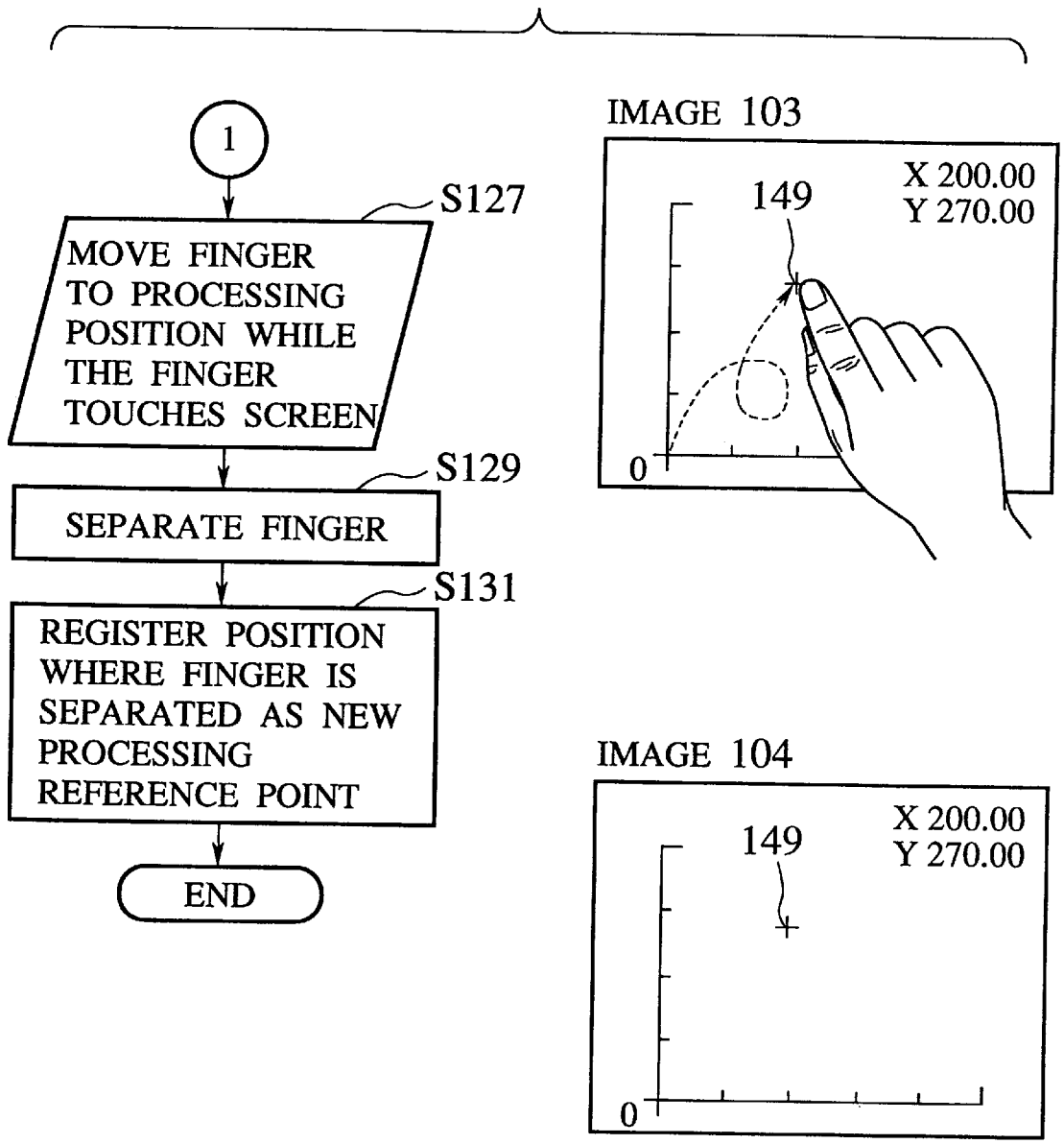
FIG. 10 is another view used to explain the position setting procedure of the movable member in accordance with the above second invention.

A position setting process of the movable member seen from an operator side will next be explained with reference to flow charts shown in FIGS. 9 and 10.

The operator first selects a mode for setting the position of a processing reference point in a step S121. Then, in a step S123, as shown by an image 101 in FIG. 9, X-Y axes fixed to the work, a pointer (cursor) 149 that represents the position of the processing reference point and coordinate values of the pointer 149 are displayed on the display screen of the display unit 145. In a step S125, as shown by an image 102, the operator touches a portion near the pointer 149 located at an origin O on the display screen with a finger. In step S127, as shown by an image 103, when the operator performs a so-called drag movement for moving the finger to a suitable processing position while keeping the finger touching the display screen, the position of the pointer 149 is moved in accordance with the movement of the finger, and the coordinate values of the pointer 149 on the display screen are updated to coordinate values of the moving pointer 149.

In step S129, the operator separates the finger from the pointer 149 on the display screen as shown by an image 104. Then, in step S131, position coordinates of the pointer 149 at that time are registered in a memory as new position coordinates of the processing reference point.

The system for registering the touched position on the screen as a processing reference point may be alternatively constructed as follows. That is, instead of performing the steps S125 to S127, when a operator just touch a desired position on the display screen with the finger, the newly touched position on the screen is immediately stored in a memory as a processing reference point.

Thus, in accordance with the device for setting the position of the movable member in accordance with the present invention, the two-dimensional coordinates of the pointer 149 that represents the position of the processing reference point are displayed on the display screen of the display unit 145. When the pointer 149 is moved to a desired position on the screen by a manual operation of the operator, the processing reference point is set to the desired position. Accordingly, a man-machine-interface between the laser processing machine 1 and the operator is constructed in a manner which is intuitively easy even for a beginner to understand. As a result, the position of the movable members of the laser processing machine can be easily input into the memory of the computer for controlling the laser processing machine.

In accordance with a second embodiment of the above second invention, the construction explained with reference to FIGS. 7 to 10 is applied to the punching press 81 shown in FIG. 6. In this second embodiment, similar to the example for the laser processing machine 1, two-dimensional coordinates of the pointer 149 that represents the position of the processing reference point are displayed on the display screen of the display unit 145, and when the pointer 149 is moved to a desired position by a manual operation of the operator, the processing reference point can be set to the desired position. Accordingly, a man-machine-interface between the punching press 81 and the operator can be constructed in a manner which is intuitively easy even for a beginner to understand. As a result, the position of a movable member of the punching press can be easily input into a memory of a computer for controlling the punching press.

A third embodiment of the second invention will next be explained with reference to FIG. 11. The third embodiment differs from the first or second embodiment as follows. Namely, in the first and second embodiments, the two-dimensional coordinates of the pointer 149 that represents the present position of the processing reference point are displayed on the display screen of the display unit 145. However, in the third embodiment, in place of the pointer 149, an image 151 of a product to be manufactured by the processing machine is displayed together with the two-dimensional coordinates.

A position setting procedure of a movable member in accordance with the third embodiment will next be explained with reference to the flow chart of FIG. 11. An operator first selects a functional mode for setting a processing reference position by a manual operation. Then, as shown by a image 105 in FIG. 11, two-dimensional coordinates and a product image 151 are displayed on the display screen of the display unit 145. Accordingly, it is easy to confirm the shape of the product 151 to be manufactured and the position of the product 151 relative to the work W from which the product is separated. Then, as shown by an image 106, the operator touches the product image 151 on the display screen with a finger and drags the product image 151 to a desired processing position.

Then, as shown by an image 107, the position of the product image 151 is moved in accordance with the movement of the finger. When the operator separates the finger from the product image 151 on the display screen, the position of the product image 151 at that time is registered as a processing reference position.

The product images 151 previously registered can be erased from the display screen by canceling the registration before actual laser processing being carried out. On the other hand, after the laser processing is completed, the product images 151 that have registered before the laser processing are kept displayed on the screen until the work clamping device 9 releases gripping of the work W. Thus, there is no danger that the processing reference position is again set to a position where a product has already been cut out from the work W.

The device may further be constructed as follows. When the positions of new product images 151 are sequentially set at a region in proximity to the position where the same product 151 has been already cut out from the work W, the new product images 151 are automatically displayed above, below, on the right and the left of the image 151 of old product at predetermined intervals P1 and P2 as shown by the image 107. In such a construction, operability is greatly improved when the positions of the new product images 151 are sequentially set.

In the foregoing description, the position setting procedure of the movable member of the laser processing machine has been explained. However, the third embodiment can be also applied to a control device for punching press 81.

Thus, in the third embodiment, the product image 151 is displayed together with the two-dimensional coordinates on the display screen. Further, the product image 151 is moved to a desired position by a manual operation so that the processing reference position is set to the desired position. Accordingly, a man-machine-interface between the operator and the plate material processing machine 1 or 81 can be constructed in a manner which is intuitively easy even for a beginner to understand. As a result, it is easy to set the position of a movable member of the plate material processing machine with respect to the work W.

The present invention is not limited to the above embodiment, but can be embodied in other forms by adding a suitable change to the above ones.

Namely, for example, the present invention can be applied to the positioning of the laser processing head in a Z-axis direction. That is, an image of an object to be set in a desired position on the display screen may be the image of the laser processing head raised and lowered in a Z-axis direction.

Further, if a terminal unit connected to the PLC is arranged in a location, such as a centralized control room and the like, which is far away from that of the plate material processing machine, the operator at the terminal unit can set the positions of the movable member of the plate material processing machine by remote control while viewing an image displayed on the display screen of the terminal unit through a network such as a LAN within the factory or a public telephone line and the like.

The actual movable member of the plate material processing machine may synchronously move to a desired position with its image on the display screen during the position setting process, or may not move to the desired position until the system receives a command signal for commanding the actual movement of the movable member after the position setting process.

As explained above in detail, in accordance with the second invention of this application, the pointer that represents the position of the movable member is displayed on the display screen together with rectangular coordinates axes that represents the position of the work. Further, an arbitrary position on the work is determined by manually inputting the coordinates of the position into a control device; then, a setting operation of positioning the movable member to an arbitrary desired position is carried out. Accordingly, a man-machine-interface between the plate material processing machine and the operator is constructed in a manner which is intuitively easy even for a beginner to understand. As a result, the positioning of the movable member in the plate material processing machine can be easily carried out.

Further, the pointer image that represents the position of the movable member is displayed on the display screen and dragged to an arbitrary desired position by the manual operation. Accordingly, it is easy to enter the desired position of the movable member of the plate material processing machine into its control device.

Furthermore, the pointer image that represents the position of a processing reference point is displayed on the display screen of the display means. A desired position where the pointer is to be located is entered into a control device by manually designating that position on the screen. Then, the setting operation for positioning the movable member to an arbitrary object position is automatically carried out and the movable member is moved to that desired position. Accordingly, it is easy to set the position of the movable member in the plate material processing machine.

Further, a product image is displayed on the display screen of the display means together with the coordinate axes that represents the work, and is dragged to a desired position relative to the coordinate axes. Thus, a setting operation for positioning a processing reference point to the desired position is automatically performed and the movable members of the processing machine are moved to respective positions corresponding to the desired position of the product on the work. Accordingly, it is easy to set the positions of the movable members of the plate material processing machine.

In the last case, the product image displayed at the desired position is kept displayed on the display screen until a work clamping device gripping a work releases this work, even after processing corresponding to the product is completed. Accordingly, there is no danger that a processing reference position is erroneously set to a position where the work has been already cut out to generate the product.

With reference to FIGS. 12 to 16, an embodiment of the operating state setting method and the operating state setting device for a plate material processing machine in accordance with the third invention of this application will next be described in detail.

Figure 12:
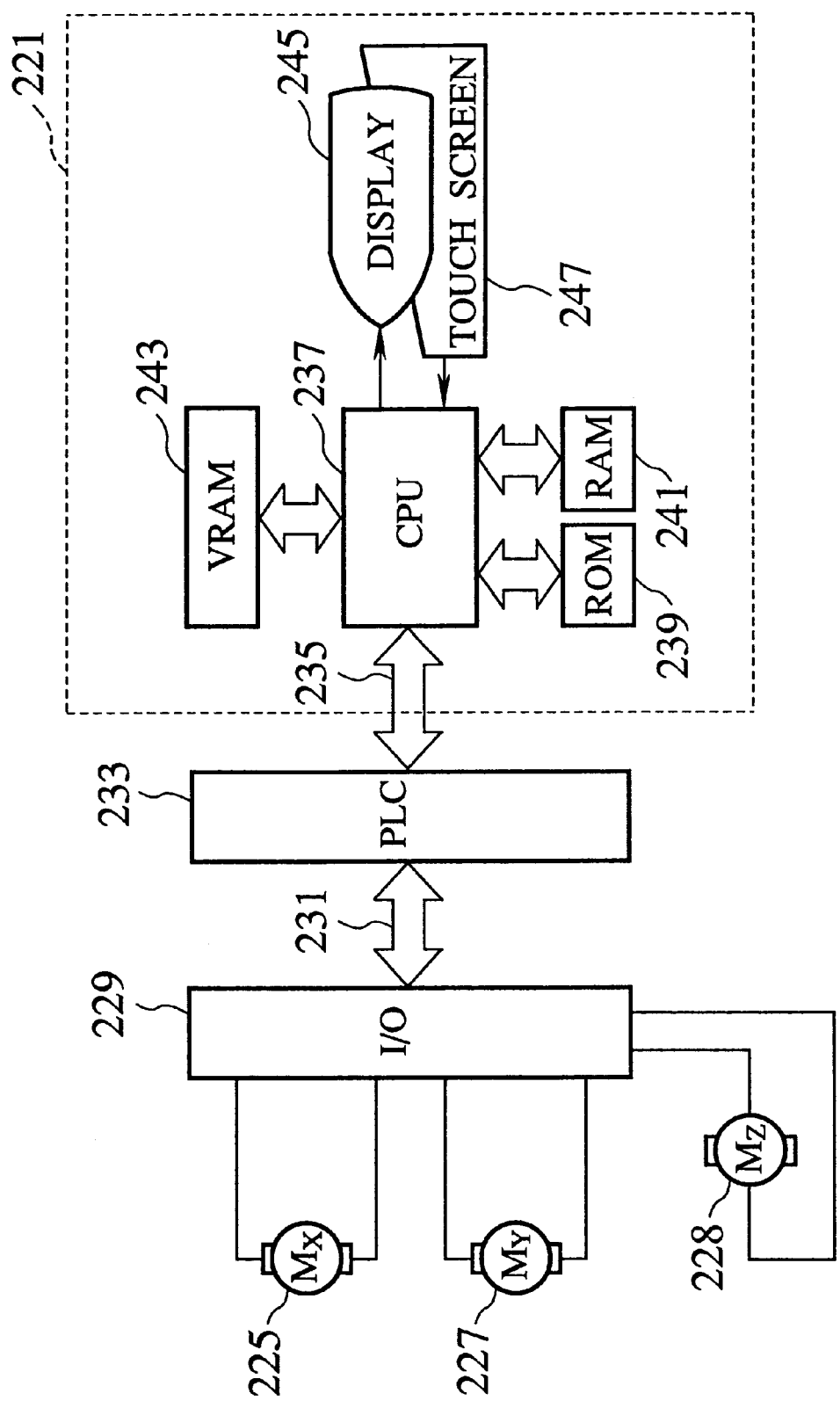
FIG. 12 is a block diagram showing a main portion of the above third invention.

A laser processing machine acting as the plate material processing machine substantially has the same construction as the laser processing machine shown in FIG. 1. However, as shown in FIG. 12, this laser processing machine has an X-axis drive motor 225, a Y-axis drive motor 227 and a Z-axis drive motor 228. The X-axis drive motor 225 moves the above work table 7 in an X-axis direction. The Y-axis drive motor 227 moves a Y-axis carriage 15 for supporting the above processing head 19 in a Y-axis direction. The Z-axis drive motor 228 vertically moves a laser processing head 17 with respect to the above Y-axis carriage 15.

With reference to FIG. 12, each of the X-axis drive motor 225, the Y-axis drive motor 227 and the Z-axis drive motor 228 is connected to an I/O 229 connected to a programmable logic controller (hereafter, called a PLC) 233. Data that represents the operating state of the laser processing machine 1, such as information of rotating positions of the X-axis drive motor 225, the Y-axis drive motor 227 and the Z-axis drive motor 228, are inputted to the PLC 233 through a parallel transmitting cable 231. The PLC 233 sequentially controls the operating state of the laser processing machine 1 with reference to inputted control data. For example, this PLC 233 is connected to an NC controller 221 through a bidirectional communication interface 235 such as RS232C and the like. Similar to the above NC controller 21, this NC controller 221 is constructed by a terminal unit such as a personal computer and the like and is arranged in an upper portion of the above side frame 11R through a bracket 23. This NC controller 221 can be constructed by adding a personal computer board to the NC controller of a conventional type or adding to the personal computer an NC board with NC functions. In any case, an operating state setting device having excellent operability for the laser processing machine is achieved by constructing a man-machine-interface function between the laser processing machine 1 and an operator by a personal computer equipped with an operating system (hereafter, called an OS) of excellent operability such as "Windows" manufactured by Microsoft Corporation and the like.

More particularly, the above PLC 233 is connected to a CPU 237 built in the above NC controller 221 through the above interface 235. This CPU 237 is connected to a ROM 239 for storing various kinds of processing programs and a RAM 241 for storing various kinds of processing data. The CPU 237 is also connected to a video RAM (hereafter, called a VRAM) 243 and a display unit 245. The above VRAM 243 receives commands from the CPU 237, reads image data corresponding to these commands from plural image data stored in a memory such as the RAM 241 and stores the read image data in its memory area. The above display unit 245 displays the image data read from the above VRAM 243 on its display screen. This display unit 245 is connected to a touch screen 247 that covers the surface of the display screen of the display unit 245. The touch screen 247 detects the coordinates of the position on the display screen where an operator touches with his finger or a write pen. The touch screen 247 outputs the coordinates data to the CPU 237.

Figure 13:
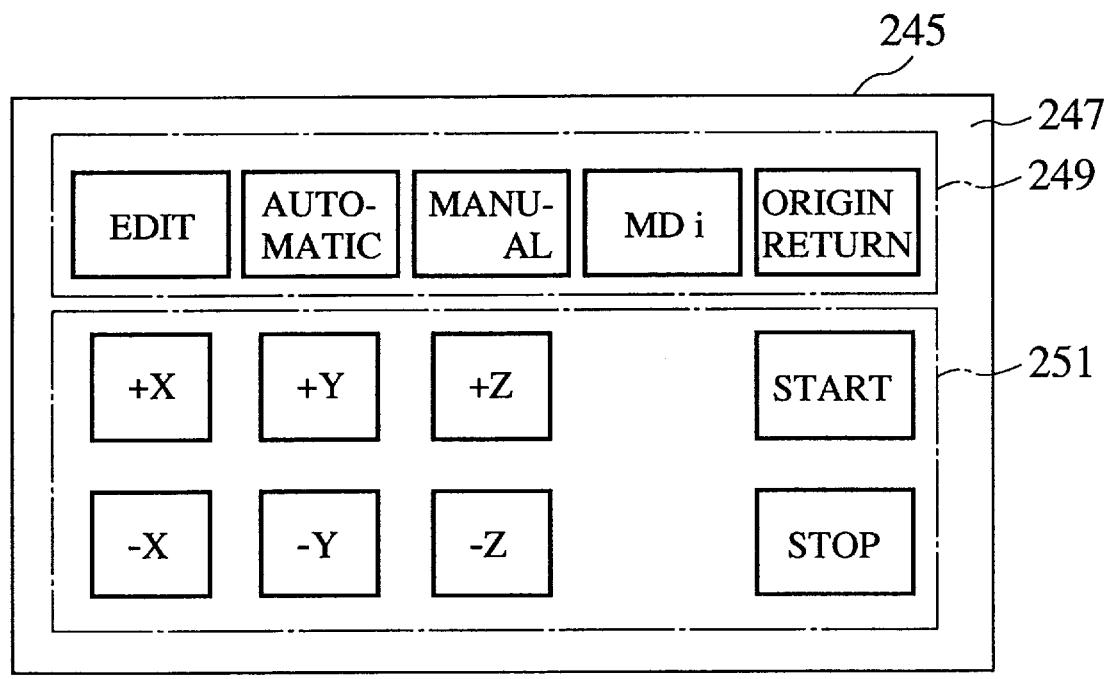
FIG. 13 is a view showing one example of the display screen of a display unit at an operating state setting time in the above third invention.

Plural keys displayed on the display screen of the above display unit 245 will next be explained with reference to FIG. 13. Each of the plural keys is responsible for selecting one of a plurality of functions each relating to operating state of the laser processing machine. Specifically, a setting operation for selecting one of the operating states of the laser processing machine 1, which includes the NC controller, is performed by selecting one of these plural keys.

The above keys are generally classified in two groups: headline keys 249 for allowing inputs at an initial stage and secondary keys 251 for allowing inputs at a secondary stage after a selection of one of the headline keys 249. Further, the above headline keys 249 and the secondary keys 251 are hierarchically associated with each other so that one or more secondary keys 251 are subordinate to a certain headline key 249. Key hierarchical information with respect to this association is stored in a memory such as the above RAM 241 and the like, in advance. As described later, when a certain headline key 249 is operated at the initial stage, this key hierarchical information is referred to in reading of the secondary key 251 for allowing an input at the secondary stage subsequent to this initial stage.

For example, the above plural keys include an unillustrated ten key having an allocated function for inputting Arabic numerals, an unillustrated alphabet key having an allocated function for inputting an alphabet. Further, as shown in FIG. 13, the plural keys includes various keys as follows: an "automatic" mode selecting key AUTOMATIC having an allocated function for executing an NC processing program for carrying out a certain processing on a certain product; a "manual" mode selecting key MANUAL having an allocated function for moving the movable member, such as the work table and the laser processing head and the like, to an arbitrary position by a manual operation; an "editing" mode selecting key EDIT having an allocated function for editing an NC processing program; an "MDi" mode selecting key MDi having an allocated function for inputting NC data by using the ten key and the alphabet key and the like and for moving the movable member along a predetermined path in accordance with the inputted NC data; an "origin return" mode selecting key ORIGIN RETURN having an allocated function for returning the movable member to an original position. The above plural keys also include a moving key such as "+X", "+Y", "+Z", "−X", "−Y", "−Z" and the like. This moving key is used when the "origin return" mode selecting key or the "manual" mode selecting key is selectively inputted and the like. The moving key has an allocated function for designating a moving direction and a moving distance of the movable member. The above plural keys also include a "start" key START used when the "automatic" or "MDi" mode selecting key is selectively inputted and the like. The "start" key START has an allocated function for executing a operation predetermined in the selected mode. The above plural keys further include a "stop" key STOP used when the "automatic" or "manual" mode selecting key is selectively inputted. The "stop" key has an allocated function for stopping operations in the selected mode.

These plural keys are classified by the attribute as follows. That is, as shown in FIG. 13, the group of the headline key 249 includes mode selecting keys such as the "automatic" mode selecting key, the "manual" mode selecting key, the "editing" mode selecting key, the "MDi" mode selecting key, the "origin return" mode selecting key and the like. The group of the secondary key 251 includes moving keys "+X", "+Z", "−X", "−Y", "−Z", the "start" key and the "stop" key.

Key hierarchical information for associating the headline key 249 and the secondary key 251 with each other is provided as follows. Namely, the "start" key and the "stop" key as the secondary key 251 are subordinate to the "automatic" mode selecting key as the headline key 249. Moving keys such as "+X", "+Y", "+Z", "−X", "−Y", "−Z" and the "stop" key are subordinate to the "manual" mode selecting key. No key is subordinate to the "editing" mode selecting key. The "start" key and the "stop" key are subordinate to the "MDi" mode selecting key. Further, moving keys such as "+X", "+Y", "+Z", "−X", "−Y", "−Z" and the "stop" key are subordinate to the "origin return" mode selecting key.

Accordingly, for example, when the "automatic" mode selecting key acting as the headline key 249 is operated at the initial stage, this operating stage is transferred to the secondary stage. And at this secondary stage, the "start" key and the "stop" key as the secondary key 251 are read on the basis of the key hierarchical information and are displayed, and/or an input of an instruction thereby is allowed.

Figure 14:
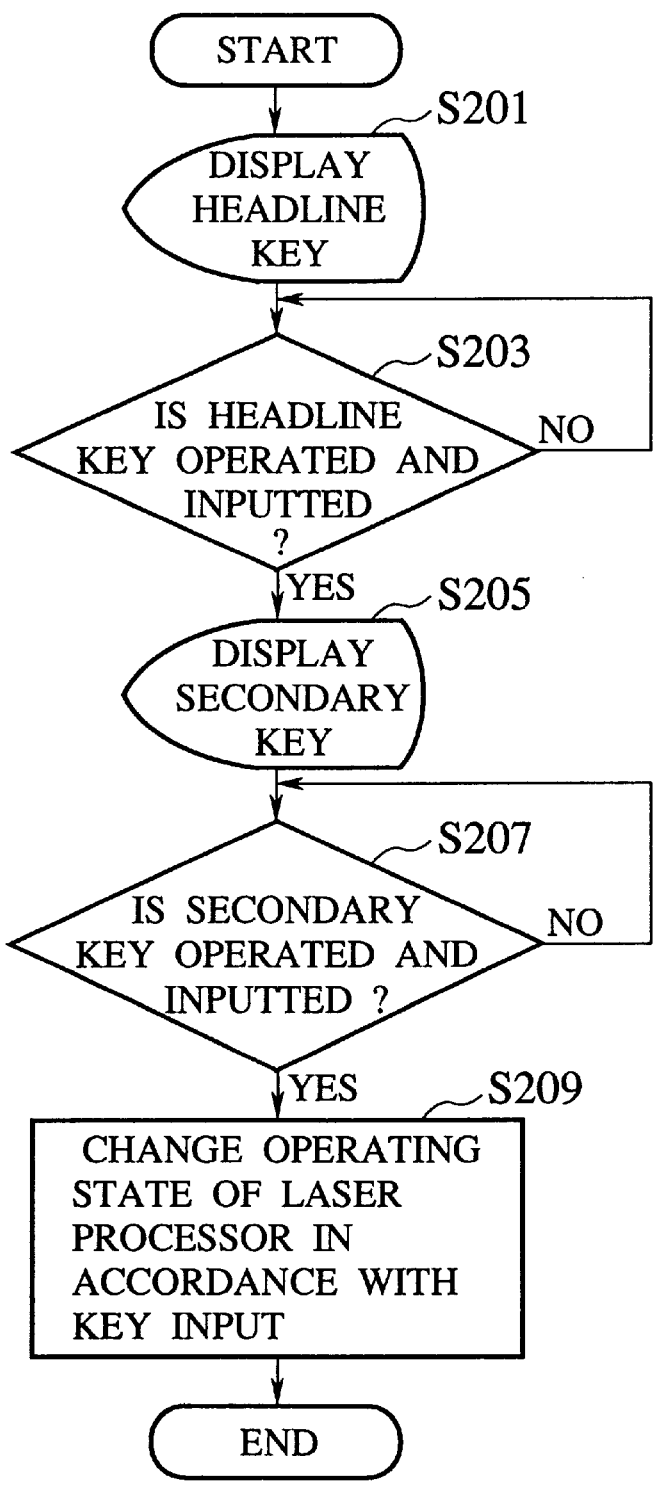
FIG. 14 is an operating flow chart of the above third invention.

An operation of the operating state setting device of the above laser processing machine will next be described with reference to the block diagram of FIG. 12 and the operating flow chart of FIG. 14.

The CPU 237 first reads image data including the arrangement of the headline keys 249 from a memory, such as the RAM 241 and stores the same in a memory area of the VRAM 243. Then, the images of the headline keys 249 are displayed on the display screen of the display unit 245 in a step S201. Next, the CPU 237 judges in a step S203 whether one of the headline keys 249 is operated and inputted. The input judgment in step S203 is repeatedly executed until any headline key 249 is operated and inputted.

When an operator touches an image of any headline key 249 with a finger, it is confirmed in step S203 that the headline key 249 is operated and inputted. Thus, upon reception of this input of the headline key 249, the CPU 237 reads the secondary keys 251 associated with the class of this headline key 249 on the basis of the information regarding the class of the headline key 249 and the information regarding key hierarchy stored in a memory device. Further, the CPU 237 stores in a memory area of the VRAM 243 the image of the arrangement of the above secondary keys 251 that has been stored in the memory device such as the RAM 241. Then, the image of the secondary keys 251 are displayed on the display screen of the display unit 245 in a step S205. The CPU 237 next judges in a step S207 whether the secondary key 251 is operated and inputted. The judgment in step S207 is repeatedly executed until any secondary key 251 is operated and inputted.

When the operator touches the image of any secondary key 251 with a finger during the judgment of step S207, it is considered that the secondary key 251 is operated and inputted. The CPU 237 receives this input signal from the secondary key 251.

Then, the CPU 237 sets the operating state of the laser processing machine to an operating state corresponding to the above combined signal (i.e. the signal from the selected headline key 249 and the signal from the selected secondary key 251), and the operating state of the laser processing machine is actually changed to this operating state (step S209).

When the "editing" mode selecting key is operated and inputted as the headline key 249 in the above operating flow chart, processing associated with the secondary key 251 in steps S205 to S207 is omitted since no key is subordinate to the "editing" mode selecting key.

Figure 16:
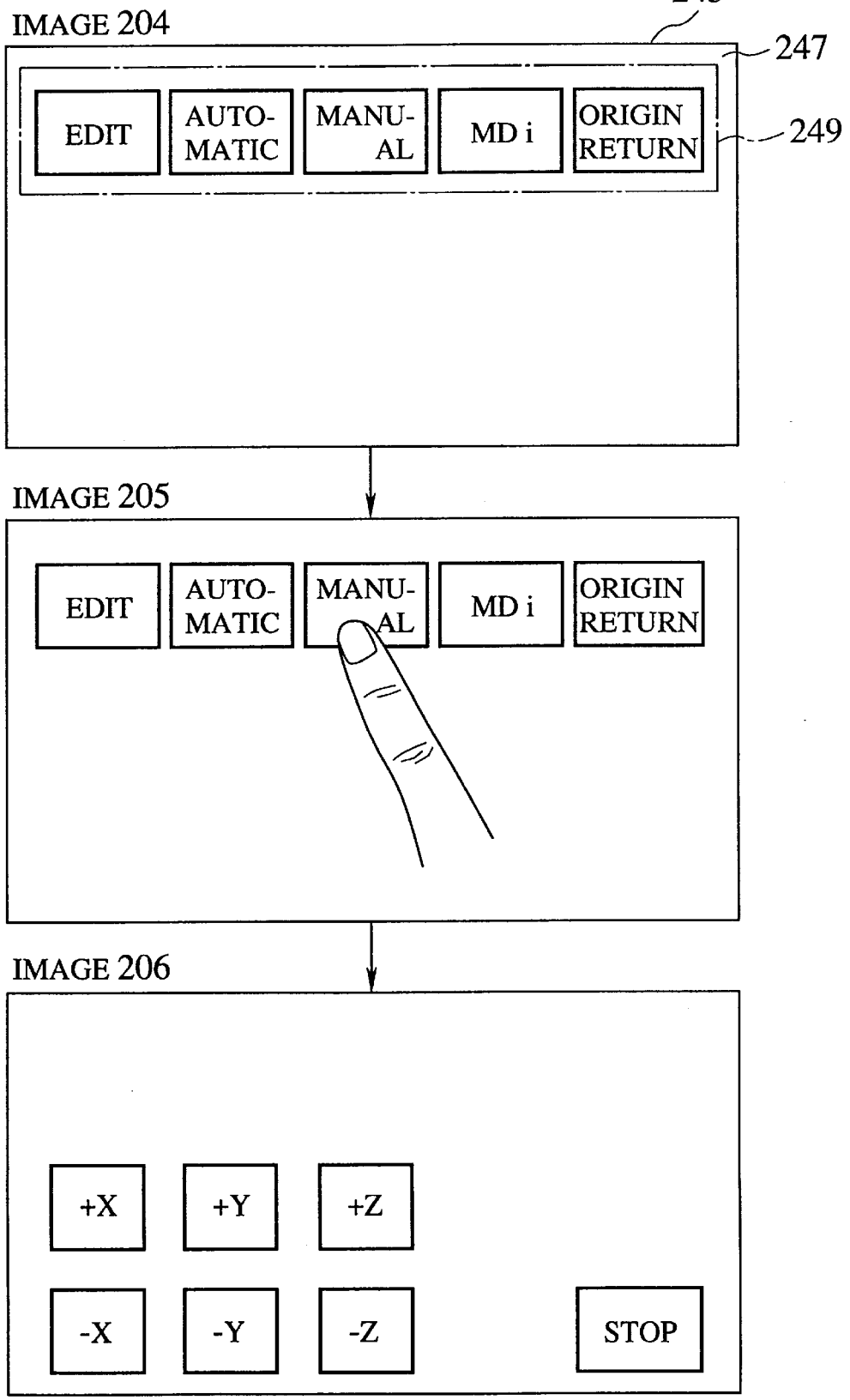
FIG. 16 is another view used to explain the operating state setting procedure in accordance with the above third invention.

An operating state setting procedure of the laser processing machine in accordance with the present invention will be further explained with reference to display pictures shown in FIGS. 15 and 16, where the "automatic" mode selecting key is operated and inputted and the "manual" mode selecting key is operated and inputted at the initial stage, respectively.

The case where the "automatic" mode selecting key is operated and inputted at the initial stage will first be explained with reference to FIG. 15. As shown by an image 201, all headline keys 249 are displayed as a list at the initial stage. At this time, when an operator touches an image of the "automatic" mode selecting key AUTOMATIC with a finger (as shown by image 202), it is considered that the "automatic" mode selecting key is operated and inputted. Thus, as shown by an image 203, the "start" key START and the "stop" key STOP subordinate to the "automatic" mode selecting key AUTOMATIC are displayed on the display screen of the display unit 245. At this time, the "automatic" mode selecting key AUTOMATIC may be continuously displayed. When the operator further touches an image of the "start" key START in the image 203 with a finger, it is considered that the "start" key is operated and inputted. Thus, the setting of the operating state of the laser processing machine 1 is completed, and the operating state is changed to a state corresponding to the combination of the "automatic" mode selecting key and the "start" key. Then, an NC processing program that describes a processing procedure for a certain product is executed, and the laser processing machine 1 are operated in accordance with that NC processing program.

More particularly, for example, the work table 7 is moved in the X-axis direction in accordance with NC data transmitted from the NC controller 21, and the Yaxis carriage 15 is moved in the Y-axis direction, so that a work W and a laser processing head 17 are suitably positioned relative to each other in an XY plane. Then, a laser beam from a laser oscillator is transmitted through the bend mirror and the condenser lens to the laser nozzle 19 and irradiated onto the work W; further, in order to make a focal adjustment, the laser processing head 17 is moved to a suitable position in the Z-axis direction. Thus, a desirable laser processing of the work W such as cutting, punching and the like is performed.

The case where the "manual" mode selecting key is operated and inputted at the initial stage will next be explained with reference to FIG. 16. As shown by an image 204, all headline keys 249 are displayed as a list at an initial stage. At this time, when an operator touches an image of the "manual" mode selecting key MANUAL with a finger (see image 205), it is considered that the "manual" mode selecting key is operated and inputted. Thus, as shown by an image 206, moving keys such as "+X", "+Y", "+Z", "−X", "−Y", "−Z" and the like and the "stop" key STOP subordinate to the "manual" mode selecting key MANUAL are displayed (image 206) on the display screen of the display unit 245. When the operator further touches, for exapmle, an image of the "+X" key in the image 206 with a finger, it is considered that the "+X" key is operated and inputted. Thus, the setting of the operating state of the laser processing machine 1 is completed, and the operating state is changed to a state corresponding to a combination of the "manual" mode selecting key MANUAL and the "+X" key +X. Here, the X-axis drive motor 225, for example, is actuated only for a period during which the "+X" key is touched by the finger, and the work table 7 is moved only by a distance corresponding to the period for which the drive motor 225 is actuated.

Thus, in accordance with the operating state setting device of the laser processing machine in the present invention, a man-machine-interface between the laser processing machine 1 and the operator is constructed in a manner which is intuitively easy even for a beginner to understand. Further, for each operation stage, the headline keys 249 or the secondary keys 251 are selected from a large number of keys and consecutively displayed on the display screen of the display unit 245. That is, for each operation stage, suitable number of keys are selected and activated (i.e. the input of only such keys are allowed). In other words, keys not corresponding to a certain operating stage is deactivated (i.e. the input of such keys are prohibited). Accordingly, an error in key input operation is prevented from occurring even when an operator having little experience is setting the operating state of the laser processing machine. The present invention is not limited to the above embodiment, but can be carried out in other forms by making a suitable change to the present invention.

For example, in the foregoing embodiment, key operating stages consists of two stages, the initial and secondary stages. However, the secondary stage is not limited to only a actual single stage, but also includes two or more stages. Accordingly, when the present invention is applied to a large number of keys, the number of headline keys displayed at the initial stage can be reduced to a small number in consideration of operability by setting a key hierarchy to a suitable depth.

In the foregoing embodiment, a key activated at a certain stage is displayed and no key deactivated is displayed. However, the present invention is not limited to this form. Deactivated keys can be displayed in a form to be discriminated from the activated keys; for example, the deactivated keys are displayed in thin color and the like.

Further, in the present invention, when a terminal unit connected to the PLC is located in a place such as a centralized supervisory room and the like far from the laser processing machine, the operating state of the laser processing machine can be set by remote control while an image displayed on the display screen of the display unit of the terminal unit is visualized through a network such as a LAN within facilities or a public telephone line and the like.

Finally, in this embodiment, keys displayed on the display screen are updated for each operating stage. However, the present invention is not limited to this form. For example, plural window pictures can be simultaneously displayed in parallel with each other on one display screen by using a multi-window display function of "Windows" as an OS without updating the display picture. In such a construction, the history of a key input selected for each operating stage can be confirmed easily so that operability is further improved.

As explained above in detail, in accordance with the third invention of this application, a man-machine-interface between the laser processing machine and an operator is constructed in a manner which is intuitively easy even for a beginner to understand. Further, headline or secondary keys are selected from plural keys for every operating stage and displayed on the display screen of a display means. And keys displayed on the display screen are selectively activated (i.e. input of only these keys are allowed). In other words, keys not corresponding to a certain operating stage are deactivated (that is, input of such keys are inhibited). Accordingly, an error in key input is prevented from occurring even when an operator having little experience is setting the operating state of the laser processing machine. As a result, an operation for setting the operating state of the laser processing machine has a extremely excellent operability.

When the operator touches the secondary key displayed on the display screen of the display means, the secondary key is considered to be operated and inputted and the operating state of the laser processing machine is set. Then, this operating state is changed to a state according to a key input corresponding to the combination of the above headline key and this secondary key.

Furthermore, a man-machine-interface between the laser processing machine and the operator is constructed in a manner which is intuitively easy even for a beginner to understand. Both the headline key and the secondary key are displayed on the display screen of the display means. The input of a corresponding key is selectively allowed among the plural keys for every operating stage. In other words, the input of a key not corresponding to a certain operating stage is inhibited. Accordingly, an error in key input is prevented from occurring even when an operator having little experience is setting the operating state of the laser processing machine. As a result, an operation for setting the operating state of the laser processing machine has extremely excellent operability.

Further, when the operator touches the secondary key displayed on the display screen of the display means by a secondary key display control means, a secondary key input taking-in means considers that this secondary key is operated and inputted. Thus, the secondary key input taking-in means takes in this input of the secondary key. A laser processing machine operating state setting means receives this input of the secondary key to change the operating state of the laser processing machine to a state according to a key input corresponding to the combination of the headline key taken in by a headline key input taking-in means and the secondary key taken in by the secondary key input taking-in means.

One embodiment of a processing condition display method and apparatus for a laser processing machine in accordance with the fourth invention of this application will next be explained in detail with reference to FIGS. 17 to 21.

Figure 17:
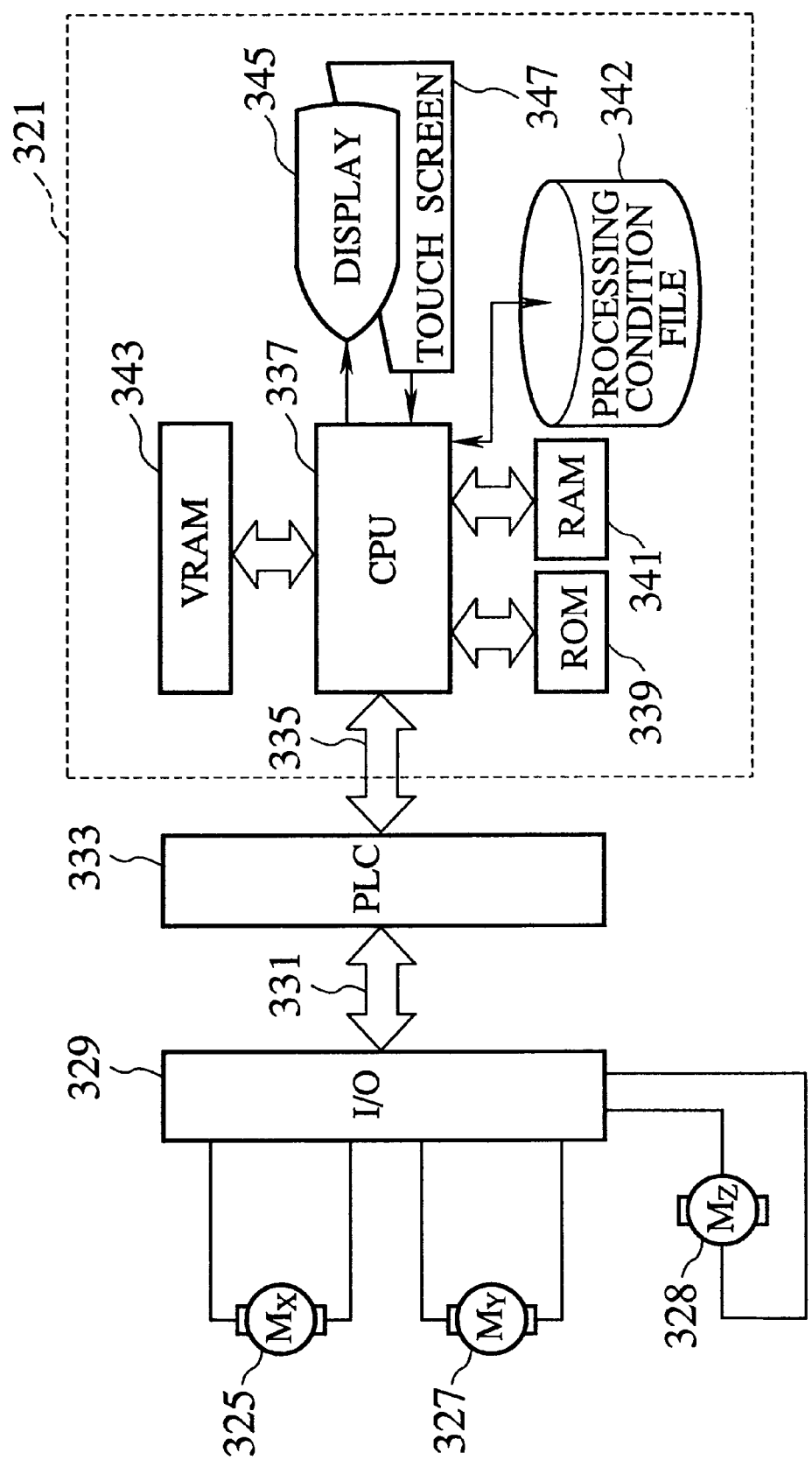
FIG. 17 is a block diagram showing a main portion of the above fourth invention.

The laser processing machine acting as a plate material processing machine in which the fourth invention of this application is applied substantially has the same construction as the laser processing machine shown in FIG. 1. However, as shown in FIG. 17, this laser processing machine has an X-axis drive motor 325, a Y-axis drive motor 327 and a Z-axis drive motor 328. The X-axis drive motor 325 moves the above work table 7 in an X-axis direction. The Y-axis drive motor 327 moves a Y-axis carriage 15 for supporting the above processing head 19 in a Y-axis direction. The Z-axis drive motor 328 vertically moves a laser processing head 17 with respect to the above Y-axis carriage 15.

With reference to FIG. 17, each of the X-axis drive motor 325, the Y-axis drive motor 327 and the Z-axis drive motor 328 is connected to an I/O 329 connected to a programmable logic controller (hereafter, called a PLC) 333. The PLC 333 receives data representing an operating state of the laser processing machine 1 such as information of rotating positions of the X-axis drive motor 325, the Y-axis drive motor 327 and the Z-axis drive motor 328 through a parallel transmitting cable 331. The PLC 333 sequentially controls the operating state of the laser processing machine 1 on the basis of the received data. For example, this PLC 333 is connected to an NC controller 321 through a bidirectional communication interface 335 such as RS232C and the like. Similar to the above NC controller 21, this NC controller 321 is constructed by a terminal unit such as a personal computer and the like and is arranged in an upper portion of the above side frame 11R through a bracket 23. This NC controller 321 can be constructed by adding a personal computer board to the NC controller of a conventional type or adding an NC board having an NC function to the personal computer. In any case, a processing condition display function of the laser processing machine, having excellent operability is achieved by constructing a man-machine-interface between the laser processing machine 1 and an operator by a personal computer having an operating system (hereafter, called an OS) of excellent operability such as "Windows" manufactured by Microsoft Corporation and the like.

Namely, as described later, the NC controller 321 generally commands and controls the operating state of the laser processing machine 1. Before a laser processing is executed, the NC controller 321 obtains work data relative to a work material and a work thickness. On the basis of these work data and a processing condition file described later, the NC controller retrieves and extracts data relative to various kinds of processing conditions such as a kind and a pressure of an assist gas, the focal length of a condenser lens arranged within a laser processing head, the aperture of a laser irradiating nozzle, an aperture of the condenser lens and the like. Further, the NC controller 321 displays the various kinds of extracted processing condition data on the display screen of the display unit described later.

More particularly, the above PLC 333 is connected through the above interface 335 to a CPU 337 built in the above NC controller 321. This CPU 337 is connected to an unillustrated FD reader capable of reading or writing stored contents of a floppy disk, an unillustrated hard disk memory device having a data memory capacity such as 1GB and the like, a ROM 339 for storing various kinds of processing programs, and a RAM 341 for temporarily storing various kinds of processing data. The CPU 337 is also connected to a video RAM (hereafter, called a VRAM) 343 and a display unit 345. The above VRAM 343 receives commands from the CPU 337, reads image data corresponding to these commands from plural image data stored in a memory medium such as the above hard disk memory device and the like, and stores such image data in its memory area. The above display unit 345 displays the image data read from this VRAM 343 on its display screen. The CPU 337 is further connected to a processing condition file 342 including processing condition data of the laser processing machine corresponding to the work material and the plate thickness. The processing condition data includes data of a kind and a pressure of an assist gas, the focal length of a condenser lens arranged within the laser processing head, the aperture of a laser irradiating nozzle, an aperture of the condenser lens and the like; those data are interrelated to each other to have a data base structure.

The above CPU 337 reads NC data from a memory medium such as a floppy disk; the NC data includes work data consisting of a processing procedure for plural products and a combination of the material of the work and the work thickness. The read data are temporarily stored in the RAM 341. When a product is selected by an operator, the processing condition file 342 is searched by using the work data of the selected product as a keyword. Thus, processing condition data corresponding to the work data are retrieved and extracted and are displayed on the display screen of the display unit 345.

The surface of the display unit 345 is covered with the touch screen 347 that is electrically connected to display unit 345. The touch screen 347 detects coordinates of the position on the display screen where an operator's finger or a write pen touches. The touch screen 347 outputs position coordinate data to the CPU 337.

Figure 18:
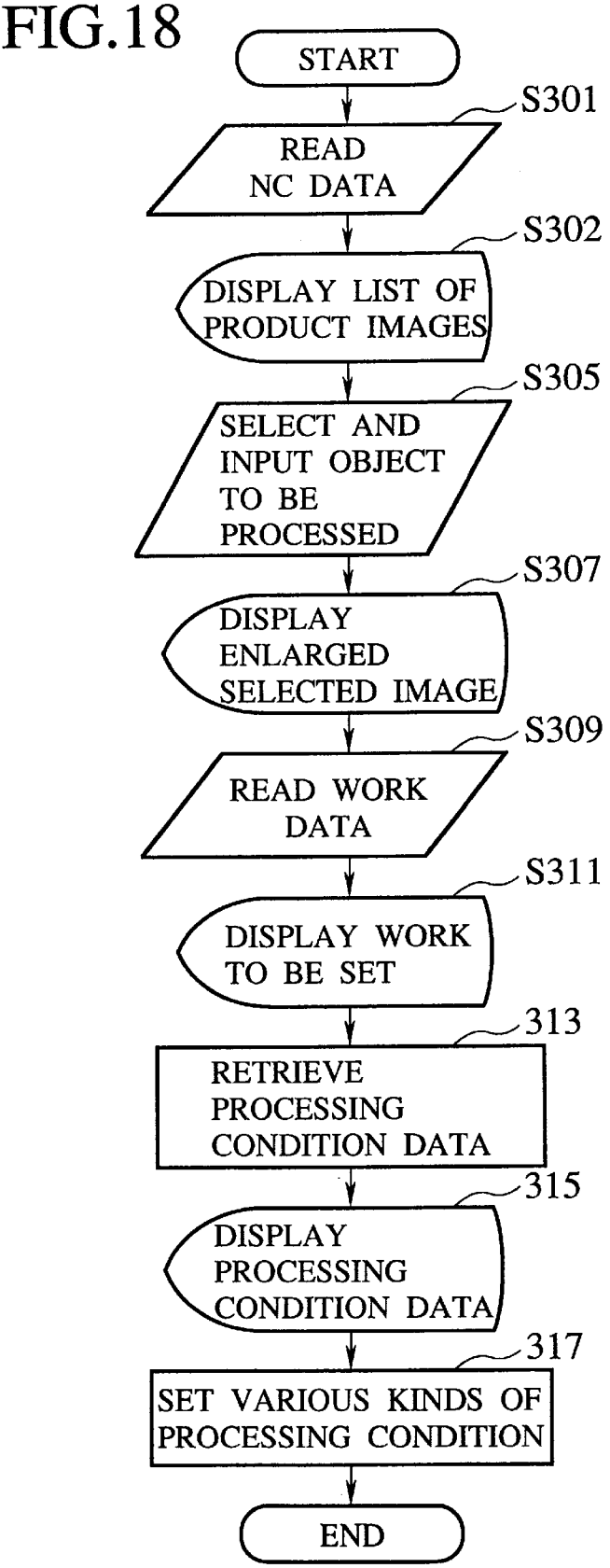
FIG. 18 is an operating flow chart in accordance with one embodiment of the above fourth invention.

An operation of the processing condition display unit of the above laser processing machine will next be explained in detail with reference to the operating flow chart of FIG. 18.

In a step S301, before a desirable laser processing of a work W is carried out, the CPU 337 first reads a group of NC data from a floppy disk. Such NC data includes work data concerning a material of the work and a plate thickness and a processing program for manuacturing predetermined products.

The CPU 337 next reviews past editing histories of the NC data group and selects, for example, latest three NC data on the basis of the editing histories. Then, the CPU 337 sequentially stores each of the product images corresponding to the three NC data in a memory area of the VRAM 343. Then, as shown by an image 301 in FIG. 19, the product images corresponding to the three NC data are displayed on the display screen of the display unit 345, and the CPU 337 waits in a step S302 an input for NC data concerning a product to be processed. At this time, a message of "Select NC data" is displayed on the display screen of the display unit 345 and requests an operator to select and input a product to be processed.

At this time, when the operator touches an image of, for example, PANEL-1 as the product to be processed in the image 301 in FIG. 19 with a finger, the CPU 337 judges in a step S305 that NC data corresponding to the touched product image are selected. The CPU 337 then down-loads the NC data and stores these NC data to the RAM 341. Further, the CPU 337 stores the product image relating to the NC data stored in the RAM 341 in a memory area of the VRAM 343. As shown by an image 302 in FIG. 19, the CPU 337 then displays in enlarged scale the selected product image on the display screen of the display unit 345 and waits for an input as to whether the selected product is correct(step S307).

When the operator judges that the selected product is correct and touches an image of "next" shown in the image 302 in FIG. 19 with a finger, the CPU 337 reads NC data including work data from the RAM 341 in a step S309. The CPU 337 then obtains the work data relating to the material of the work W and the plate thickness. The CPU 337 further stores an image of this work W in a memory area of the VRAM 343. As shown by an image 303 in FIG. 19, the CPU 337 displays a work material of "spc" and a plate thickness of "2.3" together with the image of the work W on the display screen of the display unit 345. In the image 303, the above symbol "spc" means that the material of the work is steel and the numeric value "2.3" means that the plate thickness of the work is 2.3 mm. The CPU 337 then waits for an input as to whether the work W has been set to a predetermined position (step S311).

When the operator judges that the work W has been set to a predetermined position and touches an image of "OK" shown in the image 303 in FIG. 19 with a finger, the CPU 337 carries out a search in the processing condition file 342 by using the above work data as a keyword. Processing condition data of the laser processing machine corresponding to these work data are then retrieved and extracted in a step S313 and are displayed on the display screen of the display unit 345 in a step S315. The processing condition data displayed here include the following: 1) as shown by an image 304 in FIG. 20, an assist gas pressure selector to be used in adjustment of the pressure of an assist gas; 2) as shown by a image 305 in FIG. 20, a portion of the laser processing machine in which various kinds of processing conditions are set, such as a focal length adjusting section to be used in adjustment of the focal length of a condenser lens of the laser processing head; 3) as shown in FIG. 21, a processing condition table describing suitable values for various kinds of processing conditions corresponding to the selected work data. In this display, as shown by the images 304 or 305 in FIG. 20, a value to be set can be also displayed together with the image of the portion of the laser processing machine related to the set value.

In a step S317, while reviewing the processing condition data such as the image of the portion of the machine relating to the processing conditions as well as the processing condition table describing the set values displayed on the display screen of the above display unit 345, the operator sequentially carries out a setting operation of the various values, such as an adjustment of the set value regarding the portion of machine where the various kinds of processing conditions are to be set.

When the setting operations in all object portions is completed and the operator inputs and operates a confirmation key for confirming the work completion, the CPU 337 terminates all processing steps. The images of the object portions and of the processing condition data (e.g., the images 304 and 305) with respect to the plural object portions are updated in data display in a predetermined sequential order. At this time, the system can be arranged such that the foregoing display is updated for each time when the operator confirms that the setting operation with respect to one object portion is terminated.

Thus, in accordance with the processing condition display unit of the laser processing machine in the present invention, the processing condition data of the laser processing machine are displayed in accordance with the work material, the plate thickness and the like on the display screen of the display unit 345. Accordingly, an operator can set a processing condition of the laser processing machine while referring to this display.

Further, as shown in FIG. 20, the image of the object portion and choices of its set value are displayed as the processing condition data of the laser processing machine, as well as a processing condition table shown in FIG. 21. Accordingly, for example, the operator can confirm the object portion relating to the set value by referring to the image of the laser processing head and the like. Further, the operator can carry out the setting operation of the processing condition while referring to the choices of the setting value for the object portion. As a result, an operator having little experience can smoothly perform a setting operation of the processing condition.

The present invention is not limited to the above embodiment, but can be embodied in other forms by adding a suitable change to the present invention.

For example, the processing condition of the laser processing machine displayed on the display screen of the display unit can be an output power of the laser generator, a frequency of a laser pulse, a duty ratio of the laser pulse, a switching time, a nozzle gap, a correcting amount, edge data, aprodata, a palace type and the like.

Further, when the processing condition of the laser processing machine is displayed, plural processing conditions can be simultaneously displayed in parallel with each other on one display screen by using a multi-window function of e.g., "Windows" as an OS.

Further, when a terminal unit connected to the PLC is arranged in a place such as a centralized supervisory room and the like far from the laser processing machine, an image displayed on the display screen of a display unit of the terminal unit is visualized through a network such as a LAN within facilities or a public telephone line and the like. Thus, the processing condition of the laser processing machine to be set can be easily known as if the operator was next to the laser processing machine.

Finally, there may be provided an image pickup means such as a CCD camera and the like for picking up an image of each of the object portions about which the processing condition of the laser processing machine are set. Then, the image of each of the object portions picked up by this image pickup means can be displayed on the display screen of the display unit.

As explained above in detail, in accordance with the forth invention of this application, the processing condition data of the laser processing machine are displayed on the display screen of a display means before a desirable processing of the work is carried out. Accordingly, the operator can perform the setting work of the processing condition while referring to those processing condition data of the laser processing machine. As a result, it is possible even for an operator having little experience to smoothly perform a setting operation of the processing condition.

Specifically, when choices of the set value of a object portion is displayed as the processing condition data on the display screen of the display means, the operator can carry out the setting work of the processing condition while the operator refers to the choices of the set value of the object portion. As a result, it is possible even for an operator having little experience to smoothly perform a setting operation of the processing condition.

Further, in the above case, when an image of the object portion and choices of its set value are displayed as the processing condition data on the display screen of the display means, the operator can confirm the object portion by seeing e.g., an image of the laser processing head and the like; then the operator can carry out the setting work of the a-processing condition while referring to the set value of the object portion. As a result, it is possible even for an operator having little experience to smoothly perform a setting operation of the processing condition, thereby providing extremely excellent effects.

An embodiment of an operating state setting method and an operating state setting device of a laser processing machine in accordance with the fifth invention of this application will next be explained in detail with reference to FIGS. 22 to 26.

Figure 22:
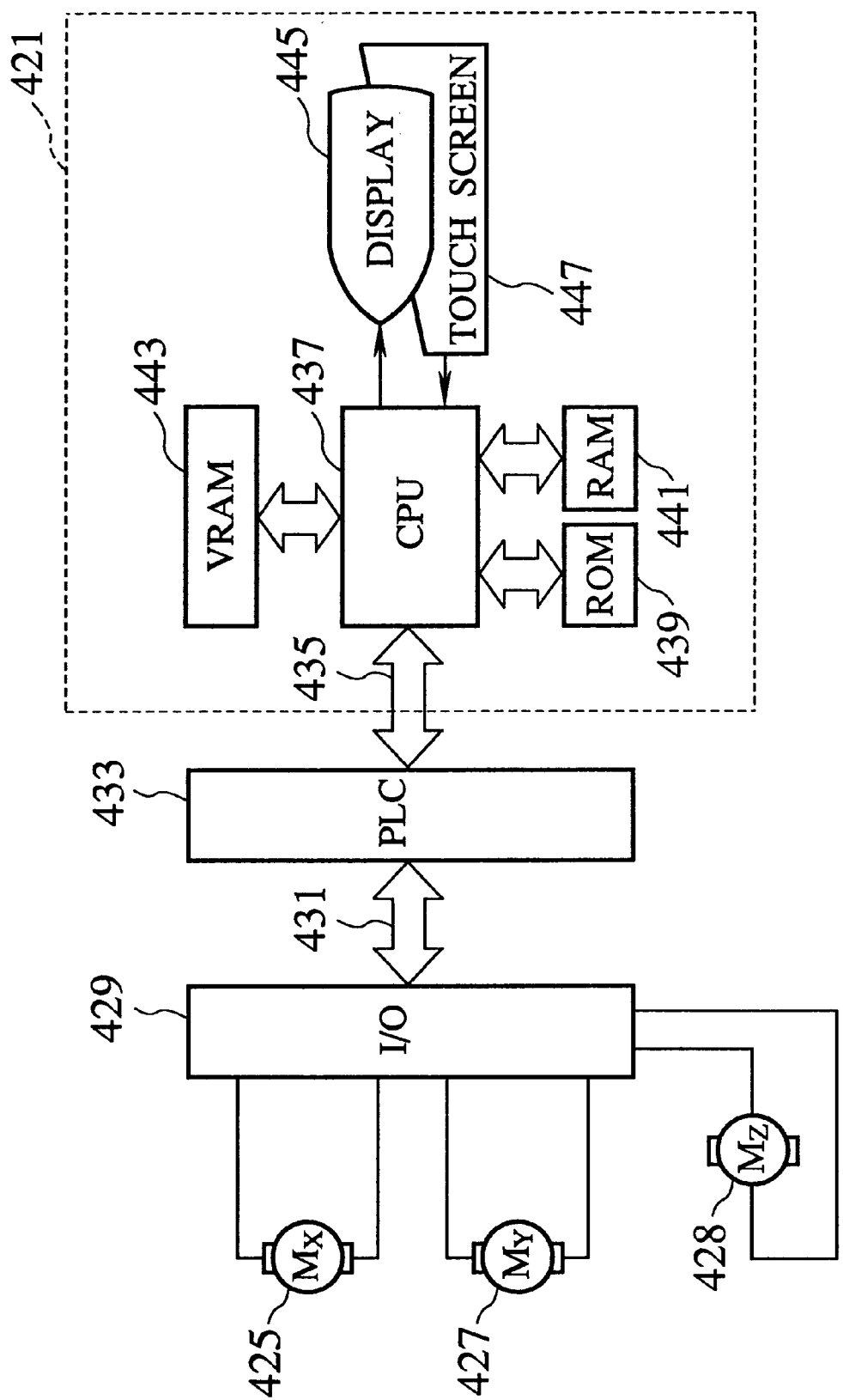
FIG. 22 is a block diagram showing a main portion of the above fifth invention.

The laser processing machine acting as a plate material processing machine to which the fifth invention of this application is applied substantially has the same construction as the laser processing machine shown in FIG. 1. However, as shown in FIG. 22, this laser processing machine has an X-axis drive motor 425, a Y-axis drive motor 427 and a Z-axis drive motor 428. The X-axis drive motor 425 moves the work table 7 in an X-axis direction. The Y-axis drive motor 427 moves a Y-axis carriage 15 for supporting the above processing head 19 in a Y-axis direction. The Z-axis drive motor 428 vertically moves a laser processing head 17 with respect to the above Y-axis carriage 15.

With reference to FIG. 22, each of the X-axis drive motor 425, the Y-axis drive motor 427 and the Z-axis drive motor 428 is connected to an I/O 429 connected to a programmable logic controller (hereafter, called a PLC) 433. The PLC 433 receives data that represent an operating state of the laser processing machine 1, such as information of rotating positions of the X-axis drive motor 425, the Y-axis drive motor 427 and the Z-axis drive motor 428 through a parallel transmitting cable 431. The PLC 433 sequentially controls the operating state of the laser processing machine 1 on the basis of the received data. For example, this PLC 433 is connected to an NC controller 421 through a bidirectional communication interface 435 such as RS232C and the like. Similar to the above NC controller 21, this NC controller 421 is constructed by a terminal unit such as a personal computer and the like and is arranged in an upper portion of the above side frame 11R through a bracket 23. This NC controller 421 can be constructed by adding a personal computer board to the NC controller of a conventional type or adding an NC board having an NC function to the personal computer. In any case, an operating state setting function of the laser processing machine, having excellent operability is achieved by constructing a man-machine-interface between the laser processing machine 1 and an operator by a personal computer having an operating system (hereafter, called an OS) of excellent operability such as "Windows" manufactured by Microsoft Corporation and the like.

That is, this NC controller 421 can perform a setting operation for changing the operating state of the laser processing machine 1 to a desired arbitrary state. The NC controller 421 also actually changes the operating state of the laser processing machine 1 to the set state, monitors this operating state and inform an operator of this operating state by turning a lamp on and off and the like.

More particularly, the above PLC 433 is connected to a CPU 437 built in the above NC controller 421 through the above interface 435. This CPU 437 is connected to a ROM 439 for storing various kinds of processing programs and a RAM 441 for storing various kinds of processing data. The CPU 437 is also connected to a video RAM (hereafter, called a VRAM) 443 and a display unit 445. The above VRAM 443 receives commands from the CPU 437 and reads in response to the commands image data from a memory medium such as the RAM 441 and stores the same in its memory area. The above display unit 445 displays the image data read from the above VRAM 443 on its display screen. This display unit 445 is connected to a touch screen 447 arranged such that a surface of the display screen of the display unit 445 is covered with the touch screen 447. The touch screen 447 detects coordinates of an arbitrary position on the display screen when an operator's finger or a write pen touches the display screen in this position. The touch screen 447 outputs position coordinate data to the CPU 437.

Figure 23:
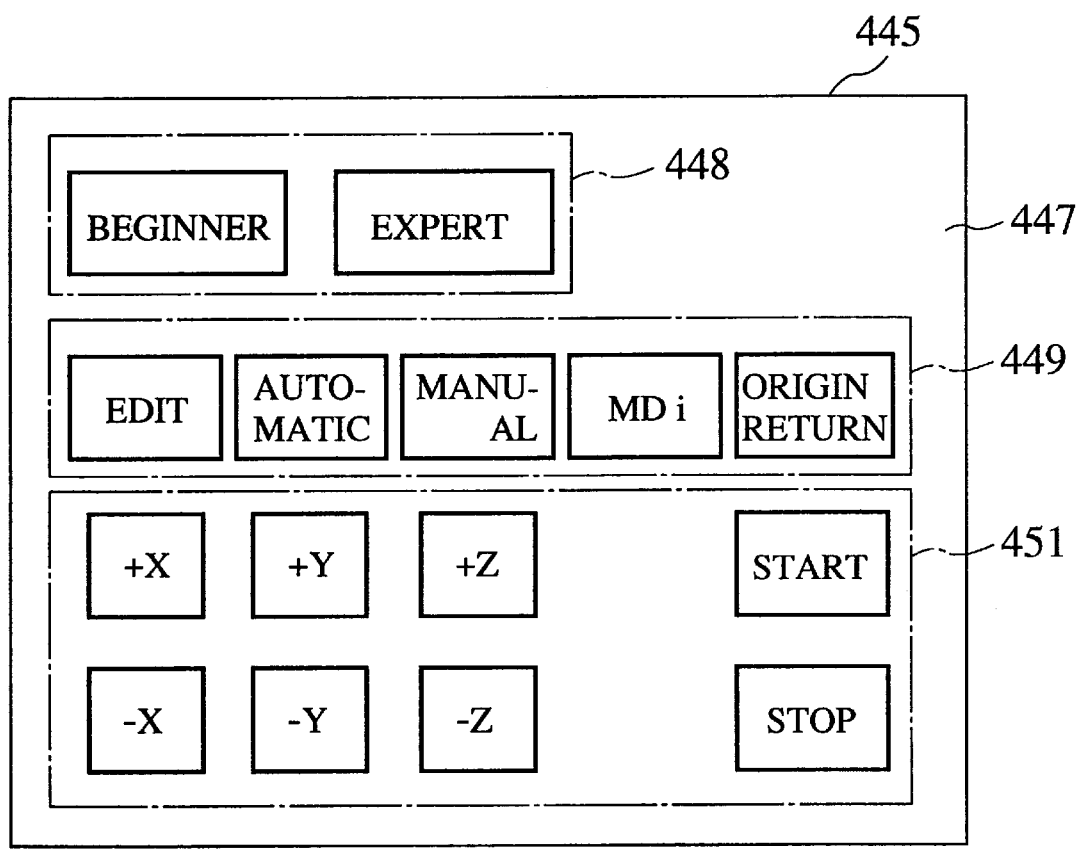
FIG. 23 is a view showing one embodiment of a display screen of a display unit at an operating state setting time in accordance with the above fifth invention.

Plural keys displayed on the display screen of the above display unit 445 will next be explained with reference to FIG. 23. Functions different from each other are respectively allocated to the above plural keys. A setting operation for changing the operating state of the laser processing machine 1 to a desired state is performed by selectively operating and inputting a key corresponding to the desired operation among these plural keys by an operator.

The above plural keys include at least a skill mode selecting key 448 for selecting an expert mode or a beginner mode; the expert mode requires a key input operation in a detailed procedure for expert, and a beginner mode is requires a key input operation in a simple procedure for a beginner. Respective operating procedures in the two modes will be explained later in detail. In the present invention, operating procedure information concerning the respective operating procedures in the above two modes has been stored in a memory medium such as the above RAM 441 and the like in advance. Any one of these two modes is selected in accordance with a degree of the skill of the operator. Thus, a setting operation for changing the operating state of the laser processing machine is easily performed by both an expert and a beginner.

The above plural keys include the skill mode selecting key 448, a headline key 449 and a secondary key 451. This skill mode selecting key 448 is constructed by a beginner key BEGINNER and an expert key EXPERT selected in accordance with the skill degree of the operator. An input of the above headline key 449 is allowed when the expert mode is selected in the above skill mode selecting key 448; the headline key 449 is used when a work mode such as "editing", "automatic" and the like is to be selected. An input of the above secondary key 451 is allowed not only after the above headline key 449 is operated and inputted, but also when the beginner mode is selected by the skill mode selecting key 448. The secondary key 451 is used when instructions on the operation of the laser processing machine such as the movement of a movable member and the like is directly inputted.

More particularly, for example, the above plural keys include an unillustrated ten key having an allocated function for inputting Arabic numerals, and an unillustrated alphabet key having an allocated function for inputting an alphabet. As shown in FIG. 23, the above plural keys also include an "expert" mode selecting key EXPERT requiring a key input operation in a detailed procedure for an expert, a "beginner" mode selecting key BEGINNER requiring a key input operation in a simple procedure for a beginner, and an "automatic" mode selecting key AUTOMATIC having an allocated function for executing an NC processing program that describes a processing procedure for a certain product. The above plural keys also include a "manual" mode selecting key MANUAL having an allocated function for moving a movable member such as the work table and the laser processing head and the like to an arbitrary position by a manual input operation. The above plural keys also include an "editing" mode selecting key EDIT having an allocated function for editing the NC processing program. The above plural keys also include an "MDi" mode selecting key Mdi having an allocated function for inputting NC data by a manual input operation of the ten key and the alphabet keys and the like and moving the movable member along a predetermined path in accordance with the inputted NC data. The above plural keys also include an "origin return" mode selecting key ORIGIN RETURN having an allocated function for moving the movable member to an original position. The above plural keys also include a moving key such as "+X", "+Y", "+Z", "−X", "−Y", "−Z" and the like. This moving key is used when the "origin return" mode selecting key or the "manual" mode selecting key is selectively inputted and the like. The moving key has an allocated function for designating operations for setting a moving direction and a moving distance of the movable members. The above plural keys also include a "start" key START used when the "automatic" or "MDi" mode selecting key is selectively inputted and the like. The "start" key has an allocated function for operating and designating execution of a predetermined operation in the selected mode. The above plural keys further include a "stop" key STOP used when the "automatic" or "manual" mode selecting key is selectively inputted and the like. The "stop" key has an allocated function for operating and designating operational stoppage in the selected mode.

Here, these plural keys are classified as follows for every attribute. As shown in FIG. 23, the "expert" mode selecting key and the "beginner" mode selecting key belong to a group of the skill mode selecting key 448. Mode selecting keys such as the "automatic" mode selecting key, the "manual" mode selecting key, the "editing" mode selecting key and the "MDi" mode selecting key and the "origin return" mode selecting key and the like belong to a group of the headline key 449. Further, the moving key such as "+X", "+Y", "+Z", "−X", "−Y", "−Z" and the like, the "start" key and the "stop key" belong to a group of the secondary key 451.

An operation of the operating state setting device for the above laser processing machine will next be explained with reference to the operating flow chart of FIG. 24. Here, the above work table 7 is manually moved in a "+X" direction as an example.

Figure 24:
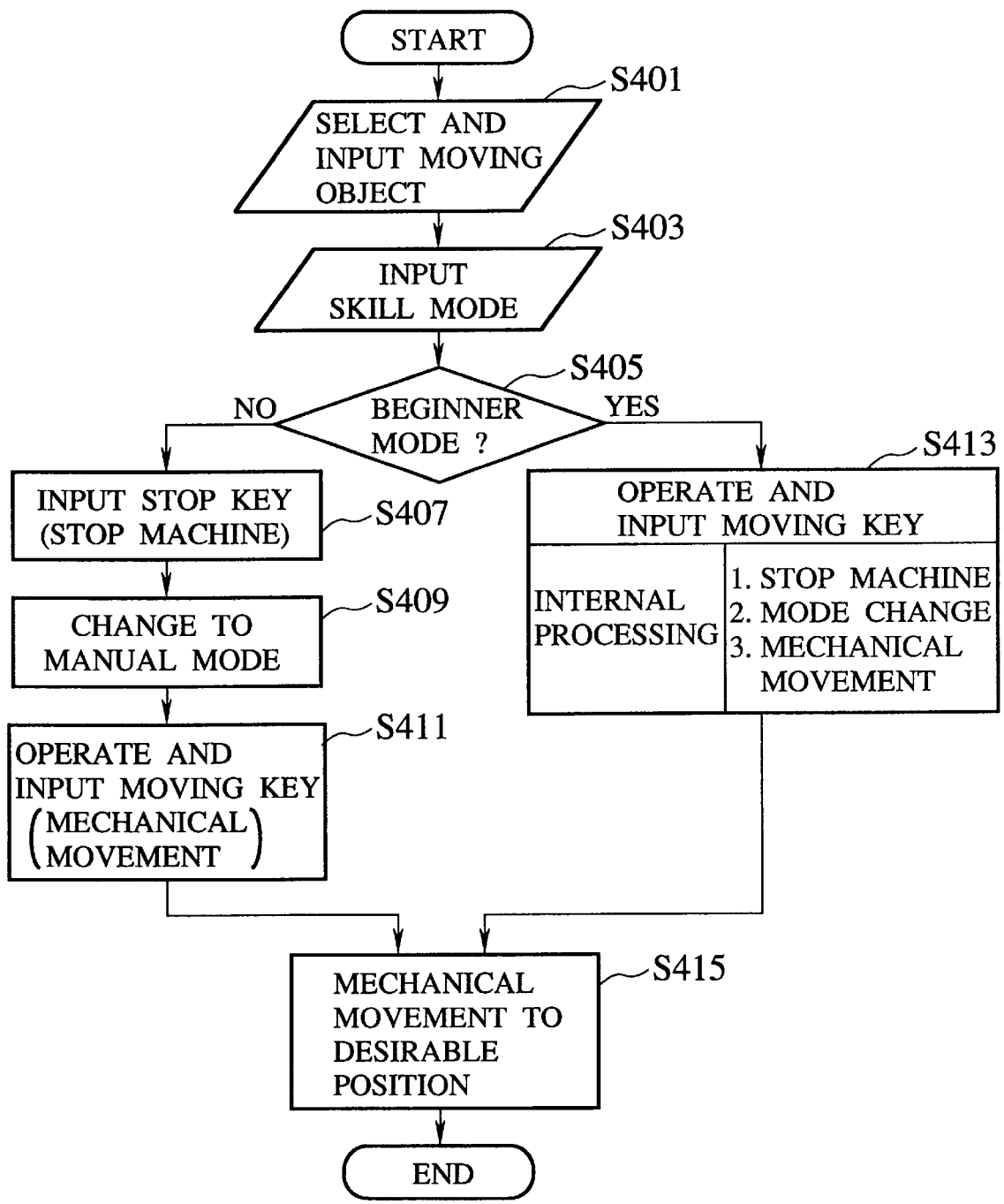
FIG. 24 is an operating flow chart in accordance with one embodiment of the above fifth invention.

As shown in FIG. 24, an operator first selectively inputs the work table 7 as a movable member constituting a moving object in a step S401. Next, the operator selectively inputs a skill mode by the skill mode selecting key 448 in a step S403. Then, the CPU 437 judges in a step S405 whether the inputted skill mode is an expert mode or a beginner mode.

When the inputted skill mode is an expert mode as a result of the input judgment in step S405, the CPU 437 waits for an input of the "stop" key. When the "stop" key is inputted, the CPU 437 stops in a step S407 a movement of a movable member if it is in operation. Next, the CPU 437 waits for an input of the headline key 449. When the "manual" mode selecting key as the headline key 449 is inputted, the CPU 437 changes a work mode to a manual moving mode of the work table 7 in a step S409. Next, the CPU 437 waits for an input of the secondary key 451. When the "+X" moving key as the secondary key 451 is inputted, a setting operation of the operating state of the laser processing machine 1 is completed in a step S411 and the operating state is changed to a state corresponding to a combination of the "manual" mode selecting key and the "+X" moving key; further, during a period when the "+X" moving key is touched, the X-axis drive motor 425 is rotated. As a result, the work table 7 is moved by a distance corresponding to the above rotating period in a step S415. The above processing in steps S407 to S415 constitute an operating procedure in the expert mode.

In contrast to this, when it is judged as a result of the judgment in step S405 that the beginner mode for allowing a simple operating procedure is inputted as the skill mode, the CPU 437 directly proceeds to step S413 for waiting an input of the secondary key 451 while omitting the steps for waiting the input of the "stop" key and the headline key 449 which were carried out in the expert mode. At this time, when the "+X" moving key is inputted as the secondary key 451, the setting operation of the operating state of the laser processing machine 1 is completed; here, it should be noted that in a step S413, the CPU 437 performs internally the two processing that are carried out in steps S407 and S408 for the expert mode. Namely, the CPU 437 internally executes the stoppage commands of the work table 7 and the commands for changing the work mode to a manual moving mode of the work table 7. Thus, when the "+X" moving key is inputted as described above, the CPU 437 causes the X-axis drive motor 425 to rotate for a period for which the "+X" moving key is touched, and the work table 7 is moved by a distance corresponding to this rotating period in a step S415. The above process in steps S413 to S415 constitute an operating procedure in the beginner mode.

Thus, in accordance with the operating state setting device of the laser processing machine in the present invention, a man-machine-interface between the laser processing machine 1 and an operator is constructed in a manner which is easy even for a beginner to understand intuitively. Further, the beginner mode for allowing a simple operation for key input setting is provided as well as the expert mode, and these two modes can be selected in accordance with a skill degree of the operator. Accordingly, both an expert and a beginner can easily perform a setting operation for changing the operating state of the laser processing machine.

In the present embodiment, the operating state of the laser processing machine set by the key input operation in the beginner mode is the same as that set by the key input operation in the expert mode. Thus, the setting operation for changing the operating state of the laser processing machine can be easily realized only by carrying out a simple operating procedure even by a beginner unaccustomed to the handling of the device.

Next, the operation of an operating state setting device of the laser processing machine in accordance with another embodiment of the present invention will next be explained with reference to FIGS. 25 and 26. More particularly, in this embodiment, NC data for a product as a processed object are down-loaded and are stored to the RAM 441 and the like, so that an editing of the stored NC data, such as a correction and an addition, is performed.

Figure 25:
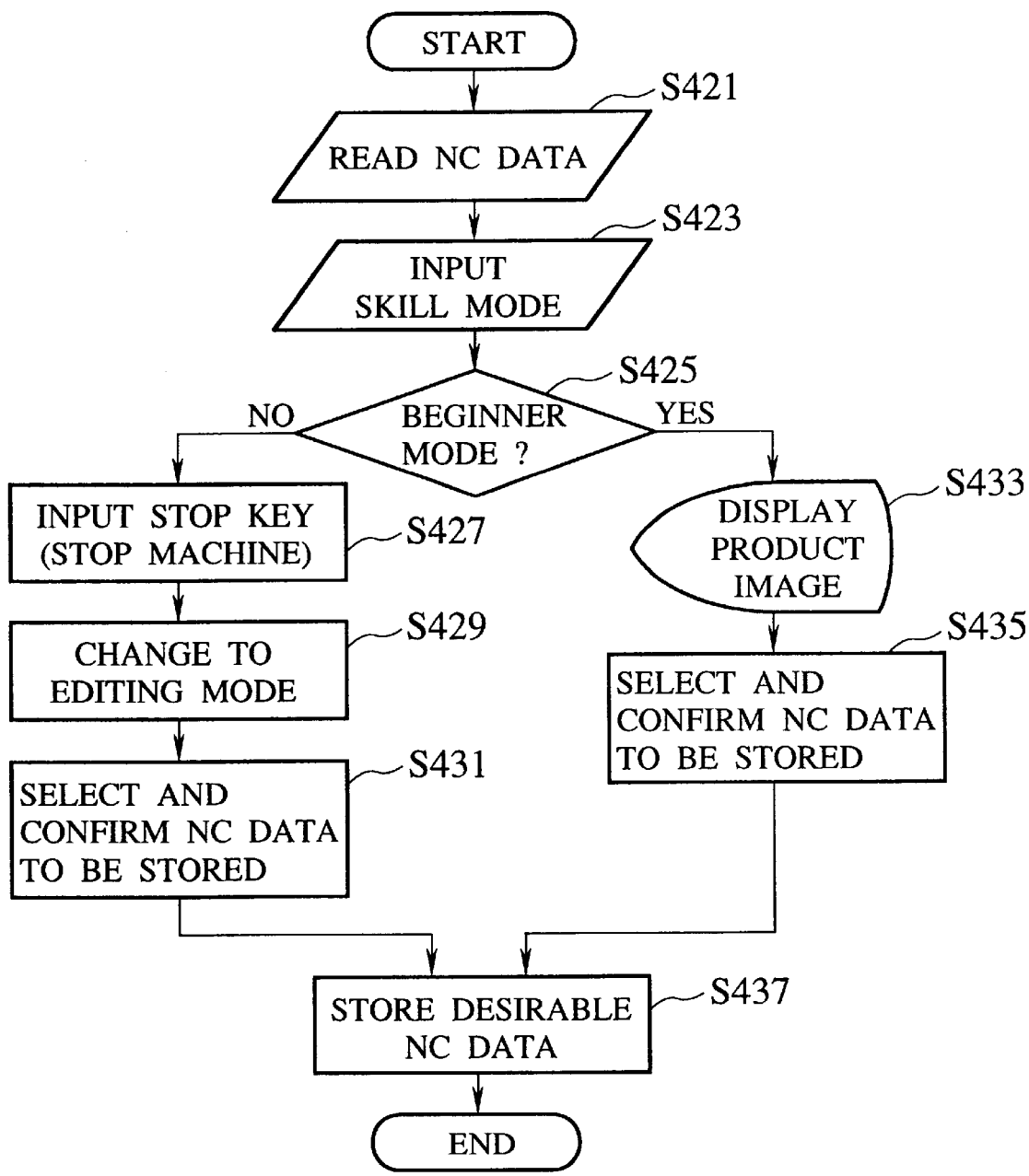
FIG. 25 is an operating flow chart in accordance with another embodiment of the above fifth invention.
Figure 26:
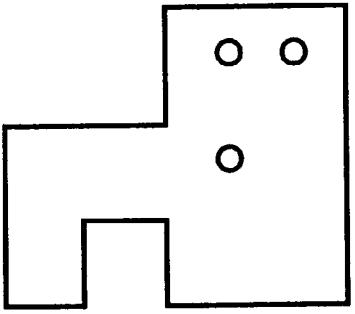
FIG. 26 is a view used to explain an operating state setting procedure in accordance with another embodiment of the above fifth invention.

As shown in FIG. 25, an operator first reads an NC data group including NC data for a product from a memory medium such as an unillustrated floppy disk(FD) or an unillustrated hard disk(HD) and the like in a step S421. Next, the operator selectively inputs a skill mode by the skill mode selecting key 448 in a step S423. The CPU 437 then judges in a step S425 whether the inputted skill mode is an expert mode or a beginner mode.

When it is judged as a result of the judgment in step S425 that the inputted skill mode is an expert mode, the CPU 437 first waits for an input of the "stop" key. When the "stop" key is inputted in step S427, the CPU 437 stops the movement of a movable member if it is moving. The CPU 437 next waits for an input of the headline key 449. When the "editing" mode selecting key is inputted as the headline key 449, the CPU 437 changes a work mode to an editing mode of the NC data in a step S429. Thereafter, the CPU 437 waits for an input of the secondary key 451. When the NC data are selected as an edit object by inputting e.g., an " " (arrow) moving key (not illustrated) as the secondary key 451, the operating state of the laser processing machine 1 is in a step S431 changed to a state corresponding to the combination of the "editing" mode selecting key and the moving key. Thus, the NC data as an edit object are down-loaded and stored into the RAM 441 in a step S437. Thereafter, an editing of these stored NC data, such as a correction, an addition and the like, is carried out. The above processes in steps S427 to S437 constitute operating procedure in the expert mode.

The next explanation relates to a case in which the beginner mode for allowing a key input in the simple operating procedure is inputted as the skill mode in step S423. In this case, it is judged in the judgment in step S425 that the beginner mode is inputted. Then, it proceeds to step S433. In step S433, the CPU 437 refers to each of past editing histories of an NC data group and sequentially selects and stores three product images for three NC data having latest editing history into a memory area of the VRAM 443. Further, as shown by an image 401 in FIG. 26, the CPU 437 displays the product images corresponding to the three NC data on the display screen of the display unit 445. The CPU 437 then waits an input of the NC data as an edit object. At this time, a message of "Select NC data." is also displayed on the display screen of the display unit 445 and the CPU 437 requests an operator to select the NC data as an edit object. At this time, for example, when an image of PANEL-1 in the image 401 is touched as the NC data, the CPU 437 considers that the NC data corresponding to the touched product image are selected. Thus, as shown by an image 402 in FIG. 26, the CPU 437 displays on the display unit 445 the product image corresponding to the NC data, a material and a size of this product, and a question as to whether this product is right (such as "Is this the product?") and the like. When this product is right, the operator pushes a key of "next" in the image 402 in a step S435. Then, the above NC data are down-loaded and stored to the RAM 441 and the like. An edition of the stored NC data, such as a correction, an addition and the like, is then performed in a step S437. The above processes in steps S433 to S437 constitute an operating procedure in the novel beginner mode. In the operating state setting device of the laser processing machine in the present invention, the beginner mode for allowing a key input setting operation in the simple procedure is added to the expert mode in which complicated key input setting operation are to be performed. When this beginner mode is selected, the key input operation is performed by an interactive system which requests an operator to input a suitable key at each of operating stages. Therefore, a setting operation for changing the operating state of the laser processing machine can be easily performed even by a beginner unaccustomed to the handling of the device.

The present invention is not limited to the above embodiment, but can be embodied in other forms by adding a suitable change to the present invention.

For example, a key display form in this embodiment can be constructed such that a key which allows an input at a certain stage is displayed and no key which unallows an input is displayed. Further, for example, it is possible to display the key which unallows an input in thin color, whereby such key can be discriminated from the key which allows an input.

Further, in the present invention, when a terminal unit connected to the PLC is located in a place such as a centralized supervisory room and the like far from the laser processing machine, the operating state of the laser processing machine can be set by remote control while an image displayed on the display screen of a display unit is visualized through a network such as a LAN within facilities or a public telephone line and the like.

Finally, in the embodiment of the present invention, the setting the operating state of the laser processing machine is explained. However, the present invention is not limited to this application. For example, the present invention can be applied to setting of the operation state of other machine tool such as a turret punch press, a bending processing machine and the like.

As explained above in detail, in accordance with the fifth invention of this application, a beginner mode for allowing a key input setting operation in a simple procedure is added to the expert mode. These two modes can be selected in accordance with a skill degree of an operator. Accordingly, both an expert and a beginner can easily perform a setting operation for changing the operating state of the laser processing machine.

When the beginner mode is selected, the key input operation is performed by a interactive system which requests an operator to input a key at each of operating stages. Therefore, a setting operation for changing the operating state of the laser processing machine can be easily performed even by a beginner unaccustomed to the handling of a device.

Furthermore, when the beginner mode is selected, the operating state of the laser processing machine set by the simple key input operation is the same as the operating state set by a key input operation in the expert mode. Accordingly, the setting operation for changing the operating state of the laser processing machine can be easily performed only by carrying out a simple operating procedure even by a beginner.

What is claimed is:

1. An operating state setting method of a plate material processing machine having a plurality of keys, each having a distinct corresponding function relating to an operation of the plate material processing machine, such that an operating state is changed according to an input of at least one of the plurality of keys, the operating state setting method comprising:
   setting an operating state corresponding to a key input operation in a detailed procedure for an experienced operator when an expert mode is selected via a first one of the plurality of keys; and
   setting an operating state corresponding to a key input operation in a simple procedure for an inexperienced operator when a beginner mode is selected via a second one of the plurality of keys;
   wherein the simple procedure comprises an internal execution procedure, which is activated by sequentially selecting a beginner mode selecting key and at least one moving key, and which changes an automatic mode to a manual mode, the internal execution procedure automatically executing at least one manual operating step of the detailed procedure, thereby eliminating the at least one manual operating step from the simple procedure.

2. The operating state setting method of claim 1, wherein the internal execution procedure automatically executes at least a stoppage command for stopping a movable member.

3. The operating state setting method of claim 1, further comprising verbally instructing an operator, via an automated talking system, to perform each operating step of the key input operation in the simple procedure when the beginner mode is selected.

4. The operating state setting method of claim 1, wherein the operating state of the plate material processing machine set by the key input operation in the simple procedure at a time of selecting the beginner mode is the same as the operating state of the plate material processing machine set by the key input operation in the detailed procedure at a time of selecting the expert mode.

5. An operating state setting method of a plate material processing machine having a plurality of keys, each having a distinct corresponding function relating to an operation of the plate material processing machine, such that an operating state is changed according to an input of at least one of the plurality of keys, the operating state setting method comprising:
   setting an operating state corresponding to a key input operation in a detailed procedure for an experienced operator when an expert mode is selected via a first one of the plurality of keys; and
   setting an operating state corresponding to a key input operation in a simple procedure for an inexperienced operator when a beginner mode is selected via a second one of the plurality of keys;
   wherein the simple procedure comprises selecting a most recent editing history corresponding to numerically controlled data from among a plurality of numerically controlled data and displaying, on a display screen, at least one product image corresponding to the selected editing history.

6. The operating state setting method of claim 5, further comprising verbally instructing an operator, via an automated talking system, to perform each operating step of the key input operation in the simple procedure when the beginner mode is selected.

7. The operating state setting method of claim 5, wherein the operating state of the plate material processing machine set by the key input operation in the simple procedure at a time of selecting the beginner mode is the same as the operating state of the plate material processing machine set by the key input operation in the detailed procedure at a time of selecting the expert mode.

8. An operating state setting device of a plate material processing machine comprising:
   a plurality of keys, each key having a corresponding function relating to an operation of the plate material processing machine, said plurality of keys comprising:
      a skill mode selecting key for selecting one of an expert mode and a beginner mode;
      an automatic mode key for executing a numeric control processing program having a processing procedure for a selected product;
      a manual mode key for allocating manual control of a movable member of the plate material processing machine; and
      at least one moving key for controlling at least a moving direction and a moving distance of the movable member whenever the manual mode key is selected; and
   a numerically controlled controller that sets an operating state of the plate material processing machine corresponding to the skill mode selected via the skill mode selecting key, the operating state comprising a key input operation in a detailed procedure when the expert mode is selected and a key input operation in a simple procedure when the beginner mode is selected, the simple procedure comprising an internal execution procedure, which is activated when the beginner mode selecting key and at least one moving key are selected sequentially, and which changes an automatic mode to a manual mode;
   wherein the internal execution procedure automatically executes at least one manual operating step of the detailed procedure, thereby eliminating the at least one manual operating step from the simple procedure.

9. The operating state setting device of claim 8, wherein the internal execution procedure automatically executes at least a stoppage command for stopping the movable member.

10. The operating state setting device of claim 8, further comprising an automated talking system that verbally instructs an operator to perform each operating step of the key input operation in the simple procedure when the beginner mode is selected.

11. The operating state setting device of claim 8, wherein the operating state of the plate material processing machine set by the key input operation in the simple procedure at a time of selecting the beginner mode is the same as the operating state set by the key input operation in the detailed procedure at a time of selecting the expert mode.

12. An operating state setting device of a plate material processing machine comprising:

a plurality of keys, each having a distinct corresponding function relating to an operation of the plate material processing machine, said plurality of keys comprising:

a skill mode selecting key for selecting one of an expert mode and a beginner mode;

an automatic mode key for executing a numeric control processing program having a processing procedure for a selected product;

a manual mode key for allocating manual control of a movable member of the plate material processing machine; and an editing key for editing of stored numerically controlled data; and a numerically controlled controller that sets an operating state of the plate material processing machine corresponding to the skill mode selected via the skill mode selecting key, the operating state comprising a key input operation in a detailed procedure when the expert mode is selected and a key input operation in a simple procedure when the beginner mode is selected, the simple procedure comprising selecting a most recent editing history corresponding to numerically controlled data from among a plurality of numerically controlled data and displaying on a display screen at least one product image corresponding to the selected editing history.

13. The operating state setting device of claim 12, further comprising an automated talking system that verbally instructs an operator to perform each operating step of the key input operation in the simple procedure when the beginner mode is selected.

14. The operating state setting device of claim 12, wherein the operating state of the plate material processing machine set by the key input operation in the simple procedure at a time of selecting the beginner mode is the same as the operating state set by the key input operation in the detailed procedure at a time of selecting the expert mode.

* * * * *

UNITED STATES PATENT AND TRADEMARK OFFICE
CERTIFICATE OF CORRECTION

PATENT NO.    : 6,243,619 B1                                              Page 1 of 1
DATED         : June 5, 2001
INVENTOR(S)   : Inamasu et al.

It is certified that error appears in the above-identified patent and that said Letters Patent is hereby corrected as shown below:

<u>Title page,</u>
Item [56], References Cited, the following U.S. PATENT DOCUMENTS was omitted and should be inserted:

-- 5,349,902     9/1994    Daniel et al.    100/48 --

Signed and Sealed this

Sixteenth Day of July, 2002

*Attest:*

JAMES E. ROGAN
*Attesting Officer*          *Director of the United States Patent and Trademark Office*